US008065204B2

(12) United States Patent
Gerzymisch et al.

(10) Patent No.: US 8,065,204 B2
(45) Date of Patent: Nov. 22, 2011

(54) SYSTEM AND METHOD FOR SOFTWARE INTEGRATION AND FACTORY DEPLOYMENT

(75) Inventors: Eric Gerzymisch, San Diego, CA (US); Vijayanand Muralidhar Kallianpur, San Diego, CA (US); Sean Patrick Kennedy, San Diego, CA (US); Masafumi Kuboyama, Tokyo (JP); Brian Lee, Mountain View, CA (US); Yoshiro Muraoka, Brussels (BE); Victor Glenn Reha, Murrieta, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 993 days.

(21) Appl. No.: 11/541,433

(22) Filed: Sep. 29, 2006

(65) Prior Publication Data

US 2007/0240154 A1 Oct. 11, 2007

Related U.S. Application Data

(60) Provisional application No. 60/722,130, filed on Sep. 29, 2005.

(51) Int. Cl.
*A01K 5/02* (2006.01)
*G06F 17/50* (2006.01)
*G06G 1/14* (2006.01)
*G06Q 20/00* (2006.01)
*G06Q 30/00* (2006.01)
*G06Q 10/00* (2006.01)

(52) U.S. Cl. ........ 705/29; 705/22; 705/26.5; 705/26.61; 705/26.7; 705/28

(58) Field of Classification Search ............... 705/29
See application file for complete search history.

(56) References Cited

U.S. PATENT DOCUMENTS

| | | | | | |
|---|---|---|---|---|---|
| 5,376,930 | A | * | 12/1994 | Merkle et al. | 705/29 |
| 5,668,992 | A | * | 9/1997 | Hammer et al. | 713/1 |
| 5,963,743 | A | * | 10/1999 | Amberg et al. | 717/174 |
| 5,991,543 | A | * | 11/1999 | Amberg et al. | 717/175 |
| 5,995,757 | A | * | 11/1999 | Amberg et al. | 717/175 |
| 6,092,189 | A | * | 7/2000 | Fisher et al. | 713/1 |
| 6,178,546 | B1 | * | 1/2001 | McIntyre | 717/115 |
| 6,182,275 | B1 | * | 1/2001 | Beelitz et al. | 717/175 |
| 6,493,871 | B1 | * | 12/2002 | McGuire et al. | 717/173 |
| 6,775,829 | B1 | * | 8/2004 | Kroening | 717/175 |
| 6,954,930 | B2 | * | 10/2005 | Drake et al. | 717/178 |
| 6,990,600 | B2 | * | 1/2006 | Ryan et al. | 714/3 |
| 7,020,697 | B1 | * | 3/2006 | Goodman et al. | 709/223 |
| 7,225,208 | B2 | * | 5/2007 | Midgley et al. | 707/204 |
| 2002/0087440 | A1 | * | 7/2002 | Blair et al. | 705/29 |
| 2002/0107749 | A1 | * | 8/2002 | Leslie et al. | 705/26 |
| 2002/0116300 | A1 | * | 8/2002 | DeBusk et al. | 705/29 |
| 2004/0019538 | A1 | * | 1/2004 | Ballas et al. | 705/29 |
| 2004/0268283 | A1 | * | 12/2004 | Perry et al. | 716/11 |
| 2005/0071390 | A1 | * | 3/2005 | Midgley et al. | 707/204 |

\* cited by examiner

*Primary Examiner* — Matthew Gart
*Assistant Examiner* — Ig T An
(74) *Attorney, Agent, or Firm* — John L. Rogitz

(57) ABSTRACT

A software management database contains data structures supporting computer software provisioning for a range of CTO/BTO variations, language variations, region variations, and operating system variations.

5 Claims, 26 Drawing Sheets

Test Case-All active projects(Filter=Not Tested Or Failed)
Wasabi PR BO1 (11/18 - 12/1)

| ID | PURPOSE | Result | Submitter | Last Image Tested |
|---|---|---|---|---|
| Bluetooth Driver | | | | |
| 5967 | SP2WSSU Verify that Wireless Switch Setting Utility is able to switch in between Bluetooth and Wireless modes even if the switching is done while the Bluetooth and Wireless connections are physically shut off | Impeded | lamt | Build01 |
| 5968 | SP2WSSU Verify that Wireless Switch Setting Utility is able to switch in between the Bluetooth and Wireless modes without shutting off the power physical switcher to the Wireless?Bluetooth connections | Impeded | lamt | Build01 |
| 6377 | SP2WSSU Verify the menu items of Wireless Switch Setting Utility | Impeded | lamt | Build01 |
| 5726 | SP2WSSU To make sure Bluetooth and Wireless does not have any problems after reboot | Impeded | lamt | Build01 |
| FI Spec | | | | |
| 4947 | Verify Foundation image specifications matches with the appropriate documents | Fail | rubinj | Build01 |
| HDD kick Tool | | | | |
| 4837 | Verify all required "modules" are installed after system recovery, using both the VSMS Missing Modules report and PM Plan | Fail | ubriated | Build01 |
| 5450 | Verify created HRCD complete recovery without recovery drive | Fail | carprof | Build01 |
| 5419 | Ensure Complete recovery without hidden partition option can be initiated, using Consumer RDVD (RDVD) | Fail | zubriated | Build01 |
| 5437 | Verify that system can be recovered selecting "Complete Recovery" with consumer RDVD (RDVD) on a brand new hard drive | Fail | carprof | Build01 |
| 5438 | Verify created HRCD Complete recovery with recovery partition, on a clean hard drive | Fail | LaAndy | Build01 |
| 5448 | Verify created RDVD Complete recovery without recovery drive | Fail | carprof | Build01 |
| 6515 | [B2B] Verify that modules and applications can be installed after a clean installation of retail XP | Fail | carprof | Build01 |
| 4797 | Verify C drive can be reimaged with all the correct modules reinstalled | Fail | carprof | Build01 |
| ImageStation Library | | | | |
| 2816 | To verify taht Image Station Library is installed on the image. But ImageStation is not offered for the Latin American market | Fail | CarlsonC | Build01 |
| IntelPro 2915ABG_2200BG | | | | |
| 6836 | Cisco-(CHECKBOX) field available on WPA-Enterprise PEAP and TTLS) | Impeded | degrassec | Build01 |
| 6838 | Verify "Chose a certificate by clicking the Select button". (CHECKBOX) | Impeded | degrassec | Build01 |

MOD-Premiere Pro
*BOM Info:*

| | | | | |
|---|---|---|---|---|
| Adobe, Multimedia, Premiere Delete DVDBurn | 0411303.ADB | 1.0.00.0404220 | Smith 1 | No |
| Adobe, Multimedia, Premiere Pro | 0419801.ADB | 1.5.0.0 | Smith 2 | Yes |
| Sony ITC, Multimedia, VAIO Edit Components | 0504604.SNC | 5.0.01.14040 | Smith 2 | Yes |
| Adobe, Marketing Material, Premiere Pro SerNum and Readme | 0407101.ADB | 1.1.00.0403110 | Smith 1 | Yes |
| Sony ITD, Build Image Tool, MCODE Reader | 0504903.SND | 5.0.1 | Smith 3 | No |
| Sony ITD, Tools, MN.DLL | 0306502.SND | 1.2.1 | Smith 3 | No |

Fig. 29

*Series BOM Associations*

| | | | | |
|---|---|---|---|---|
| Hogwarts4-MC | Shipping | Smith 4 | 2005/02/20 | |
| Hogwarts4_Chrysalis3_Test | In progress | Smith 5 | 2005/06/07 | |
| Horizon2-HE | Shipping | Smith 4 | 2005/02/20 | |
| Horizon2-MC | Shipping | Smith 5 | 2005/04/19 | |
| Horizon2-PR | Shipping | Smith 4 | 2005/02/20 | |
| Horizon3_GD-HE | Shipping | Smith 5 | 2005/06/09 | |
| Horizon3_GD-MC | Shipping | Smith 5 | 2005/06/09 | |
| Horizon3_GD-PR | Shipping | Smith 5 | 2005/06/09 | |
| Jennys module test project | In progress | Smith 4 | 2005/02/20 | |
| LeonS2-HE | Shipping | Smith 4 | 2005/02/20 | |
| LeonS2-PR | Shipping | Smith 4 | 2005/02/20 | |
| LeonS2_Multi-recovery_test | Shipping | Smith 5 | 2005/02/24 | |
| LeonV-HE | Shipping | Smith 5 | 2005/06/29 | |
| LeonV-PR | Shipping | Smith 5 | 2005/06/29 | |
| Messenger-HE | In progress | Smith 5 | 2005/10/14 | |
| Messenger-PR | In progress | Smith 5 | 2005/10/14 | |
| Sherry_WWAN-PR | In progress | Smith 4 | 2005/10/05 | |
| Spirit2-HE | Shipping | Smith 4 | 2005/02/20 | |
| Spirit2-PR | Shipping | Smith 4 | 2005/02/20 | |
| Spirit3-HE | Shipping | Smith 5 | 2005/06/15 | |
| Spirit3-PR | Shipping | Smith 5 | 2005/06/15 | |

SYSTEM AND METHOD FOR SOFTWARE INTEGRATION AND FACTORY DEPLOYMENT

RELATED APPLICATION

This application claims priority from U.S. provisional application 60/722,130, filed Sep. 29, 2005, incorporated herein by reference.

I. FIELD OF THE INVENTION

The present invention relates generally to systems and methods for software integration and factory deployment of the software.

II. BACKGROUND OF THE INVENTION

Producing consumer electronics and in particular computers that might incorporate, in addition to operating systems with various configurations and suites of applications, several subsystems, each in turn with their own software drivers, can be complicated. Not only must a bill of materials (BOM) be defined, managed, and conformed to, but product defects and corrective actions must also be managed in way that ensures corrective action can be known and taken across the globe.

Because of the complexity inherent in the above considerations, it can happen that more than a single management system might develop over time, complicating efforts to integrate knowledge and data. As recognized herein, it is desirable to have a management system that can integrate the knowledge and input of designers, engineers, software integrators, etc. in ways that reduce engineering lead times and provide ease of tracking defects and cures to the defects in a single, globally shared system within an enterprise, while providing an easy way to manage regional differentiation of software offerings, sharing information between business groups within the enterprise, and eliminating duplicative data maintenance.

For example, many computers are sold on a configure to order/build to order (CTO/BTO) basis. Each software part can have a multidimensional relationship with each stock keeping unit (SKU) that represents a product when region, language, various operating system versions, and platforms are factored in. Thus, each software part can potentially have dozens of version releases to accommodate all of these variables. As but one example of the complexity of providing CTO/BTO computers, one version of a "click to DVD" software may be used only on French Windows MCE SR series SKUs that are sold only in Quebec, but another version may be designed to work on any model using Windows XP Home Edition Spanish Version regardless of region.

As another example of complexity, consider that there are currently about ten Sony VAIO platforms worldwide, and each platform may contain multiple VAIO models with variations on CPU, RAM, HDD capacity, wireless (WLAN, WWAN, and Bluetooth), graphics chipset, etc. Several major regions that include an even greater number of languages in many different countries, along with plural operating system variations, may require support. Still further, each model of VAIO for each region/language/country/OS variation contains well over one hundred pieces of software, each of which may be a unique version for only that model, or may be used for multiple models of VAIO, giving an idea of the exponential scope of the relationship between software and computer models the database must be designed to support. In summary, the relationships between software parts and the platforms they are used on have become extremely complex, and with this critical recognition in mind, the invention herein is provided.

In addition, the present invention critically recognizes that the quality of the final product is important. As understood herein, each piece of software may contain defects, or when combined in an image with other software may cause defects to be generated.

SUMMARY OF THE INVENTION

As set forth further below, processes and tools are provided herein for quickly assessing the quality of a project by relating the defects to part releases, which are in turn related to projects. For example, if a major flaw is found in a particular release version of a part, this defect is related to the appropriate part release or releases so that the defect is instantly related to all the projects that use the particular part release. Given the complexity of the software BOMs, without the present invention this task would be difficult and time consuming to do manually.

Thus, preferred implementations of the present invention correlate the relationships between software parts, the platforms they are used on, and the quality of those parts.

A method is disclosed for managing computer production in an enterprise. The method includes receiving a block of software offerings, with each block being associated with at least one product series. A product series component structure is received that defines parts for a respective product series. Parts that are required for a product series are added to the block associated with the series, with parts being assigned to each software class and related software specification pair in a block based on the part or parts required for the pair to thereby define a design structure. The method includes establishing a software bill of materials (BOM) based on the design structure using a template and/or a snapshot.

In non-limiting implementations the method includes defining software offerings. A software offering includes at least one software class and at least one associated software specification. Software offerings are associated with respective product series to establish a configuration, with configurations cumulatively defining a configuration range that contains product offerings of the enterprise for all regions in which the enterprise does business. The method may include grouping classes into blocks. A block is associated with at least one product series.

The non-limiting method may also include defining which classes are dependent on each other, and defining which blocks are base blocks. Defects can be associated with related classes and corrective actions associated with respective defects.

If desired, the method can includes associating a respective installation file with each software offering. Each installation file may include a data file format version number, a version number of an installation data snapshot, an installation order for modules, data required for confirming successful installation, cyclic redundancy check (CRC) data for each binary file, path information for locating files in a file store, partition size information for recovery and customer partitions. Also, installation and recovery tools may use a list of software releases directly instead of microcode, which is used only for customer recovery, with microcode bit mappings being constrained to respective recovery media sets.

In another aspect, a software management database on a computer readable medium can contain data structures supporting computer software provisioning for a range of CTO/BTO variations, language variations, region variations, and operating system variations.

Non-limiting data structures may include bill of materials (BOM) entities containing information related to parent BOMs and child BOMs, if any. Each BOM entity can also include an engineering part ID, a software release ID, a major version ID, a group ID, a component ID, a planning parts ID, and a software series ID. A plan parts entity can also be provided that includes launch dates for software base releases, import dates for software bases indicating when the bases were imported into computers, and identifications for software bases.

Other non-limiting entities in the database may include component entities including launch dates for software base releases, import dates for software bases, identifications for software bases. Software release entities containing a base ID, a name, a file path, a launch date can also be provided, as can be software release status entities that include data representing status and name of a software release. Additional database entities may include: a group entity containing data representing a name and launch of a type, a series entity containing a software series ID, base ID, name, an indication of being active, a launch date, an import date, an engineering parts entity containing an engineering part ID, a base ID, a type ID, a name, a launch date, and indication of dependent parts, an engineering parts major revision entity containing information related to default use, an engineering part software release entity containing information on a related engineering part entity, a related engineering parts major revision entity, a related language code entity, and a language entity containing information related to a language name and a language code.

In another aspect, a computer-implemented system for creating bills of materials (BOMs) includes logic that can be executed by a computer and stored on a computer readable medium. The logic facilitates creation of BOMs using templates and/or snapshots. BOMs can be automatically generated based on part attributes and groups of parts, major versions, and releases. The logic can automatically check BOMs to reduce errors.

In still another aspect, a computer system executing logic stored on a computer readable medium enters, into a first database, first software data. The first software data includes operating systems and configure to order/build to order (CTO/BTO) options. The system transfers at least some of the first software data in the first database to a comprehensive global database, referred to herein colloquially as "ePic." Second software data such as operating system updates, device drivers, and utilities is automatically adding to a bill of materials (BOM) through the comprehensive global database. Also, software along with metadata that describes the software can be checked into the comprehensive global database by users, and the BOM for a specific series/language/region can be frozen/locked and the process to create factory deliverables including software image, software modules, and data can then begin.

The database tracks defects and relates them to parts, stores test cases which are related to parts which in turn allows test strategies to be auto-generated.

The details of the present invention, both as to its structure and operation, can best be understood in reference to the accompanying drawings, in which like reference numerals refer to like parts, and in which:

BRIEF DESCRIPTION OF THE DRAWINGS

Figures 12, 13:
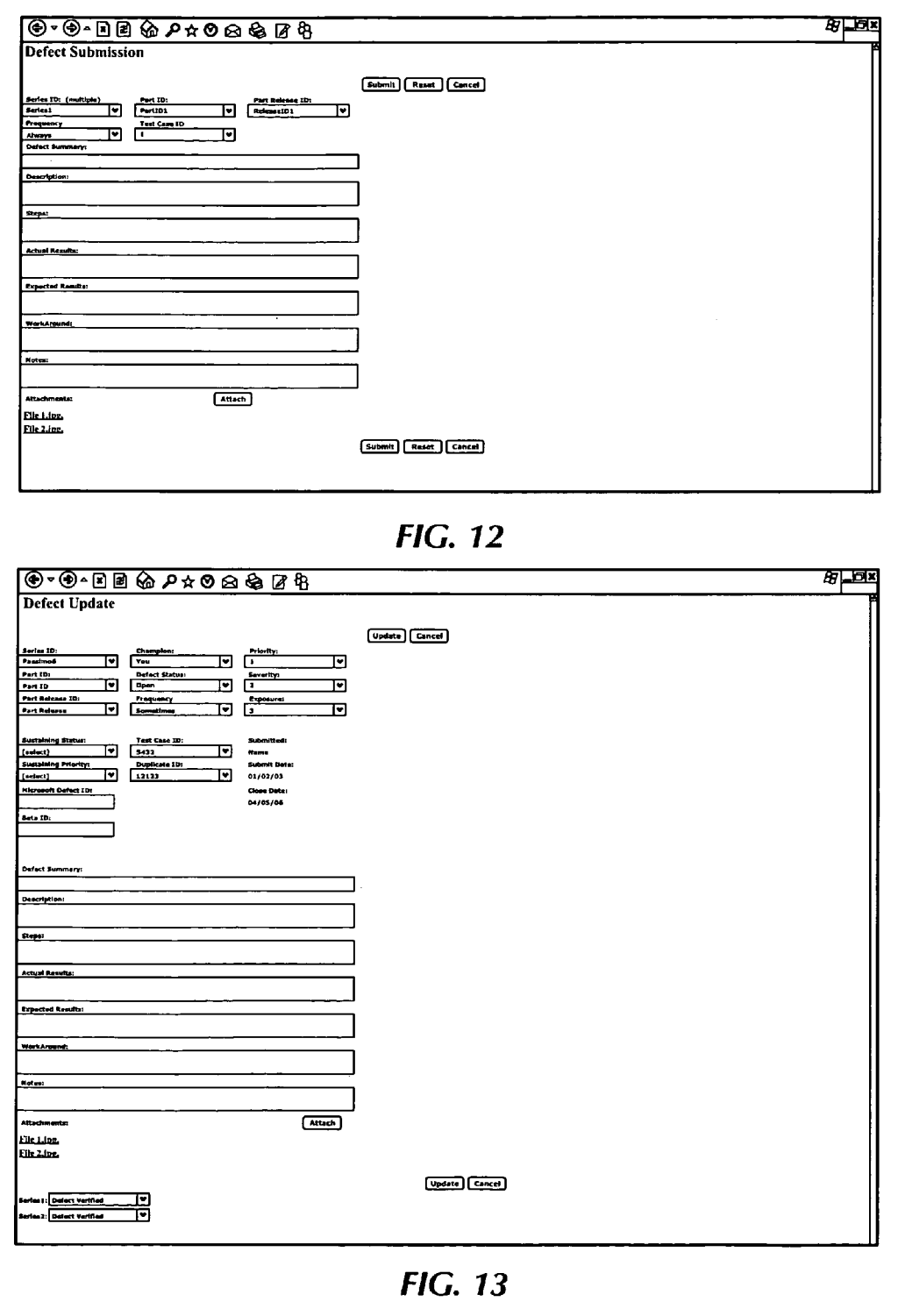
Figures 14, 15:
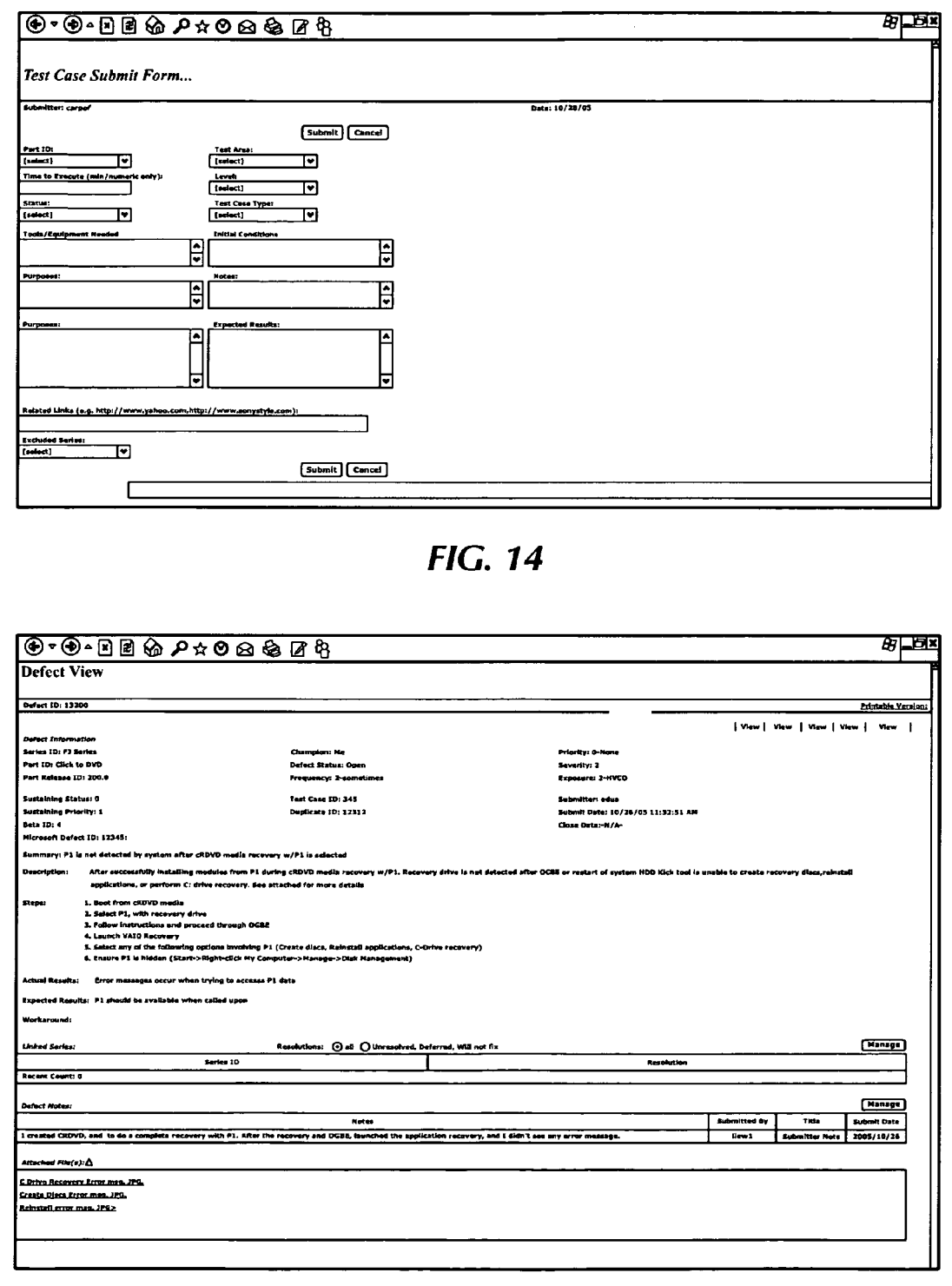
Figures 16, 17:
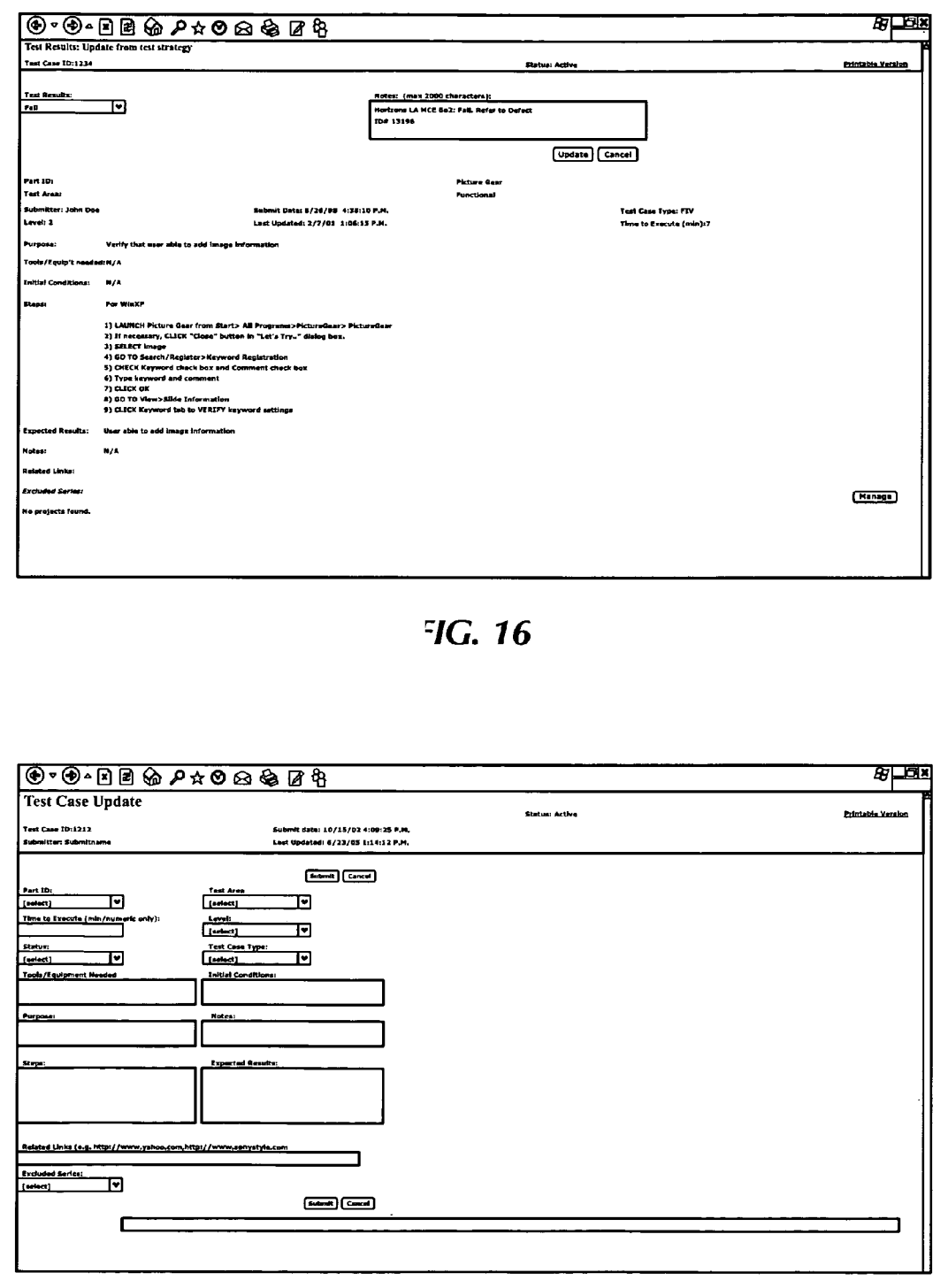

FIGS. 12-17 are non-limiting screen shots used for defect management and test case management purposes;

FIGS. 25-27 are further non-limiting defect-related screen shots.

FIGS. 28 and 29 are tables illustrating bill of material (BOM) information and associations, respectively.

DETAILED DESCRIPTION OF THE PREFERRED EMBODIMENT

Figure 1:
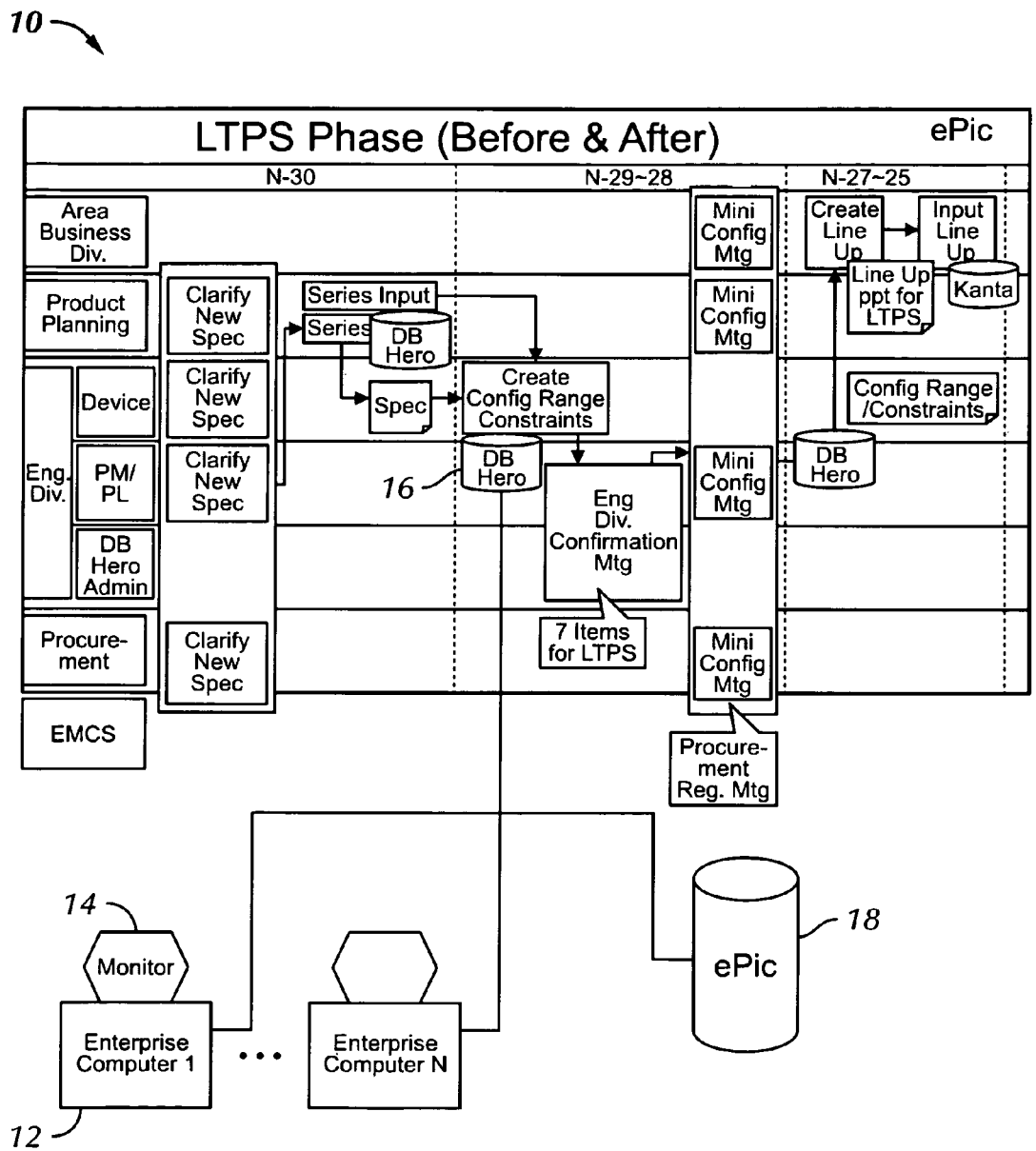
FIGS. 1-3 are diagrams of non-limiting software management phases.

In the present non-limiting implementation, only part of the software data is contained in a data store referred to below as "DB Hero". Specifically, software data that is visible to customers (e.g., operating systems, configure to order/build to order (CTO/BTO) options, software highlighted on web sites, etc.) is entered into DB Hero. As set forth in the specification below, periodically, some of the data from DB Hero is pushed to a comprehensive global database referred to herein as ePic, including both stock keeping unit (SKU) data and software data.

Software data that is not as visible to customers (such as operating system updates, device drivers, utilities, etc.) are added to the bill of materials (BOM) through the comprehensive global database. Software is checked into the comprehensive global database by developers, vendors or engineers, along with metadata that describes the software for process tools. The BOM for a specific series/language/region is frozen/locked and the process to create the factory deliverables (software image, software modules, and data) can then be started. As set forth in the detailed specification below, various process tools and manual process can be used to create the factory deliverables, all of which use data stored in the comprehensive global database.

Additionally, the factory deliverables are tested and validated to meet quality standards. The factory deliverables, and the metadata that describes them, are then delivered to the factory to be used in mass production.

To better understand terms used herein, the range of potential software offerings for a given sales cycle is defined as a set of classes and specifications. The class structure captures how the various software items will be offered to the customer, and is a specific type of software. Specifications, on the other hand, are individual software items that are associated with classes. Thus, a specification is an option that the customer may choose within a class, and a class may have more than one specification while a specification is assigned to only one class. Software offerings (classes and specifications) are associated with individual series, with the resulting structure being called the "configuration range." The configuration range for a SKU is a list of all the Classes (and specifications) that are offered for that SKU.

By way of non-limiting example only, a "class" might be "pre-installed office software", and specifications within that class from which the customer can select might be "MS Office professional", "MS Office Small Business", "MS Office Basic", and "MS Works."

With the detailed description below it will be appreciated that the database herein supports software variations in CTO/BTO, language, region, and OS. In addition, this database, and the tools that use it, allow for the creation of CTO systems, based on individual customer orders, in the mass production process with every piece of software preinstalled and ready to use, allowing for a virtually infinite number software offerings to customers as opposed to a few pre-defined options.

Also, unnecessary duplicate data entry is eliminated, hardware components are automatically mapped to software releases, and developers can specify language and geographic region supported for each software release at the time of software check-in, with the correct release being assigned to each BOM automatically. Further, BOMs are created using templates and snapshots for efficiency. Moreover, BOMs are automatically generated based on part attributes to reduce effort, and groups of parts, major versions, and releases can be defined and reused. Automatic checking of the BOMs is provided to reduce errors. In addition, installation and recovery tools use a list of software releases directly instead of microcode, which is used only for customer recovery, with microcode bit mappings being constrained to each recovery media set that is defined. This solves the problem of limited microcode bits and makes the changing of a recovery key easier.

Below are details of one non-limiting implementation of present principles. FIG. 1 illustrates that the present methods may be undertaken by a computer system 10 including one or more enterprise computers 12, each potentially having its own monitor 14 which can display the screen shots described below. The enterprise computers 12 can be used by developers and software engineers to execute the invention. Thus, the logic and the databases herein (including the so-called "DBHero" database 16 and global database 18, referred to herein as "ePic") may be distributed over plural computers if desired, and some of the method steps may be undertaken by human users of the enterprise computers 12 while other method steps can be undertaken automatically by logic resident on computer readable media in computers. The computer readable media can include but is not limited to RAM, ROM, floppy disks, hard disk drives, optical disk drives, solid state memory devices, etc.

Figure 19:
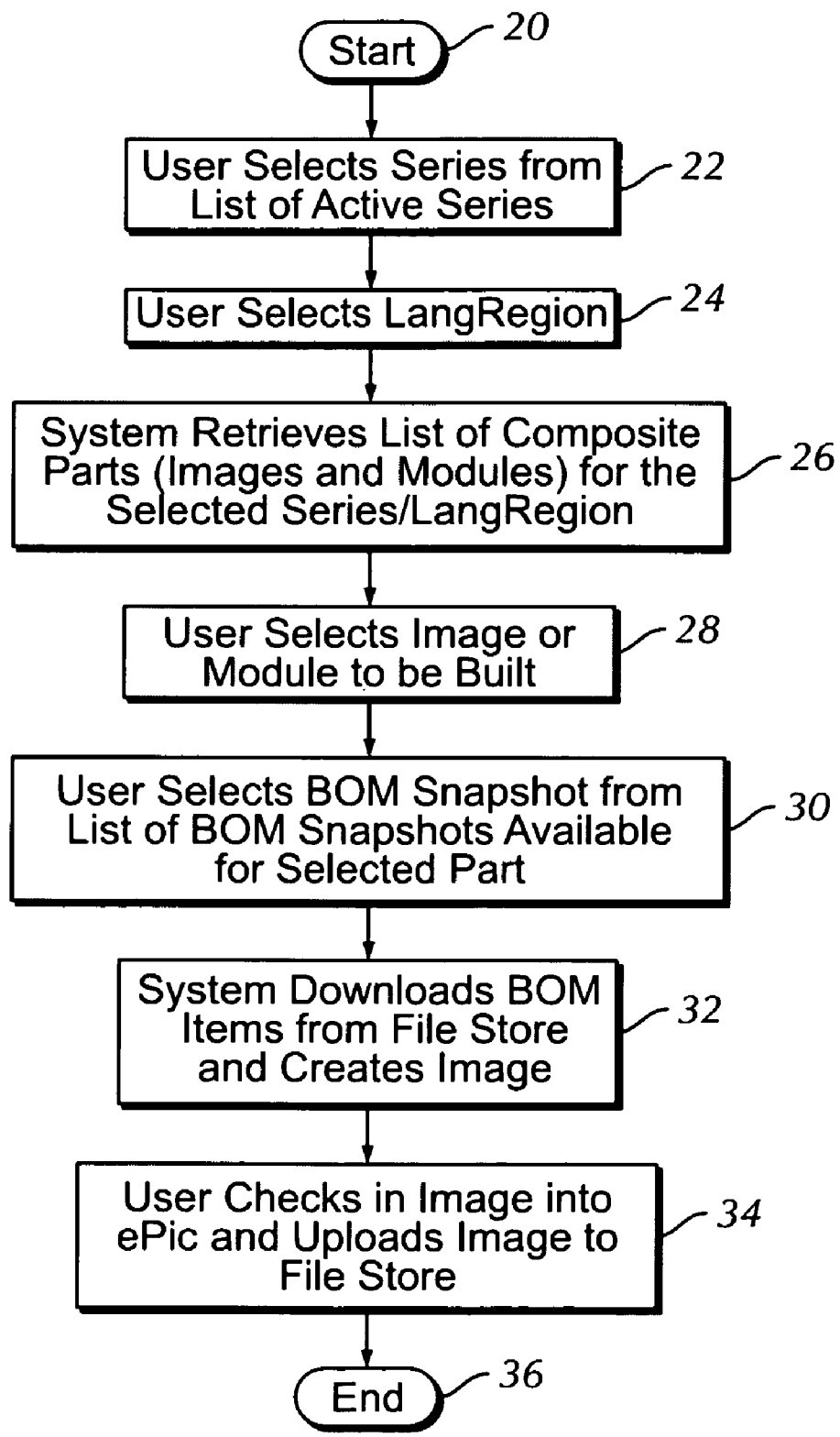
FIG. 19 is a flow chart showing how BOM snapshots are generated, automatically at least in part, and entered into ePic.

Referring briefly to FIG. 19 out of turn, logic for creating BOMs is shown. Beginning at start state 20, a software developer or integrator selects a software series, discussed above, from a list of series. The series can include data on software that an end user ordinarily "sees", e.g., operating systems and configure to order/build to order (CTO/BTO) software options.

A human language and/or geographic region is selected at state 24 and then based on the selected language and region, at state 26 a processor in one or more of the enterprise computers 12 shown in FIG. 1 can retrieve a list of component parts, including images and modules. These component parts typically include software the end user ordinarily does not "see" such as operating system updates, device drivers, and utilities.

The software integrator then selects the image or module to be built at state 28, and at state 30 a BOM snapshot from a list is selected for the part selected at state 28. In response, a processor in one or more of the enterprise computers 12 shown in FIG. 1 then downloads, at state 32, BOM items from a file store that may be resident in the global database 18 shown in FIG. 1 to create an image to be loaded onto a computer to be vended. The image is checked in to the global database 18 at state 34 and uploaded to the file store, from whence it may be downloaded in the factory and loaded onto a computer to be vended. The process ends at state 36.

A detailed description of a non-limiting implementation of the invention follows below.

0 Project Objectives

0.1 Goals
- Enable a global software CTO process which can be used for all VAIO business styles (CTO, BTO, Retail).
- Redesign the software process from design through manufacturing to be a global process.
- Define a global modular software specification.
- Define a global recovery specification.
- Integrate the software and hardware design process.
- Shorten lead-time to market.
- Reduce engineering costs.
- Shift engineering resources from maintenance roles to value-add development roles.
- Maintain product quality in the new process.
- Create a flexible process and system.
- Automate tasks where appropriate to create greater accuracy and speed in activities.

0.2 Critical To Quality
- World-wide scalability.
- Global access to system (including third parties).
- Data portability.
- Multi-language handling for software items.
- Seamless interfaces to DB Hero.
- Turn-key factory deployment.

1 Dependencies and Assumptions

1.1 Dependencies
-

1.2 Assumptions
- LangRegion Specifications (Specs) in DB Hero will be reused between series.
- Software parts in DB Hero will be defined so that the "Part Name" and "Major Version" will be separate fields.
- No language/region specific information will be entered for parts into DB Hero unless royalty/licensing requirements differ by language/region for the given software part.

2 User Roles and Responsibilities

- Product Planner
    - Determines the VAIO hardware and software offerings to be made to customers.
- Program Manager
    - Works with product planners, sales and marketing, and engineering to produce a detailed product plan and offering strategy for each VAIO product series.
- Software Developer
    - Develops software to be included in VAIO product offerings.
    - Prepares software so that it may be delivered to the factory for installation on products.
- Software Integrator
    - Uses OPK (OEM Pre-installation Kit) in combination with build systems to prepare images.
    - Prepares data used in the factory to convert manufacturing bills of materials (BOMs) to a list of software items for installation.
    - Prepares data used to facilitate the software recovery by the customer in the event of a failure with their VAIO product.
- Project Test Lead
    - Person in charge of preparing test cases and test strategies for a series and/or project (project would be Windows beta or VAIO mouse – this concept is not managed by ePic).
    - Assesses defects and devises test strategies to ensure they are fixed.
- Test Lead
    - Tester in charge of an individual software release/component.
    - Maintain test cases as requirements change.
    - Resolves defects.
- Tester
    - Tests software deliverables to ensure quality product.
    - Identifies and tracks defects.
    - Reports quality status.
    - Sometimes maintains test cases as requirements change.
- Factory Engineer
    - Deploys the tools and software deliverables to the factory floor so that they may be automatically installed.
    - Collects data produced in the factory installation process and delivers it to a data warehouse.

- Customer
  - Makes hardware and software choices when placing an order for a custom product.
  - Initiates the recovery process in the event of a system failure.
  - The customer does not interact with the SIFD system directly.
- 3rd Party Developer
  - Checks current software releases.
- 3rd Party Factory Engineer/QA Tester
  - Downloads or receives software deliverables and tools.

3 Business Process

3.1 Hardware Design

Figure 2:
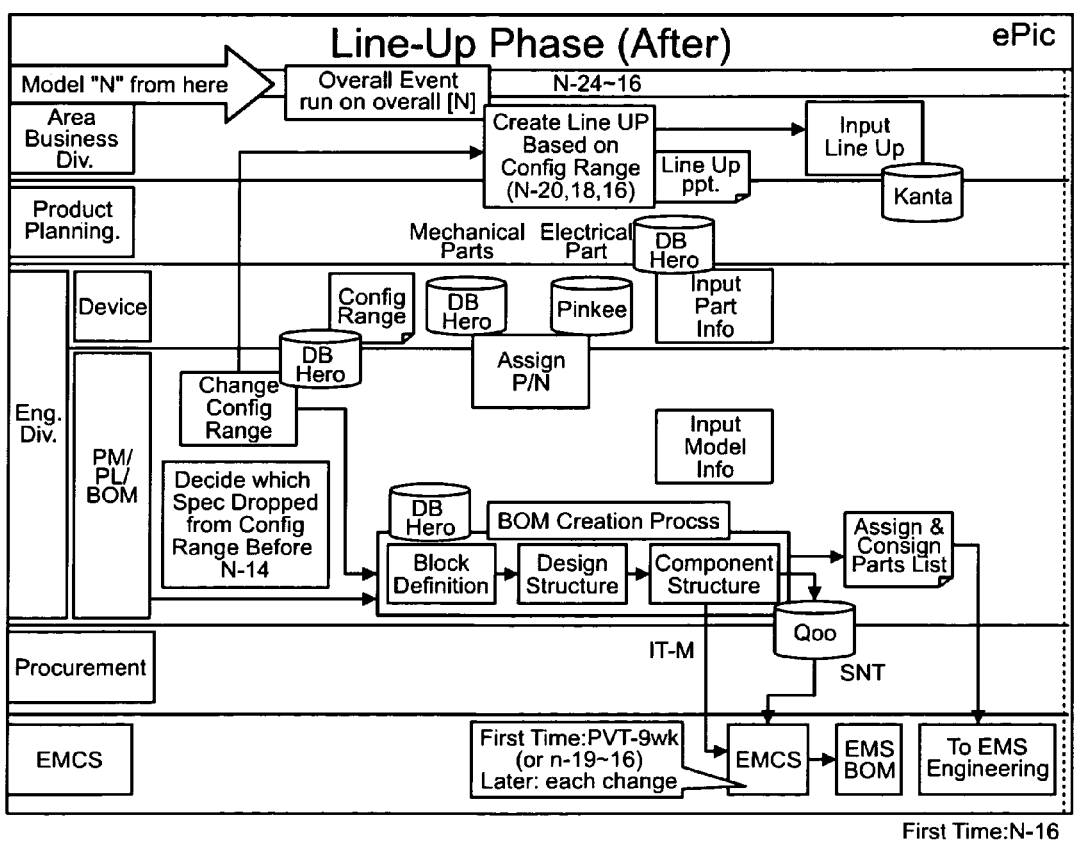
Figure 3:
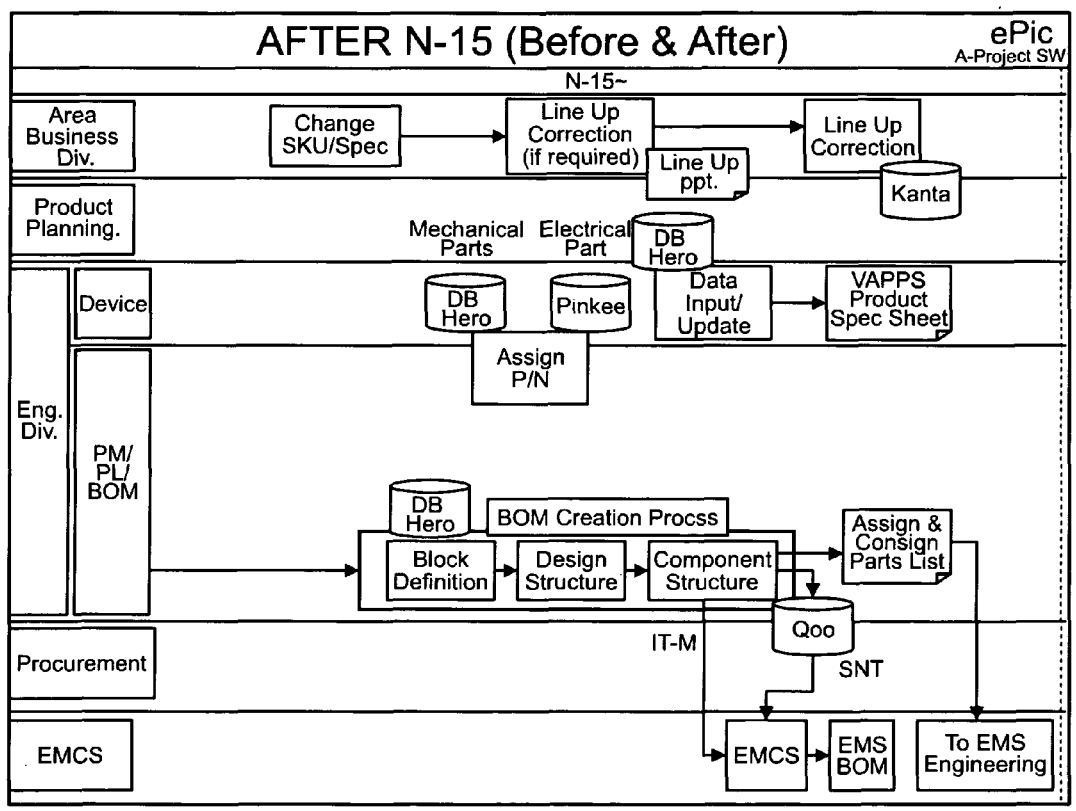

The Software Integration and Factory Deployment Project solution will operate within the context of the new design process specified as part of the DB Hero project. Figures 1 through 3 represent a non-limiting version of DB Hero process.

Figures 1-3 do not include software related tasks. One objective of the proposed invention is to integrate the software and hardware design processes.

Figure 4:
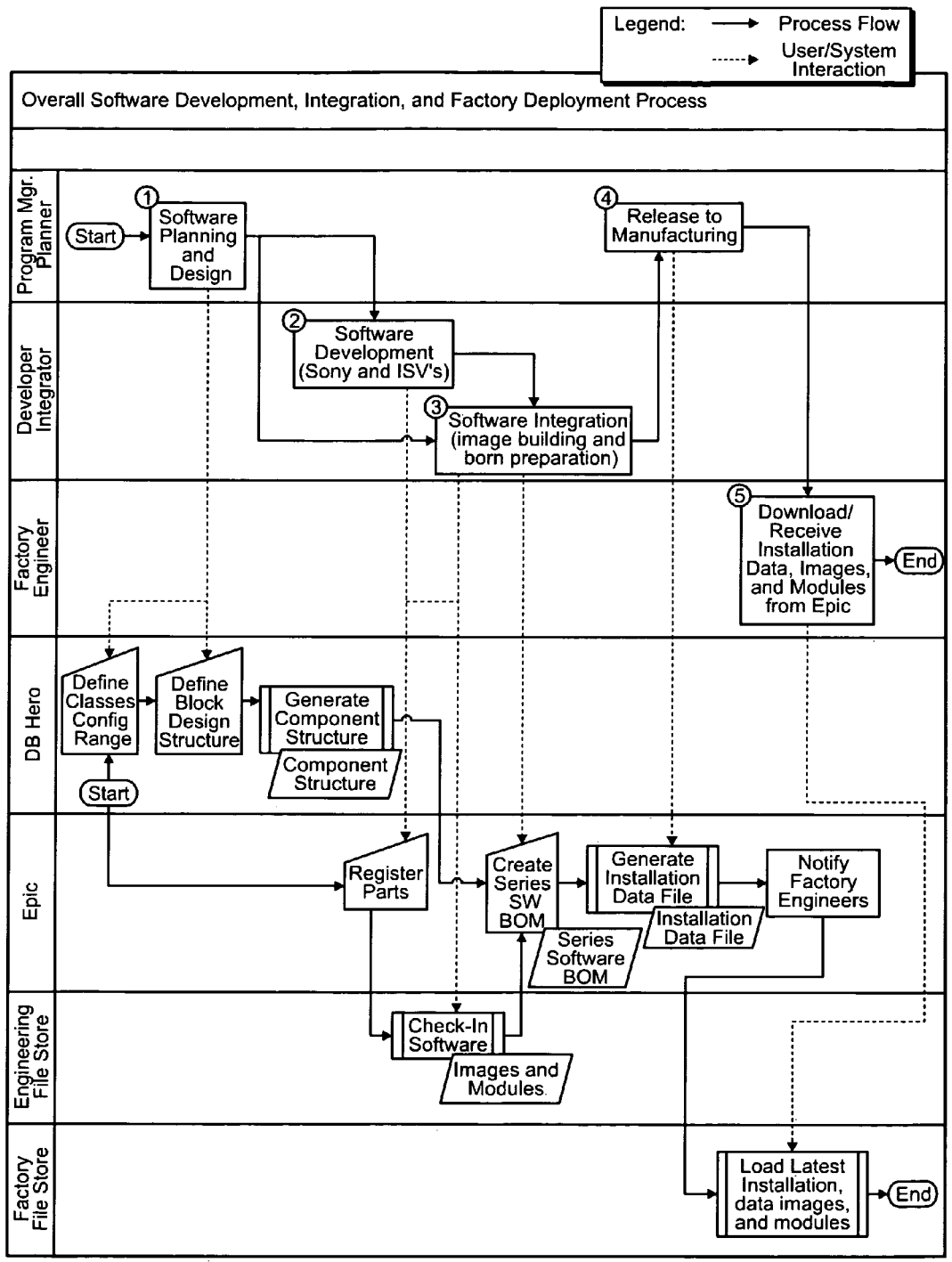
FIG. 4 is a flow diagram of non-limiting overall software development, integration, and factory deployment processes.

3.2 Overall Software Process – Now referencing the non-limiting process outlined in Figure 4.

1. Software Planning and Design
   a. *Description*
      i. Program Managers and Product Planners define software offerings.
   b. *Inputs*
      i. Previous cycle's software offerings.
      ii. New software offerings.
   c. *Outputs*
      i. Configuration (Config) Range and Component Structure.
   d. *System Interactions*
      i. Offering structure and planning parts are entered in DB Hero.
      ii. Planning Parts and Component Structure are transferred to ePic.
2. Software Development
   a. *Description*
      i. Register engineering parts and develop software.
   b. *Inputs*
      i. Software offerings.
      ii. Planning parts from DB Hero.
   c. *Outputs*
      i. Software applications, drivers, documentation, and other software items.

d. *System Interactions*
    i. Part registration and item check-in in ePic.
3. Software Integration
    a. *Description*
        i. Define image BOMs, build images, define media sets (factory and recovery), and prepare factory deliverables.
    b. *Inputs*
        i. Software items checked-in by developers.
    c. *Outputs*
        i. Images, Modules, and Series Software BOM.
    d. *System Interactions*
        i. Register parts.
        ii. Check image releases.
        iii. Create series software BOM.
        iv. Define recovery media.
4. Release to Manufacturing
    a. *Description*
        i. Planner or Program Manager issues a RTM for a series/region.
    b. *Inputs*
        i. Series software BOM.
    c. *Outputs*
        i. Installation data file. RTM'ed image and module releases.
        ii. RTM Notification.
    d. *System Interactions*
        i. RTM is issued in ePic.
        ii. Installation data file is auto-generated in ePic.
5. Download installation data, images, and modules to factory
    a. *Description*
        i. Factory engineer downloads required files from ePic or receives them by disk.
        ii. Factory engineer deploys the files to manufacturing servers.
    b. *Inputs*
        i. Notification email of updated installation data.
    c. *Outputs*
        i. Factory has up to date BOM information and all required images and modules.
    d. *System Interactions*
        i. Factory engineer downloads or receives latest version of installation data file.
        ii. If the factory receives files by network, the factory file store system automatically downloads required images and modules and removes obsolete files.
        iii. If the factory receives files by disk, the factory engineers load the files manually into the local factory file store.

3.3 Planning

Figure 5:
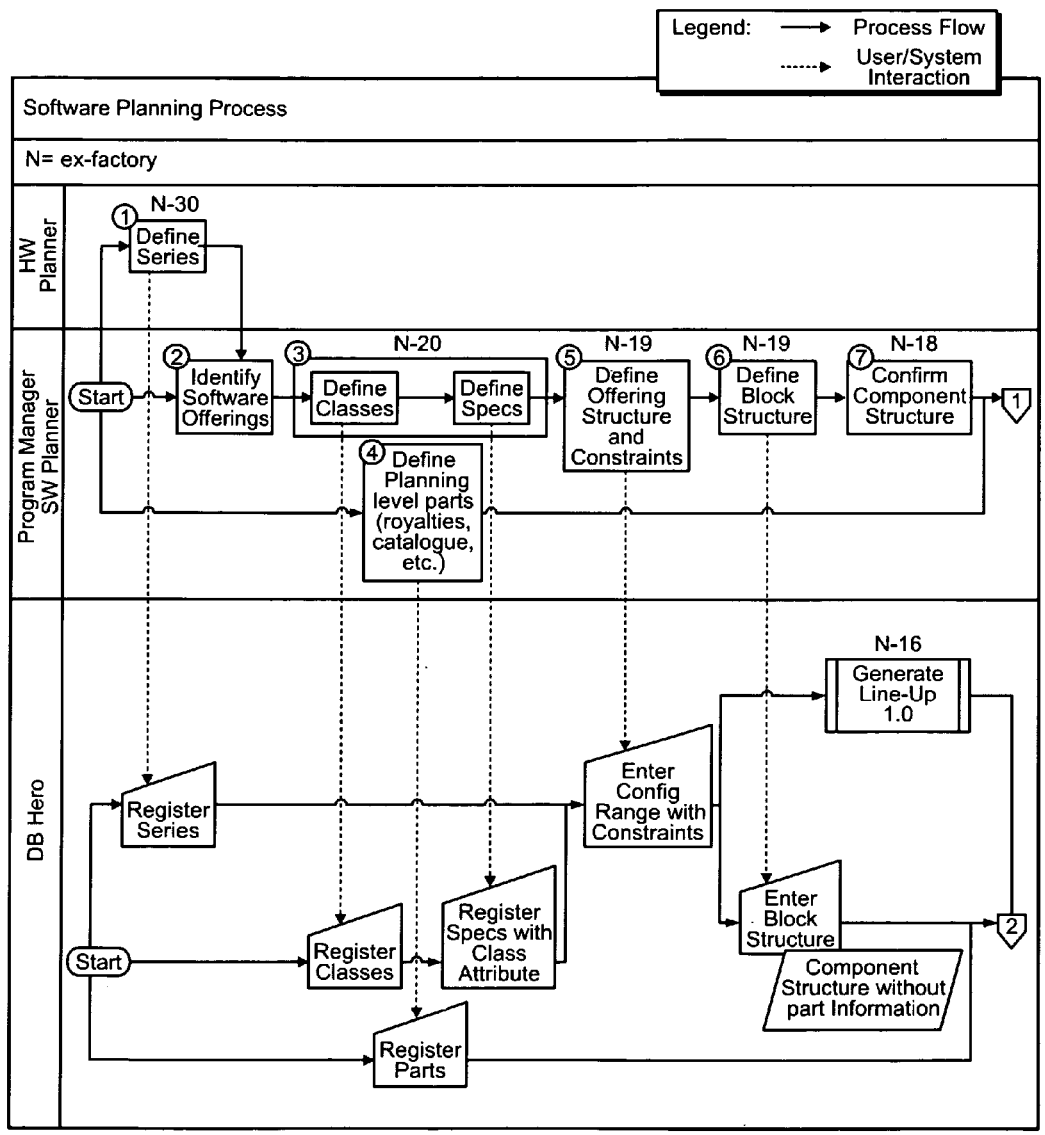
FIG. 5 is a flow diagram of a non-limiting software planning process.

*The process outlined in the non-limiting diagram of Figure 5 may be carried out in the DB Hero system. This process describes how the software and hardware design processes are integrated in DB Hero.*

*The process definitions are tailored to capture details relevant to SIFD only. Details of the hardware design process are not captured here.*

*This process describes how the software and hardware design processes are integrated in DB Hero.*

1. Define Series
    a. *Description*
        i. Hardware planners define the series code names and numbers for a given sales cycle.
    b. *Inputs*
        i. The list of new product series to be offered for a given sales cycle.
    c. *Outputs*
        i. Series prototype numbers.
        ii. Series code-names.
    d. *System Interactions*
        i. Series information is entered into DB Hero.
2. Identify Software Offerings
    a. *Description*
        i. The planner or program manager defines the software strategy for a given sales cycle. This strategy does not yet specify which software offerings will be made at a series level.
        ii. Sony and $3^{rd}$ party software offerings that may be carried over from a previous cycle are identified.
        iii. New Sony and $3^{rd}$ party software offerings are identified.
        iv. Updates to existing specifications are made if required.
        v. New specifications are added to classes if required.
    b. *Inputs*
        i. Previous cycle $3^{rd}$ party vendor software items.
        ii. Previous cycle Sony software items.
    c. *Outputs*
        i. The tentative list of $3^{rd}$ party and Sony software offerings for the given sales cycle.
    d. *System Interactions*
        i. None.
3. Define Classes and Specifications
    a. *Description*
        i. A "Class Definition Committee Meeting" is held multiple per year. The purpose of each meeting will be to define the software classes and their contents (specifications) to be used two sales cycles later. Hardware classes are defined separately.
  ii. The range of potential software offerings is defined for the given sales cycles as a set of classes and specifications. Offerings for individual product series will not be defined at this point.
  iii. The classes and specifications defined are global and commonly used across all regions. The class structure captures how the various software items will be offered to the customer.
  iv. Specifications for individual software items, if known, are identified and associated with classes.
  b. *Inputs*
    i. Previously defined classes and specifications.
    ii. New class definition ideas.
  c. *Outputs*
    i. Class Names.
    ii. Specification Names (e.g. class contents).
    iii. Class/Specification relationships.
  d. *System Interactions*
    i. A DB Hero administrator enters the classes into DB Hero. Users cannot input classes due to limitations of DB Hero Software.
    ii. A Product Planner or Program Manager enters specification information and class/specification relationships into DB Hero.
4. Define Planning Level Parts (e.g. royalties, catalogue, etc.)
  a. *Description*
    i. Software offerings are broken down into individual parts. Offerings which have varying royalty, licensing, or catalogue requirements must be broken up into discrete items.
    ii. These parts will be associated with classes and specifications during the block definition process at a later time.
    iii. These parts will later be used in ePic to help create SW BOMs.
  b. *Inputs*
    i. Software offerings.
    ii. Royalty, licensing, and catalogue requirements.
  c. *Outputs*
    i. List of software parts.
  d. *System Interactions*
    i. The parts identified are registered in DB Hero.
5. Define Offerings Structure and Constraints
  a. *Description* i. Software offerings (classes and specifications) are associated with individual series. The resulting structure is called the Config Range. The Config Range is global in scope and contains all product offerings, both hardware (HW) and software (SW), for all regions.

ii. Constraints on the offering range are identified as necessary for engineering or business reasons. These constraints are also global in scope; they do not reflect regional constraints. Regional constraints will be implemented in regional CTO sales systems or implicitly included in fixed configurations defined from the Config Range.

b. *Inputs*
   i. The software offerings (classes and specifications) identified for the given sales cycle.
c. *Outputs*
   i. Offering strategy, structure, and constraints, series by series.
d. *System Interactions*
   i. The classes selected are associated with a series and are entered in DB Hero resulting in the Config Range.
   ii. Constraints are defined in DB Hero as rules against the Config Range.

6. Define Block Structure
    a. *Description*
       i. Block structure definitions are used to generate the component structure. Users group classes into blocks and define which classes are dependent on each other and which blocks are "base blocks."
    b. *Inputs*
       i. Config Range for each series.
    c. *Outputs*
       i. Block structure of the classes for a given series.
       ii. Component Structure without parts.
    d. *System Interactions*
       i. The blocks defined are entered in DB Hero.
       ii. Classes are associated with the blocks per the defined block structure in DB Hero.
       iii. "Dependency" and "Base Block" flags are set as required.

7. Confirm Component Structure
    a. *Description*
       i. Program Manager or Product Planners confirm components without parts whether these components are made in just proportion - without exaggeration or omission - for their region.
       ii. Confirmation of components is done by each region.
    b. *Inputs* i. Component Structure without parts.
c. *Outputs*
i. Confirmation List.
d. *System Interactions*
i. None.

Notes:
1. DB Hero series can be made "cycle-less" by adding an additional class specifying product cycle or software revision for integrators to manage software offerings from series to series.

Figure 6:
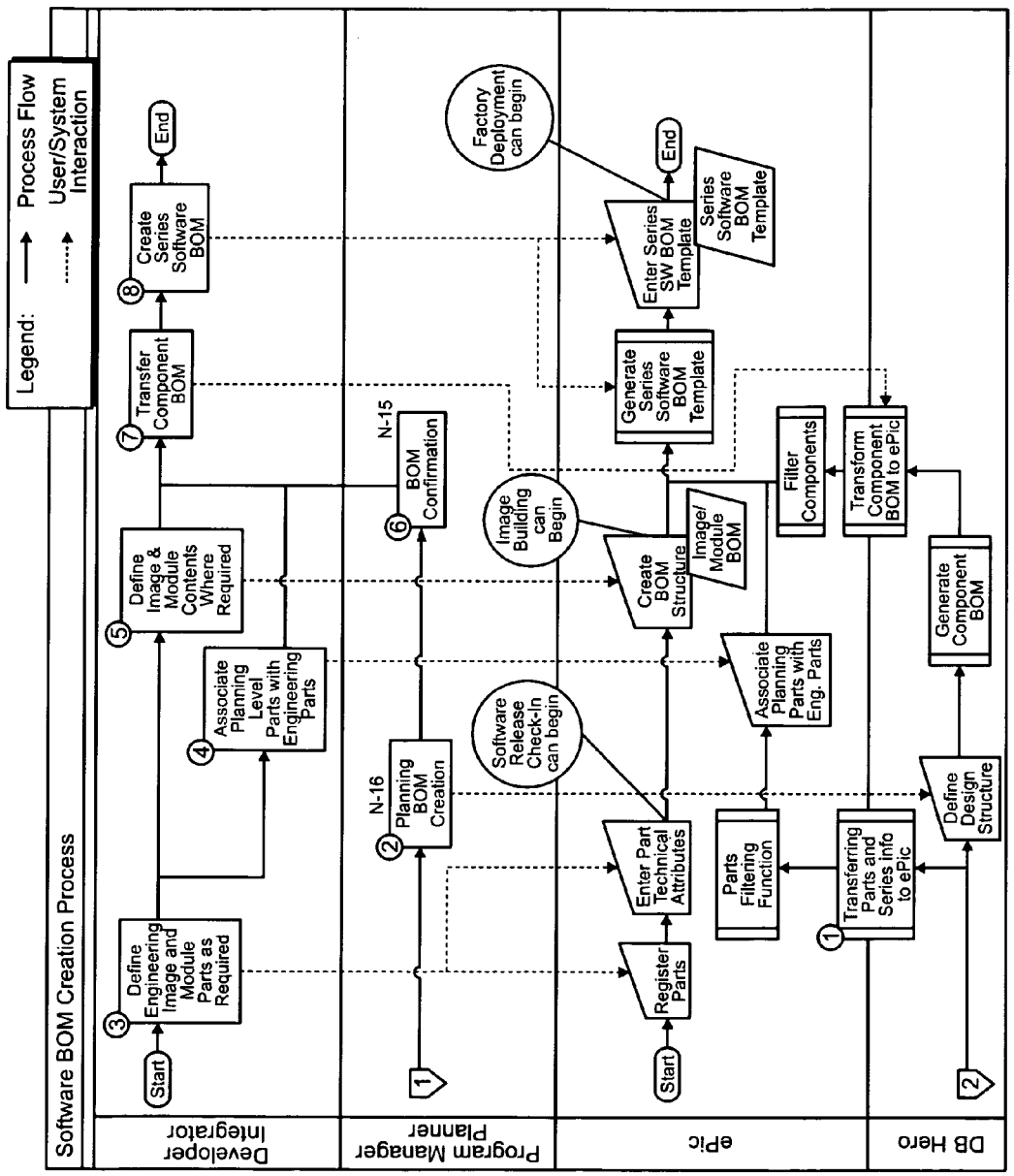
FIG. 6 is a flow diagram of a non-limiting bill of materials (BOM) creation process.

3.4 Engineering Software BOM Creation – *Now referencing the non-limiting process outlined in Figure 6.*

1. Transfer Parts and Series info to ePic
   a. *Description*
      i. The parts and series defined DB Hero are transferred to ePic.
   b. *Inputs*
      i. Series and Parts registered in DB Hero.
   c. *Outputs*
      i. Series and Planning Parts registered in ePic.
   d. *System Interactions*
      i. Scheduled system process and/or user initiated process.
2. Planning BOM Creation
   a. *Description*
      i. Parts required for each block are added to the block structure for a series. The parts are assigned to each class/specification pair in a block based on which parts are required for that option. This structure is called the "Design Structure."
      ii. When the Design Structure is complete, DB-Hero generates the Component BOM, e.g. Component Structure, for the series.
   b. *Inputs*
      i. Block Structure.
      ii. Parts.
   c. *Outputs*
      i. Component Structure with parts.
   d. *System Interactions*
      i. Parts are associated with specs via a block/spec pivot table DB Hero.

3. Define engineering image and module parts as required
   a. *Description*
      i. Developer or integrator defines engineering parts in ePic as required. ePic engineering parts can include many things, including images, modules, recovery media sets, documentation, etc.
      ii. Developer defines technical attributes of each part. (See ePic attributes below for more details.)
      iii. Developer optionally specifies the target series for this part. One or more target series may be specified.
      iv. Developer specifies the languages to be supported by this part.
      v. Developer specifies dependencies between this part and other parts.
      vi. Developer provides installation instructions, including installation order.
      vii. Once these parts have been fully registered in ePic, associated software releases for the standalone parts can be checked-in.
      viii. Composite parts, e.g. images, multipart modules, and recovery media, will require BOMs to be created before automated building can begin.
   b. *Inputs*
      i. Information from hardware engineers, software engineers, and planners.
   c. *Outputs*
      i. List of parts with their associated attributes and target series/language information.
   d. *System Interactions*
      i. Parts, attributes, and target series/language information is entered into ePic via user interface.

4. Associate planning level parts with engineering parts
   a. *Description*
      i. Developer/Integrator associates planning parts from DB Hero with one or more engineering parts defined in ePic.
      ii. This activity is done for any planning parts that correspond to ePic engineering parts.
      iii. These associations will be used later to generate the "Series Software BOM".
   b. *Inputs*
      i. DB Hero part list (planning parts).
      ii. Engineering parts as defined in ePic.
   c. *Outputs*
      i. Planning to engineering part associations.

d. *System Interactions*
  i. The associations will be created via ePic user interface.
5. Define image & module contents where required
   a. *Description*
      i. Developer/integrator creates individual image/module BOMs by defining relationships between parts. The Engineering Parts to be included in a given image or module are specified as the children of the top level part.
   b. *Inputs*
      i. Parts completely defined in ePic.
   c. *Outputs*
      i. Image/module BOMs.
   d. *System Interactions*
      i. Developer/Integrator creates BOM structures in ePic using functions specific to each part type, e.g., "Image Planner", "Media Planner", "Module Planner."
6. BOM Confirmation
   a. *Description*
      i. Program Managers or Product Planners confirm component structure.
      ii. Confirmation of component structure is done by each region.
   b. *Inputs*
      i. Component Structure, including parts.
   c. *Outputs*
      i. Confirmation list or minutes of meeting.
   d. *System Interactions*
      i. None.
7. Transfer Component BOM to ePic
   a. *Description*
      i. The component BOM for a given series is transferred to ePic.
   b. *Inputs*
      i. DB Hero Component BOM.
   c. *Outputs*
      i. Component BOM registered in ePic.
   d. *System Interactions*
      i. Scheduled system process and/or user initiated process.
8. Create Series Software BOM
   a. *Description*
      i. The "Series Software BOM" is a detailed BOM containing all the software releases assigned to a given product series and their relationship to DB Hero Component part numbers. It represents all the software releases (image, module deliverables) that could be installed on a unit and *not* the software BOM for a specific configuration.
      ii. This BOM is initially generated automatically based on the target information of engineering parts, engineering part associations with planning parts, and the DB Hero Component BOM. The user can then make changes before the BOM creation process is complete.
      iii. This data will be combined with recovery and installation data to create an installation data file for the factory.
      iv. After initial generation, this BOM may be manually modified in the system to manage exceptions/limitations of software releases that are not covered by basic assignment to series and languages or DB Hero constraints.
  b. *Inputs*
      i. Image/module target series information.
      ii. Planning part/engineering part associations.
      iii. DB Hero Component BOM.
  c. *Outputs*
      i. Series Software BOM.
  d. *System Interactions*
      i. User will create Series SW BOM using a wizard.
      ii. Series Software BOM may be edited via ePic UI.

Figure 7:
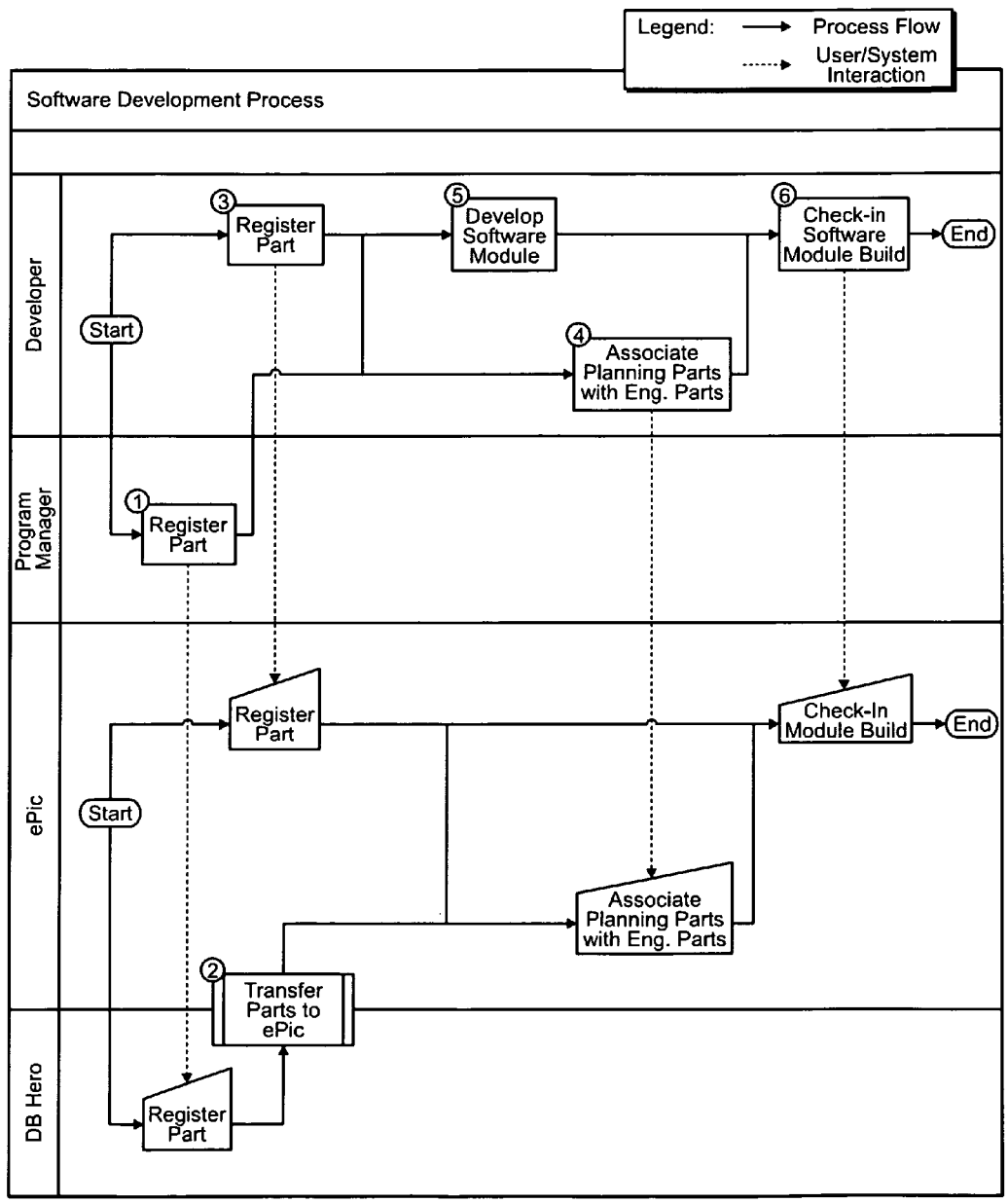
FIG. 7 is a flow diagram of a non-limiting software development process.

3.5 Software Development - *Now referencing the non-limiting process outlined in Figure 7.*

1. Register DB Hero Part
   *See section 7.3, step 4.*
2. Transfer Parts to ePic
   *See section 7.4, step 1.*
3. Register Part (ePic)
   *See section 7.4, step 3.*
4. Associate Planning Parts with Engineering Parts
   *See section 7.4, step 4.*
5. Develop Software Module
     a. *Description*
         i. Software Developer codes software module.
     b. *Inputs*
         i. Part definition and technical attributes as specified in ePic.
     c. *Outputs*
         i. Packaged software module with all required installation scripts.
     d. *System Interactions*
         i. None.
6. Check-in Software Module
     a. *Description*
         i. Developer checks-in a software build.
         ii. Developer updates technical attributes as required. These attributes include installation details, supported languages, and other technical information about the release.
      iii. Developer logs release notes.
- b. *Inputs*
  - i. Packaged software module with all required installation scripts.
- c. *Outputs*
  - i. Module is stored in the ePic file store.
  - ii. Technical information and release notes stored in ePic.
- d. *System Interactions*
  - i. The module check-in procedure will be initiated via ePic user interface or client utility.
  - ii. Files will be uploaded to a local file store, should they be available. If the files represent a module or application, they will be replicated automatically to other file stores. If files represent an image, they will not be replicated to other file stores unless other system users request the replication.

Figure 8:
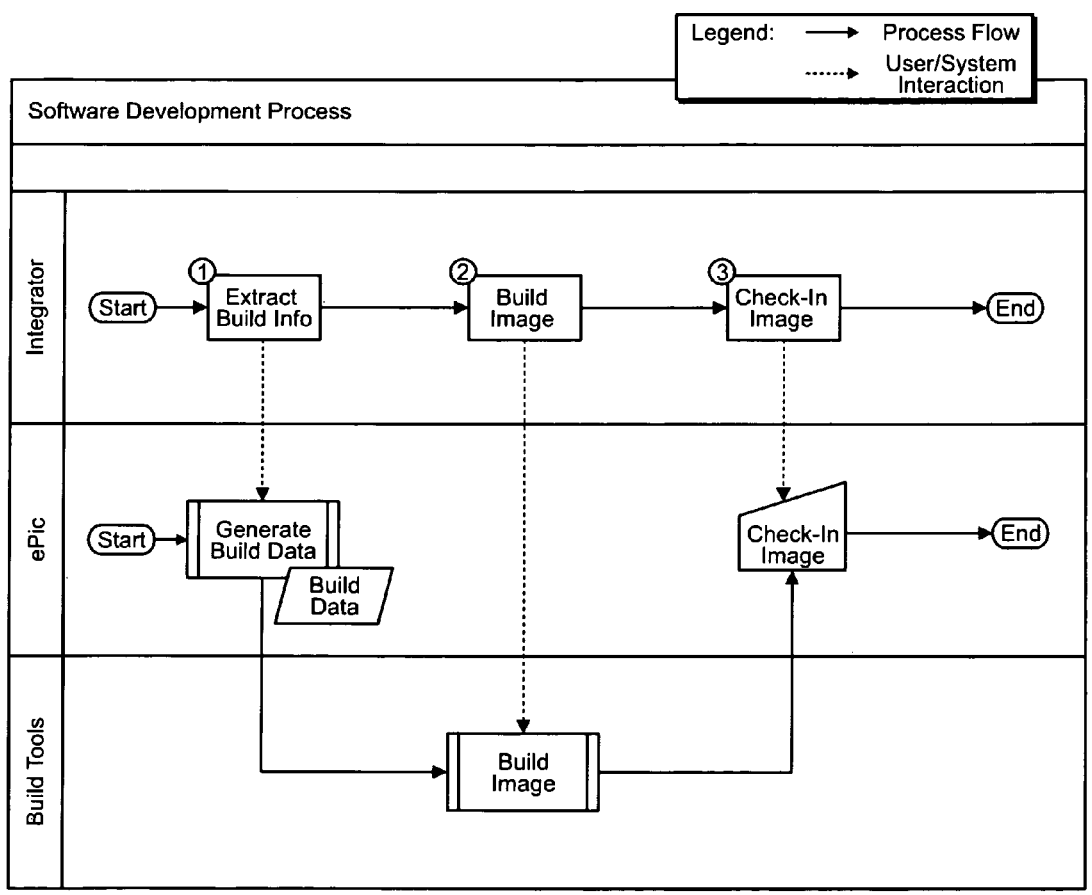
FIG. 8 is a flow diagram of a non-limiting software integration process.

3.6 Software Integration - Now referencing the non-limiting process outlined in Figure 8.

*ePic system interface can engage each regional build tool implementation.*

1. Extract Build Info
   a. *Description*
      i. Integrator initiates build process. Build tools gets build data from ePic to be used as input to the build tools.
   b. *Inputs*
      i. ePic image BOM and technical attributes.
   c. *Outputs*
      i. Build data formatted generically.
   d. *System Interactions*
      i. Each regional build system will interface with ePic to obtain image BOMs and software parts.

2. Build Image
   a. *Description*
      i. Image is constructed using build tools.
   b. *Inputs*
      i. Build data extracted from ePic.
   c. *Outputs*
      i. Image files and additional data to be stored in ePic.
   d. *System Interactions*
      i. None.

3. Check-in Image
   a. *Description* i. Integrator checks-in image files to ePic.
b. *Inputs*
    i. Image files and additional data to be stored in ePic.
c. *Outputs*
    i. Image files are store in the ePic file store and relevant data is updated.
d. *System Interactions*
    i. Information required for check-in will be entered manually into ePic via UI or supplied by the build system via an interface to ePic.
    ii. Image files are uploaded to local file store as part of check-in function.

3.7 Test Management and Defect Tracking

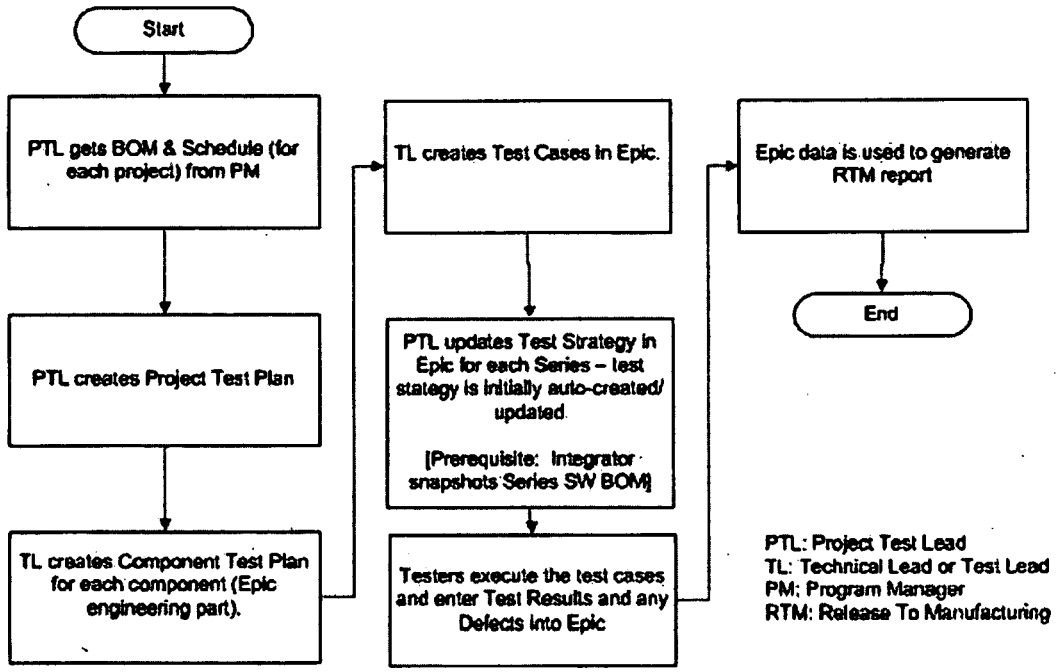

3.8 Factory Deployment

Figure 9:
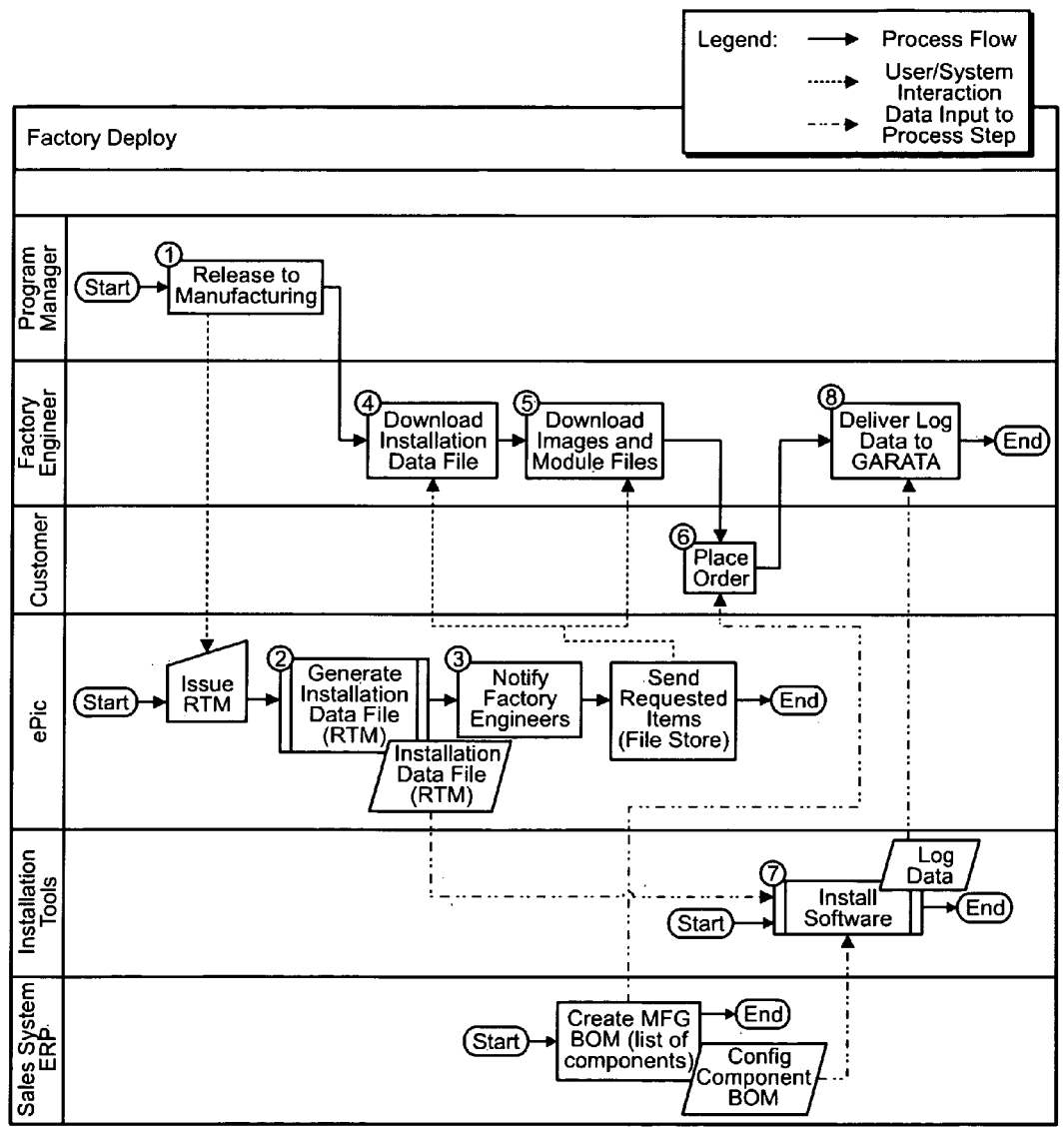
FIG. 9 is a flow diagram of a non-limiting factory deployment process.

3.8.1 Online Factory Deployment Process – Now referencing the non-limiting process outline in Figure 9.

1. Release to Manufacturing
    a. *Description*
        i. Program Manager releases a series to manufacturing. This is done at for a Series/LangRegion combination.
        ii. The system performs a number of sanity checks:
            1. Ensure that all SW releases are Golden Master or Release Candidates.
            2. Ensure that releases exist in the system for the selected LangRegion.
    b. *Inputs*
        i. Series SW BOM.
    c. *Outputs*
        i. New snapshot of RTM'ed Series SW BOM.
    d. *System Interactions*
        i. PM issues RTM in ePic.
2. Generate Installation Data File
    a. *Description*
        i. The system updates the Installation Data File for the RTM'ed releases.
    b. *Inputs*
        i. Series Software BOM.
        ii. Software release attributes.
    c. *Outputs*
        i. Updated installation data file.
    d. *System Interactions*
        i. None. This is an automated ePic process.
3. Notify Factory Engineers
    a. *Description*
        i. ePic notifies factories that installation data has been updated. Only factories that are affected should be notified.
    b. *Inputs*
        i. Changed Installation data file.
    c. *Outputs*
        i. Email notification message.
    d. *System Interactions*
        i. None. Automated ePic process.
4. Download Installation Data File
    a. *Description*
        i. Factory Engineer downloads the installation data file from ePic.

b. *Inputs*
   i. Notification email.
c. *Outputs*
   i. Latest installation data file.
d. *System Interactions*
   i. Initiate update of installation data file for the Series/LangRegion via file store function.

5. Download Image and Module Files.
   a. *Description*
      i. The factory file store is updated with the latest image and module files.
   b. *Inputs*
      i. Installation data file.
   c. *Outputs*
      i. New required images and modules are downloaded to local file store.
      ii. Obsolete images and modules are deleted from local file store.
   d. *System Interactions*
      i. Initiate update of image/module releases for the Series/LangRegion via file store function.

6. Place order (NOTE: This step does not involve interaction with ePic. It is depicted here to show the order process relative to factory deployment for a CTO sales process).
   a. *Description*
      i. Customer places an order on a sales system.
   b. *Inputs*
      i. Customer CTO choices or Fixed SKU selection.
   c. *Outputs*
      i. Configuration as a list of DB Hero components.
   d. *System Interactions*
      i. Customer places order in sales system.
      ii. Sales system or order management system passes order on to factory shop floor control system.
      iii. Factory shop floor system delivers list of components to installation tools.

7. Install Software
   a. *Description*
      i. The installation data file and list of components in a file for the configuration are provided as inputs to the installation tools.
      ii. The installation tools automatically install required software. See section 7.9 for further details.
   b. *Inputs*
      i. Configuration of DB Hero component part list.
      ii. Installation data file from ePic.

c. *Outputs*
   i. Log data file.
d. *System Interactions*
   i. Installation tools are executed via automated factory process.
   ii. Log file must be collected to a central location (should be implemented in factory process).

8. Deliver Log data to GARATA
   a. *Description*
      i. Log data file generated during the installation process is delivered to GARATA for loading into the database.
   b. *Inputs*
      i. Log file from installation process.
   c. *Outputs*
      i. Log file stored in GARATA or other data warehouse system.
   d. *System Interactions*
      i. Log file should be delivered to appropriate Sony server by FTP or other means.
      ii. Files should be loaded into a database.

Figure 10:
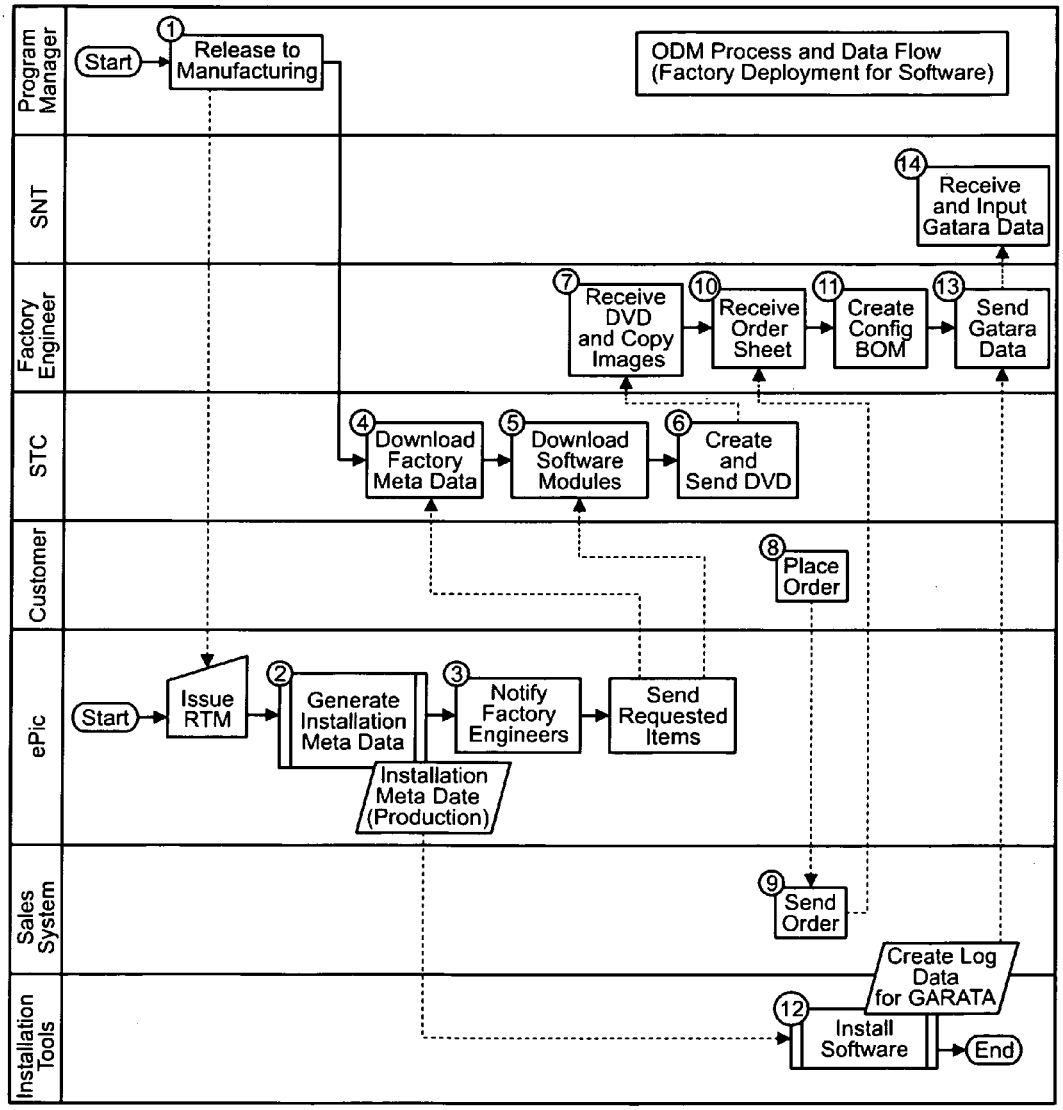
FIG. 10 is a flow diagram of aspects of a non-limiting factory deployment process.

3.8.2 Offline Factory Deployment Process is shown in Figure 10.

3.8.3 Running Change Process

This section describes how running changes would be issued using ePic. This is the VOA EPC process adapted to ePic functionality.

3.8.3.1.1 Purpose

To facilitate, review and implement any Engineering Processing Changes (EPC's) to projects after initial RTM has been issued.

3.8.3.1.2 Definitions

EPC-A: A running change in which existing software on the Series Software BOM RTM snapshot is patched in the manufacturing process. These are deployed as modules of type EPC. There are two types of EPC modules:
- Temporary – Applied during imaging and "thrown away". Not in HDD recovery partition.
- Permanent – Applied during imaging and "kept". Copied to the HDD Recovery Partition.

EPC-M: A running change in which a foundation image or module is added/changed/deleted to/from the RTM snapshot of a Series SW BOM.

3.8.3.1.3 Deliverables

- EPC Notification – an automatic email triggered when a program manager re-issues an RTM.
- EPC Executable – module checked-in to an ePic file store and distributed using online (network) or offline (media) delivery methods.

- Updated Installation Data File (IDF).
- Testing Result (Product Quality Group).
- Testing Result, if applicable (Manufacturing Quality Group).
- Date EPC was implemented (Manufacturing) – relevant data should be delivered to GARATA.

3.8.3.1.4 Participants
- Program Management Representative
- Software Integration Representative
- Quality Group Representative
- Sustaining Group Representative
- Application Champion or other applicable group representative
- Manufacturing Representative

3.8.3.1.5 Roles & Responsibility
1. Program Manager – Initiates EPC request, facilitates the documentation, posting and announcement of EPC release. Issues RTM in ePic to release the IDF and images/modules.
2. Software Integration Representative – Creates executable, checks in executable to ePic, announces release.
3. Quality Group Representative – Tests and verifies EPC on applicable models.
4. Manufacturing Representative – Tests and verifies EPC on applicable models, if applicable. Implements EPC and provides date of when EPC was implemented.

3.8.3.1.6 Process
1. Program Manager will email a software integration representative for an EPC request.
    a. Email should appropriate documentation: issue(s), resolution, applicable models.
2. Software Integrator will create EPC module or replacement image module. This may also be performed by the developer.
    a. New release will be checked-in to ePic.
    b. Appropriate changes will be made to the Series SW BOM template.
    c. New snapshot of the Series SW BOM Template will be created and flagged as a release candidate (RC).
    d. Quality group will be notified.
3. Quality member tests software module.
    a. Test strategies are updated.
    b. Testing is performed and test results logged.
    c. If testing fails Integrator is notified and steps from #2 repeated.
    d. If testing is successful all interested parties are notified.
4. Program manager issues an RTM for each applicable Series/LangRegion in ePic.
   a. System sends running change notification to applicable persons.
5. Installation data file and new release(s) are delivered to factory.
   a. Online or offline factory deployment methods documented above are used to deploy EPC.
6. If applicable, factory quality group tests new deliverables.
   a. If testing fails, interested parties are notified and steps from #2 repeated.
   b. If testing succeeds, interested parties are notified.
7. Factory Engineer deploys new deliverables are deployed in production environment.
   a. Data concerning which units have the EPC applied is collected (from installation tool log data) and delivered to persons responsible for loading data into GARATA.

*3.9 Installation*

Figure 11:
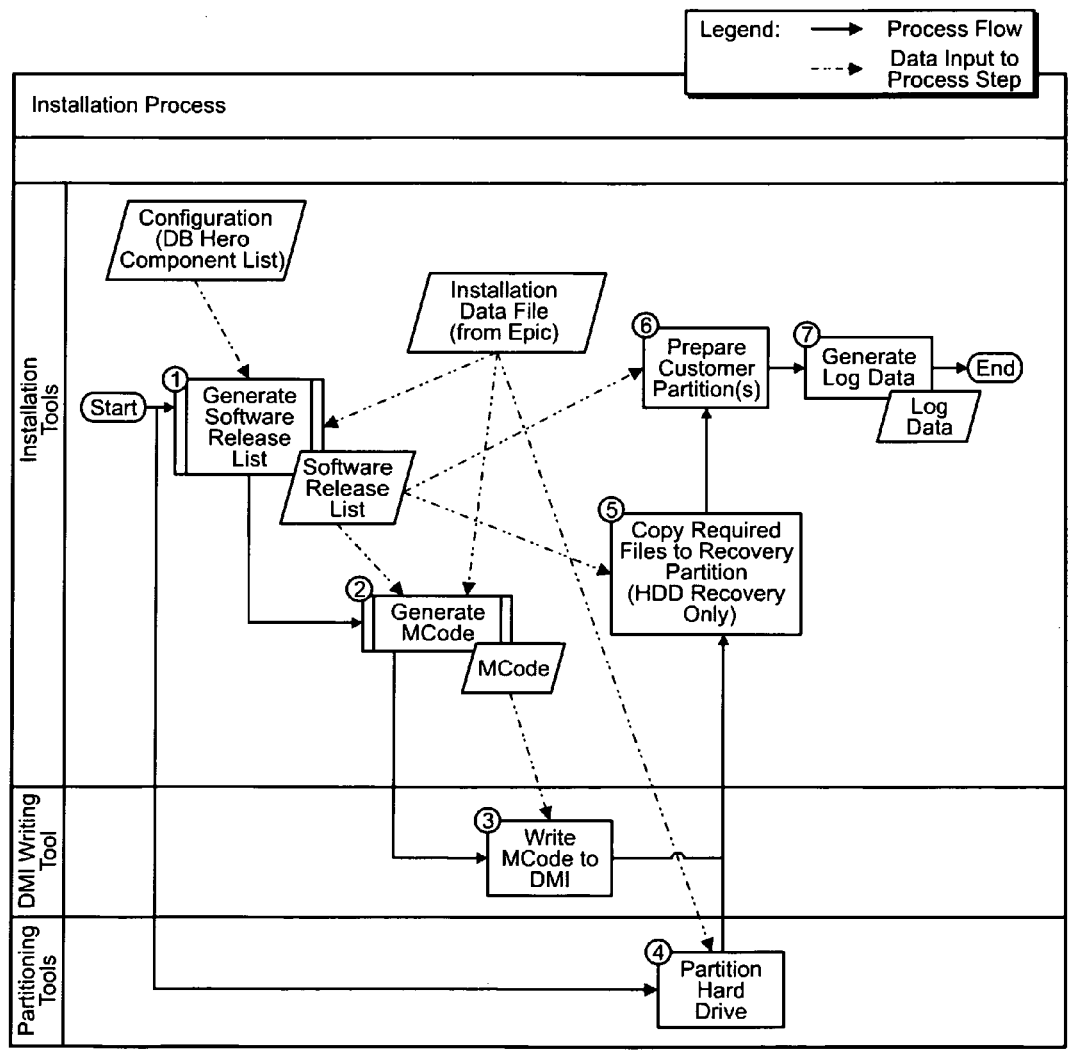
FIG. 11 is a flow diagram of a non-limiting software installation process.

The installation process and tools will be common for all QA, Factory, and Recovery applications and is in reference by the non-limiting process of Figure 11.

1. Generate Software Release List
   a. *Description*
      i. The list of DB Hero component part numbers representing a configuration are converted into a list of software releases.
      ii. *This step can be skipped and process can begin from step 2 if a valid software release list has been generated by other means.*
   b. *Inputs*
      i. Configuration (DB Hero component part list).
      ii. Installation data file from ePic.
   c. *Outputs*
      i. List of software releases.
   d. *System Interactions*
      i. Installation tools function.
2. Generate Recovery Key
   a. *Description*
      i. A list of software releases is used to generate a MCode.
   b. *Inputs*
      i. Software release list.
      ii. Installation data file.
   c. *Outputs*
      i. Encrypted MCode.
   d. *System Interactions*
      i. Installation tools function.
3. Write Recovery Key to DMI
   a. *Description* i. The Encrypted MCode is written to DMI.
        b. *Inputs*
            i. Encrypted MCode.
        c. *Outputs*
            i. MCode stored in DMI.
        d. *System Interactions*
            i. This is done using DMI writing tools.
4. Partition Hard Drive
    a. *Description*
        i. The hard drive is partitioned according to data in the installation data file.
    b. *Inputs*
        i. Installation data file.
        ii. Series and LangRegion .
    c. *Outputs*
        i. Hard drive is partitioned appropriately.
    d. *System Interactions*
        i. Installation tools output a list of partitions with sizes.
        ii. Partition tools are used to partition the hard drive as part of factory process.
5. Copy required file to recovery partition (HDD Recovery Only).
    a. *Description*
        i. If the series uses HDD Recovery partition, the recovery partition is prepared by the installation tools:
            1. The WinPE recovery partition is written to P1.
            2. Images modules and required data are copied to the recovery partition.
            3. Installation data file (or a portion of it) are copied to recovery partition.
    b. *Inputs*
        i. Software release list.
        ii. Installation data file.
    c. *Outputs*
        i. Recovery partition is completely setup.
    d. *System Interactions*
        i. Installation tools function.
6. Prepare Customer Partition(s)
    a. *Description*
        i. If the series uses HDD recovery, then the customer partitions are prepared by initiating the user recovery process in "unattended mode."
        ii. If HDD recovery is not used, the installation tools prepare customer partitions directly.
    b. *Inputs*
        i. Installation Data File.

ii. Software Release list.
            c. *Outputs*
                i. Customer partitions are prepared.
            d. *System Interactions*
                i. Installation tool function.
    7. Generate Log Data
        a. *Description*
            i. Data about the releases installed are stored in a file suitable for loading into GARATA or any other data warehouse.
        b. *Inputs*
            i. Data about installation activities.
            ii. Information about the unit (S/N, service tag, MCode, etc).
        c. *Outputs*
            i. File containing log information.
        d. *System Interactions*
            i. Creation of the log file is an installation tools function.
            ii. The log file must be collected and delivered to appropriate system as part of factory process.

Within this process flow, three use cases for installation tools will be supported:

1. Installation using a list of DB Hero component part numbers.
    a. Convert list of component part numbers to list of software releases.
    b. Generate MCode using list of software releases.
    c. Install software.
2. Installation using a MCode.
    a. Generate list of software releases using MCode.
    b. Install software.
3. Installation using a list of releases.
    a. Generate MCode (optional).
    b. Install software.

- Factory Installation will use method #1 only. For retail models the DB Hero component part number list can be prepared offline and distributed at RTM time.
- Recovery Media Sets (RDVD's or Fulfillment Media) can use method #2.
- HDD Recovery and recovery using customer created media can use method #3.
- Test system preparation can use all three methods.

3.10 Recovery

3.10.1 Recovery Media Preparation
1. Define recovery media engineering parts.
    a. *Description*
        i. Engineering parts for fulfillment recovery media are defined in ePic as "Recovery Media Sets." Engineering parts for user created recovery media are *not* defined.
        ii. *NOTE: ePic need not be aware of specific recovery media types (SRCD, ARCD, etc.). This can be managed by recovery media creation tools. ePic also need not support media layout functions; eventually only RDVD's with a single set of recovery tools and factory distribution media need be supported.*
    b. *Inputs*
        i. Series Software BOM snapshot.
        ii. Additional Engineering parts required for recovery media.
        iii. Media set specific information.
    c. *Outputs*
        i. Recovery media BOM in ePic.
    d. *System Interactions*
        i. User defines recovery media using "recovery media planner" in ePic.
2. Generate MCode Specification.
    a. *Description*
        i. System calculates MCode Specification. An MCode Specification (or MCode Spec) is a set of bit/release relationships. More than one release can be assigned to one bit.
    b. *Inputs*
        i. Series Software BOM.
        ii. Component/Release Mappings.
    c. *Outputs*
        i. MCode Specification.
    d. *System Interactions*
        i. Automated process with possible manual intervention.
3. Create Recovery Media.
    a. *Description*
        i. Recovery Media (AKA, Fulfillment Media or RDVD's) are created using external tools.
        ii. Tools use BOM's created in ePic.
        iii. Optionally, media images can be checked into file store as a software release.
    b. *Inputs* i. Recovery Media BOM and attributes as defined in ePic.
        c. *Outputs*
             i. Physical Recovery Media.
             ii. Optionally, media images.
        d. *System Interactions*
             i. Media creation tools interface with ePic to retrieve Recovery Media BOM and part attributes.
             ii. Media images optionally checked-in to ePic file store.

4 Interactions with other systems.

4.1 Overview ePic will interface with many systems and tools. This chapter summarizes those interfaces.

1. DB Hero
    a. DB Hero may be the global product data management system (PDM) for the VAIO business.
    b. ePic can gather data from DB Hero to be used in BOM creation and factory deployment.
    c. ePic can interface directly to DB Hero to retrieve needed data. No data need be fed back into ePic.
2. Image/Module Build Tools
    a. Tools used to build image (or module) releases and check them into the ePic file store.
    b. ePic will export BOM data to these tools and provide functionality for checking in binary releases.
    c. Data and functionality will be exposed to tools via an interface DLL.
3. Test System Preparation Tools
    a. Tools used to install software on systems to be used for testing.
    b. ePic will expose BOM data for pre-integration testing and installation data files for post-integration testing.
    c. Data and functionality will be exposed to tools via an interface DLL.
4. Media creation Tools/Systems
    a. Tools used to create recovery and factory media. Similar to image building tools.
    b. ePic will export BOM data to these tools and provide functionality for checking in media image releases.
    c. Data and functionality will be exposed to tools via an interface DLL.
5. VELSUN
    a. Global sustaining defect tracking system.
    b. ePic will provide functionality for exporting defects to this system.
6. VALSUN
    a. Software development defect tracking system.
    b. ePic will provide functionality for exporting defects to this system.

7. ESG
    a. VOE sustaining system.
    b. ePic will export software parts and BOM data and defects to this system.
8. OASIS
    a. VOA tool to create MCode writing floppy disks.
    b. Used by many Sony personnel to image systems with Recovery Media.
    c. ePic will pass simple parameters to this system using an HTTP GET/POST request.

*4.2 A Project Peripheral Components*

Several components external to the core ePic system will be developed by Neusoft, VOA, and VBD to facilitate these system interactions. Detailed requirements for these components are captured throughout chapter 9.

- ePic Interface DLL
    o Win32 library.
    o Detailed requirements in chapter 9.14.
- Installation Tools
    o Installation tools used in for testing, factory installation, and recovery media
    o Tools use the ePic installation data file, DB Hero component list, and/or software release list as inputs.
    o Tools output data suitable for import to GARATA.

- Test System Preparation CD
    o WinPE based CD may be used to install software releases managed by ePic on test systems to be developed by SIT.
    o Current US implementation, called MINDS (Modular Installation Network Download System), adapted to meet requirements.
    interacts with ePic using the ePic Interface DLL and utilize the Installation Tools.
- MCode Encoder/Decoder DLL
    o Mcode encoding/decoding libraries adapted to work with ePic Installation Data Files by SIT.
    o This library used by both ePic and Installation Tools for all MCode encoding/decoding requirements.

In addition to the above components, build systems interface with ePic and use ePic data (see chapter 12). SIT's build system (Magellan) will interface with ePic using the ePic Interface DLL. SDNA will use the build system provided by VOA.

5 Requirements

*5.1 Key Terms*

The following terms are important for understanding requirements in this section. Additional terms are defined in chapter 13.

LangRegion: Term used to describe the combination of an ISO-639 language code with an ISO-3166-1 country code. (For example, "es_SP", "es_MX", "jp_JP", "en_UK", "en_US", etc.). ePic and DB Hero will use LangRegion codes to define which language/region combo is to be supported by a software release.

Engineering Part: All software, documentation, and media sets are defined as "engineering parts" in ePic. Each engineering part can have many software releases associated with it.

Major Version: Attribute of an Engineering Part referring to the Major Version of a software item. Major Version is treated like an individual entity in ePic for certain functions.

Release: A release corresponds to a specific set of files and directories checked into ePic for a specific engineering part. Releases can satisfy one or more LangRegions.

Planning Part: ePic term for software parts defined in DB Hero.

Packaged Software: Software which has been packaged using WISE, Install Shield or some other installer technology (whether it was packaged by Sony or an ISV). Packaged Software is NOT the same as a module.

Foundation Image: Also known as "Base Image". This is a set of files includes the OS and any software items (drivers, utilities, etc.) the integrator chooses to include. Recovery related components (PAC files, data files, etc.) are also considered a part of the Foundation Images.

Module: Software packaged with WISE which is suitable for use by factory installation tools (the installation is silent/unattended; the installation can be verified by install tools; the module is BIOS locked; etc.). ePic will support three types of modules: "Module", "X-Module", or "EPC." "Modules" install in a single configuration. "X-Modules" are can install different configurations depending on target system characteristics. "EPC's" (Engineering Process Changes) are used for patches or running changes.

General

Requirements that apply to all aspects of the system are listed here.

5.1.1 Usability/Performance

| ID | Description | Comments | Priority |
|---|---|---|---|
| GEN-2.1 | All system data should be stored and presented in double-byte characters. | | |
| GEN-2.2 | All user interface prompts, command line tools, and online documentation will be in English only. | No internationalization of UI's! | |
| GEN-2.3 | System should perform adequately for users in remote regions so that work schedules are not impacted by network speeds. | | |
| GEN-2.3.1 | Page views via the Sony intranet shall take no more than 10 seconds per view. | | |
| GEN-2.3.2 | Uploads/downloads between file stores on the Sony intranet should occur at a minimum rate of 450 MB per hour (1 Mbps). | | |
| GEN-2.4 | Online user documentation should be available. | | |

5.1.2 Availability

| ID | Description | Comments | Priority |
|---|---|---|---|
| GEN-3.1 | The main system (ePic) must be available to all Sony users 24 hours a day via intranet. | | |
| GEN-3.2 | Manufacturing deliverables should be available to 3rd parties. | If network delivery is available, it is preferred, but an offline delivery method could also be used. | |
| GEN-3.2.1 | Only RTM'ed or Test RTM'ed items should me made available to 3rd party factories. | | |
| GEN-3.2.3 | Pre-release deliverables may be distributed to 3rd parties (for example, for validation purposes). Such deliveries should be limited to only what is required to ensure efficient use of resources. | | |
| GEN-3.3 | Release check-in functionality should be available to 3rd parties not on the Sony Network. | Per 2005-6-30 BRD feedback from VBD. | |

5.1.3 Support

| ID | Description | Comments | Priority |
|---|---|---|---|
| GEN-4.1 | Live support for the system must be available to all users 24 hours a day. | | |

5.1.4 Security

| ID | Description | Comments | Priority |
|---|---|---|---|
| GEN-1.1 | Authentication policy as specified by SGS. | The SGS operated "Common Authentication" system will be used for authentication for all users. | |
| GEN-1.1.1 | System should be accessible only to named users. | . | |
| GEN-1.2 | Authorization policy. | | |
| GEN-1.2.1 | System authorization will be role/resource based. See table in 9.2.4.1 for role to resource mappings. | | |
| GEN-1.2.2 | Authorization of the web-based application will be performed at a screen level. | | |
| GEN-1.2.3 | Users can be assigned to one or more roles. | | |
| GEN-1.2.4 | 3rd party users can only access data for series which they have been explicitly authorized to view. | | |
| | | Requirements to be provided by SGS. | |

5.1.4.1 Role to Resource Mapping

Each instance of an entity can also have an "owner list". Users with permissions to create/edit and entity can add other users to the owner list. Users on the owner list can edit that instance of the entity regardless of their assigned system role(s).

| Role / Resource/Function | PM/Planner | Developer | Integrator | Tester | Test Lead | Project Test | Factory Engineer | 3rd Party User* | Admin |
|---|---|---|---|---|---|---|---|---|---|
| BOM-1.1: Manage series information. | X | | X | | | | | | X |
| BOM-1.2: Manage planning parts. | X | X | X | | | | | | X |
| INT-1.12: Create/edit SKU's. | | X | X | | | | | | X |
| BOM-1.9: Create/edit sample SW BOMs (release lists). | | X | X | | | | | | X |
| BOM-1.3/DEV-1.1: Manage engineering parts. | | X | X | | | | | | X |
| BOM-1.4: Manage images. | | | X | | | | | | X |
| BOM-1.6: Create series SW BOM. | | | X | | | | | | X |
| BOM-1.7: Set dependencies. | | X | X | | | | | | X |
| BOM-1.8: Create/edit groups. | | | X | | | | | | X |
| DEV-1.2: Check-in SW releases. | | X | X | | | | | X | X |
| MFG-1.1/MFG-1.2: Issue RTM/Test RTM. | X | | | | | | | | X |
| Download installation data and binary data for SW releases. | X | X | X | X | | | X | X | X |
| Download latest DB Hero data into ePic. | | | X | | | | | | X |
| Add users, set privileges. | | | | | | | | | X |
| Manage 3rd party access. | | | | | | | | | X |
| Set champion of parts. | X | | | | | | | | X |
| Mass edit entities. | | | | | | | | | X |
| Create/edit Test Case. | | | | | X | X | | | X |
| Create/edit Test System. | | | | X | X | X | | | X |
| Create/edit Test Strategy. | | | | | X | X | | | X |
| Edit Test Case Result. | | | | X | | | | | X |
| Create/Edit Defect (except for status and resolution). | X | X | X | X | X | X | X | X | X |
| Create/Edit Defect (set status and resolution, except for "fix-verified" resolution). | | X | X | X | X | X | | | X |
| Create/Edit Defect (all attributes). | | | | X | X | X | | | X |
| Defined MDA/Benchmark categories/keys for test cases. | | | | | | | | | X |
| Edit miscellaneous IDF Data | | | X | | | | | | X |

- Third party users can only view data for Series they have been authorized to view (see section 9.13.1, requirement ADM-1.3, "Manage 3rd party data access.").
- For VBD/SDNA, software project leaders (SPL's) will be assigned both the "PM/Planner" and "Developer" roles.

5.1.5 Legacy data

| ID | Description | Comments | Priority |
|---|---|---|---|
| GEN-5.1 | For all groups who require any legacy data to be loaded, legacy data will be manually entered and software releases manually checked-in. | Data will be manually entered to assist in training users and quality testing.<br><br>ePic schema is significantly different from any existing systems. Data import may be impractical. | |

5.2 Planning

These are requirements for the "high-level planning" functions implemented in DB Hero that impact SIFD. Only business rules or functional requirements which are necessary to ensure proper SIFD functionality are captured here.

5.2.1 Usage Requirements

| ID | Description | Comments | Priority |
|---|---|---|---|
| | | Regional differentiation of software offerings will be managed in ePic. | |
| | Dad: Strike-throughs were here, don't know what it should be replaced with. | This is generically solved by implementing DB Hero "spec to component relationship" functionality (see section 9.6, INT-1.9). | |

5.2.2 Business Rules

| ID | Description | Comments | Priority |
|---|---|---|---|
| PLAN-2.1 | A special DB Hero Class (e.g., Product Cycle or SW Revision) must be introduced into a Series Config Range in order for the Series to be "cycle-less." | ePic must use this to revise software from cycle-to-cycle. | |

5.3 Engineering Software BOM Creation

Requirements for the "low-level planning" functions and software BOM creation in ePic are listed here.

The following is a graphical representation of an ePic Engineering Part to help readers understand requirements:

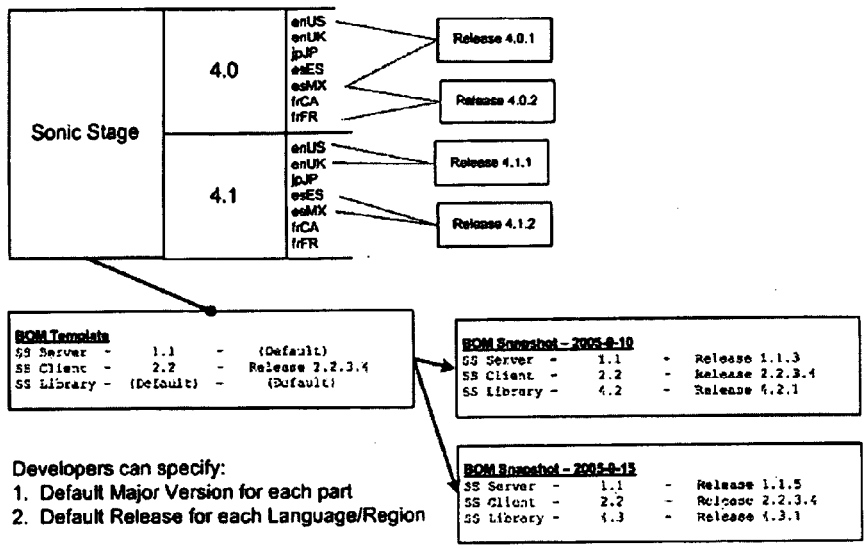

Developers can specify:
1. Default Major Version for each part
2. Default Release for each Language/Region

5.3.1 Usage Requirements

| ID | Description | Comments | Priority |
|---|---|---|---|
| BOM-1.1 | Manage series information. | | 1 |
| BOM-1.1.1 | A series can be designated as active or inactive to indicate whether the series is EOL. | | 1 |
| BOM-1.1.2 | Product cycle (SP05, SU05, FA05) must not be required to organize data in the system. Product cycle will be an attribute of a series. | Since many products can be in production for many cycles, the active/inactive designation will be used in place of product cycle. | 1 |
| BOM-1.1.3 | Set series attributes. | | 1 |
| BOM-1.2 | Manage planning parts. | | 1 |
| BOM-1.2.1 | Associate engineering parts with planning parts. Associations can be made to part name or a part name and major version. | This information will be used to generate a "Series Software BOM". | 1 |
| BOM-1.3 | Manage engineering parts. | | 1 |
| BOM-1.3.1 | Create/edit engineering part. | | 1 |
| BOM-1.3.2 | Set part type. The following part types will be supported by ePic:<br>1. Foundation Image<br>2. P1 (recovery) Image<br>3. Monolithic Image<br>4. OS Setup<br>5. Application<br>6. Driver<br>7. Online Documents<br>8. OS Add-on<br>9. Module<br>10. Internal Tools<br>11. BIOS/Firmware<br>12. Recovery Media Set<br>13. Factory Media Set<br>14. Other | See ePic attributes in section 10.4. | 1 |
| BOM-1.3.3 | Set part attributes. | See ePic attributes in section 10.4. | 1 |
| BOM-1.3.4 | Engineering parts can be composite parts, consisting of several other parts, or a single standalone part. | This applies to not just images, but modules and other part types as well. | 1 |

| ID | Description | Comments | Priority |
|---|---|---|---|
| BOM-1.3.5 | Engineering parts can be associated with planning parts (so that series associations can be made via the DB Hero Component BOM), or they can be manually associated with individual product series (for example, manual association would be made for hardware specific software items). | More fine grained associations are possible by editing the "Series Software BOM Template." LangRegion associations to releases will be handled at module check-in time. | 1 |
| BOM-1.3.5.1 | User may also specify "all series" so that the part would be used for all active series existing in the system at any moment in time. | So if new series are added after this is set, they would still pick up this part in their BOMs. | 1 |
| BOM-1.3.6 | The LangRegions to be supported by a part can be specified at part creation time. | . | 1 |
| BOM-1.3.7 | One or more software releases can be associated with each part. Each software release can be associated with one or more LangRegions. | | 1 |
| BOM-1.3.8 | For each LangRegion, one of the associated releases can be flagged as "default." The default release will be used for "Series Software BOM" creation. | The default release can be manually overridden after Series Software BOM Template generation (see BOM-1.6.2). | 1 |
| BOM-1.3.9 | Electronic data files for printed documentation can be defined as engineering parts and stored in ePic. No additional functionality specific to these items is required. | Per 2005-6-30 BRD feedback from VBD. | 1 |
| BOM-1.3.10 | Installation priority of the part can be specified relative to other part names/major versions as "BEFORE" or "AFTER." The system will not allow invalid installation order states (e.g., circular installation order relationships) to be defined. | Satisfies VBD QA WG requirements 1c.<br><br>Installation tools will calculate installation order for a set of modules at installation time. | 1 |
| BOM-1.3.11 | The Bios Lock ID (BLID) must uniquely identify a foundation image. This means that relationship between BLID and FI will be one-to-one. | Satisfies VBD Factory Install WG Requirement 1b. | 1 |
| BOM-1.3.12 | The user can specify whether parts are active or not. If a user sets a part "inactive" then the system will ignore/hide the part in any BOM creation activities. | | 1 |
| BOM-1.4 | Manage images/modules. Images and modules are engineering parts which can be final deliverables. | To be implemented as a "Part Registration" wizard. | 1 |
| BOM-1.4.1 | Set image/module type. | | 1 |
| BOM-1.4.2 | Create/edit image/module BOM Template. Each composite engineering part has exactly one BOM Template. | Composite parts only. | 1 |
| BOM-1.4.2.1 | Groups, Part Names, Part Major Versions, and/or Releases can be added to BOM templates. | | 1 |
| BOM-1.4.2.2 | Auto generate image/module BOM using target series attribute of parts and groups. User can edit auto-generated BOM before it is saved. | | 1 |
| | Perform Sanity checks:<br>• Ensure items included in template must not be installed individually (use planning part associations).<br>• Ensure dependencies are satisfied. | The first check is to alert users that items which are optional for a given series might be included in the foundation image. The system cannot know for sure from the DB Hero component structure, but it should indicate to the user that an eng. part has planning part associations. | 4 |
| BOM-1.4.2.4 | Releases flagged as "disabled" cannot be added to a BOM template. | Per review with SDNA 2005-9-14 (corresponding attribute REL-025 added). | 1 |
| BOM-1.4.3 | Snapshot BOM template (Freeze BOM). | NOTE: This requirement applies to Series SW BOM Templates in addition to image/module BOM Templates. | 1 |
| BOM-1.4.3.1 | A snapshot contains only software releases (unspecified releases on the template will be set to defaults). Snapshots *cannot* be edited manually. | | 1 |
| BOM-1.4.3.2 | All part information at the time of snapshotting is frozen in a snapshot. Changes made to the main data after snapshotting will *not* be reflected in the snapshot. | | 1 |

| ID | Description | Comments | Priority |
|---|---|---|---|
| BOM-1.4.3.3 | BOM snapshots are exposed to build tools via the build tool interface. | | 1 |
| BOM-1.4.3.4 | A BOM snapshot is retrievable as a file via ePic UI. | | 1 |
| | | Dropped. Satisfied by ePic "group" concept described in BOM-1.8.. | |
| | | | |
| BOM-1.6 | Create Series Software BOM. | | 1 |
| BOM-1.6.1 | System will generate a "Series Software BOM Template", which consists of the list of specific part names, major versions, groups and/or releases assigned to a series, using DB Hero component structure, planning part associations with engineering parts, and the properties of engineering parts. The system will show default value for unspecified items on the template. | See requirement BOM-1.8 for definition of "group". | 1 |
| BOM-1.6.2 | Edit "Series Software BOM Template". Releases can be edited manually. | This function allows special release dependencies/incompatibilities to be handled. | 1 |
| BOM-1.6.3 | The Series SW BOM will include mappings from one or more DB Hero components to one or more ePic software releases. See section 9.6, requirement INT-1.10. | Satisfies VBD QA WG requirement 1g. | 1 |
| BOM-1.6.4 | Once the Series SW BOM Template is complete, the user can snapshot the template. A snapshot contains only software releases (unspecified releases on the template will be set to defaults). Snapshots *cannot* be edited manually. | | 1 |
| BOM-1.6.5 | All part information at the time of snapshotting is frozen in a Series SW BOM snapshot. Changes made to the main data after snapshotting will not be reflected in the snapshot. | | 1 |
| | The system will indicate problems to the user when displaying the Series SW BOM template. Problems can be:<br>• Non-RC/GM releases.<br>• Target series information in conflict with planning part association.<br>• Dependencies not satisfied.<br>• No default releases available for a part.<br>• No releases available for a given language.<br>• Dependencies are not satisfied. | | 4 |
| BOM-1.6.7 | The system should not allow an "inactive" part/release to be added to a series SW BOM template. | Added per review with SDNA 2005-9-14. | 1 |
| BOM-1.7 | Dependencies between engineering part names and/or part name/major versions can be specified. | Satisfies VBD QA WG requirements 1a and 1b. | 2 |
| BOM-1.7.1 | Other parts can be selected and dependencies will be specified as "DO NOT CARE", "EXCLUDE", or "REQUIRED." | | 2 |
| BOM-1.7.2 | The system will not allow circular dependencies to be defined. | | 2 |
| | | Satisfies VBD QA WG requirements 1g.<br><br>Dropped per review session with VBD 2005-9-15. | |
| BOM-1.8 | Create edit groups. Groups are user defined lists of engineering part names, major versions, releases, or other groups. | This is an internal ePic concept intended to allow users to define re-usable collections of parts. This concept, if used properly, makes BOM creation more efficient. | 1 |
| BOM-1.8.1 | Groups can be added to composite part BOM templates. Changes made to group contents after group assignment to a BOM template will be reflected on the BOM template. | Note that groups are, for the most part, functionally equivalent to BOM templates. | 1 |

| ID | Description | Comments | Priority |
|---|---|---|---|
| BOM-1.9 | Create edit test software BOM. A test software BOM is a manually created list of *software releases* for a single configuration. The releases must be listed in proper order of installation (based on installation priorities specified in the system). | Per VBD review 2005-9-15: A facility for creating and sharing test software BOMs must be available in the system.<br><br>This function will be used by both developers and testers. It is the only way to create a software BOM in the system *before* a series software BOM has been prepared.<br><br>A test software BOM is, by definition, a snapshot. BOM templating functions will not be used for test BOMs. | 5 |
| BOM-1.9.1 | User can search for and select part names, part major versions, or releases to be added to a test BOM. System will select default release if user does not specify a specific release. | | 5 |
| BOM -1.9.2 | System should provide filtering capabilities to the user for selecting items for the test BOM. | | 5 |
| BOM -1.9.3 | System should examine dependencies of the items selected and automatically add releases to satisfy these dependencies. | | 5 |
| BOM -1.9.4 | User can download file containing the test BOM. | | 5 |
| BOM -1.9.5 | User can save the test BOM in the system, BOM can be given a name for later retrieval. | | 5 |
| | | | 3 |

5.3.2 User Interface Requirements

| ID | Description | Comments | Priority |
|---|---|---|---|
| BOM-2.1 | Part Registration Wizard. | Implements the Image and Module Planners. | 1 |
| BOM-2.1.1 | Set general part attributes. | | 1 |
| BOM-2.1.2 | Set type specific part attributes. | | 1 |
| BOM-2.1.3 | Set part dependencies and installation order. | | 1 |
| BOM-2.1.4 | Associate with planning part/set target series. | | 1. |
| BOM-2.1.5 | If part is a composite part, show BOM Template creation interface (optional). | | 1 |
| BOM-2.1.6 | BOM snapshotting function (optional). | | 1 |
| BOM-2.2 | Series Software BOM Builder (Wizard). | | 1 |
| BOM-2.2.1 | System generates the series software BOM and shows it to user with distinctive display of releases that fail sanity checks or are marked as special. | | 1 |
| BOM-2.2.2 | User can edit Series SW BOM. | | 1 |
| BOM-2.2.3 | User can snapshot Series SW BOM. | | 1 |
| BOM-2.2.4 | User can create Component/Release mappings (see INT-1.10). | | 1 |
| BOM-2.3 | Entity Editor. Access to all attributes of an entity in one place. | | 1 |
| BOM-2.3.1 | Screens must allow all attributes for each major system entity to be edited one screen. | The same functionality as the wizard is supplied for each entity type. | 1 |

5.3.3 Business Rules

| ID | Description | Comments | Priority |
|---|---|---|---|
| BOM-3.1 | Business Rule for Engineering Part Creation | | |
| BOM-3.1.1 | A new part should only be created for a major version release of software. Major version is defined as specification change. Iterative releases within a major release, to fix defects and such, are called Release Versions. | | |
| BOM-3.1.2 | A part name should include the name of the part only, in general terms. For example: Adobe Premiere Professional, VAIO Zone, Sonic Stage. The major version number is an attribute of the part, | | |

| ID | Description | Comments | Priority |
|---|---|---|---|
| | and can be concatenated for UI and reporting purposes. For example, a part can be created with the Part Name of "Adobe Premiere Professional" and the major version number of "7.1". The part becomes the concatenation of the part name and major version number: "Adobe Premiere Professional 7.1". | | |
| BOM-3.1.3 | Part names should not contain specific references to a series or CTO options. The following examples would not be acceptable: "Adobe Premiere 7.1 for IRX-3560" or "WinDVD 5.6 for Six Channel Speakers." | | |
| BOM-3.1.4 | Part names can only contain the characters: a-z, A-Z, 0-9, _, -, or . | Only printable ASCII characters (including space) should be allowed in part names. | |
| BOM-3.1.5 | Major Version Number is a text field, with the same character restrictions. | | |
| BOM-3.2 | Changes to DB Hero controlled entities must be made in DB Hero only and then propagated to ePic via interface. Entity attributes owned by DB Hero must, therefore, not be editable in ePic. | | |

5.3.4 Interface Requirements

| ID | Description | Comments | Priority |
|---|---|---|---|
| BOM-4.1 | Load series master from DB Hero. | | 1 |
| BOM-4.2 | Load parts master (planning parts) from DB Hero. | | 1 |
| BOM-4.2.1 | Certain classes of hardware parts (HDD's, CPU's, etc.) should not be filtered from the master parts list. If that is not possible, all hardware parts should be loaded and ePic should filter hardware parts from UI. | Hardware parts are required for Test/Defect management system functions. | 1 |
| BOM-4.3 | Load component structure from DB Hero. | | 1 |
| BOM-4.4 | Load updates to all previously loaded DB Hero data. | | 1 |
| BOM-4.5 | DB Hero interface behavior rules: | BOM-4.5.X applies to all DB Hero interface requirements. | 2 |
| BOM-4.5.1 | DB Hero BOM data can be manually loaded from into ePic (via ePic UI). Data updates should be performed using the most efficient means available. | [] | 1 |
| BOM-4.5.2 | Pre DB Hero release BOM data can only be loaded into ePic manually. Initial load of any BOM must be manual. | One button to update all DB Hero data for a series is ideal. | 2 |
| BOM-4.5.3 | After the DB Hero release, structure/part changes which generate an ECN are automatically implemented in ePic. Revision history is not kept. | Without ECNs manual load is the only possibility (except for series and parts, whose masters are synced regularly). | 2 |
| BOM-4.5.4 | ECNs can be requested by date range. ePic should periodically request all ECNs since last update automatically. | Update period should be a configurable ePic system option. | 2 |
| BOM-4.5.5 | Email and UI notifications will be produced for software integrators for the following changes to DB Hero BOMs:<br>• Any SW part (planning part) change on component BOMs.<br>• Any changes (HW or SW) to components used in component/release mappings.<br>• Changes to Config Range/Line-up. | [] | 2 |
| BOM-4.5.6 | DB Hero data will be loaded into ePic at most once per day, and at least once per week. | If users need up-to-date data, they can initiate a manual transfer via ePic UI. | 1 |

5.4 Software Development ePic requirements to support developers who use the system are listed here.

The detailed format for software modules is documented separately in a "Modular Specification".

5.4.1 Usage Requirements

| ID | Description | Comments | Priority |
|---|---|---|---|
| DEV-1.1 | Engineering part registration (developer specific requirements). | See "Software Engineering BOM Creation" for additional information concerning part registration. | 1 |
| DEV-1.1.1 | The set of LangRegions supported by the module must be specified. | | 1 |
| DEV-1.1.2 | The part can be associated with a planning part and/or target series. Neither is required (though warning should be issued if neither is selected). | See BOM-1.3.5. | 1 |
| DEV-1.2 | Check-in software release (non-image). | | 1 |
| DEV-1.2.1 | Developer must identify LangRegions supported by the software release to be checked-in. | | 1 |
| DEV-1.2.2 | Developer must indicate installation method and unattended installation command. Alternate installation commands may also be entered with comments. | | 1 |
| DEV-1.2.3 | Developer must indicate any special requirements of the software release (incompatibilities, special instructions). System will flag release as having special requirements where appropriate. | These releases will be given special attention during "Series Software BOM" creation.<br><br>Can include a flag on release called "Special" or "Warning." These releases would be called out on part templates and snapshots and comment would be displayed. | 1 |
| DEV-1.2.4 | Developer must enter release notes. A release note is text entered into ePic. User can append an entry to the release note. | See attributes in section 10.4 for more details. | 1 |
| DEV-1.2.4.1 | Users can download all release note entries in a single text file via the UI. | | 1 |
| DEV-1.2.5 | Software item check-in should allow files to be checked-in to local mirror and uploaded to main store asynchronously. | | 1 |
| DEV-1.2.6 | If the item to be checked in is not an image, it will automatically be replicated to other file stores. If the item is an image, replication will not occur automatically. Users can request to the system that an image be downloaded to their regional file store. via ePic UI. | | 1 |
| DEV-1.2.7 | The following statuses can be specified for a release: "ES/Test", "FF", "Pilot", "CF", "RC", and "GM." | Satisfies VBD QA WG requirement 1d.<br><br>Satisfies VBD Factory Install WG requirement 2a. | 1 |
| DEV-1.2.8 | User can optionally request that the system send the release email. | | 1 |
| DEV-1.2.8.1 | Release email address list is a configurable system item. | This list could also be auto-generated based on roles. | 1 |
| DEV-1.2.9 | User can set a release "inactive." Inactive releases cannot be set as "default" and vice versa. | | 1 |
| DEV-1.3 | Create/Edit Vendor | | 1 |
| DEV-1.3.1 | User can store information about a software vendor (Name, Address, Contact, Sony Contact). | | 1 |
| DEV-1.3.2 | Vendor can be optionally associated with an engineering part. | It is appropriate to include vendor name in part name and also have a vendor association. | 1 |
| DEV-1.4 | User can initiate download of any release via ePic UI. | | 1 |

5.4.2 User Interface Requirements

| ID | Description | Comments | Priority |
|---|---|---|---|
| DEV-2.1 | Extracting engineering part, release, BOM data, and planning part associations from the database must be efficient for the developer. | Per 2005-6-30 BRD feedback from VBD. | 1 |
| DEV-2.2 | Users should be able to easily initiate download of any release via ePic UI. | | 1 |

5.4.3 Business Rules

| ID | Description | Comments | Priority |
|---|---|---|---|
| DEV-3.1 | Business rules specified as part of requirement BOM-3.1 apply to developers, as well. | | |

5.4.4 Interface Requirements

None

5.5 Software Integration ePic requirements to support integrators who use the system are listed here. ePic will provide a single interface to build tools. Each regional group is expected to modify their build tools to work with the new interface.

Functionality specified here is to be used by integrators as part of image creation and Series Software BOM creation. Functionality to manage DB Hero SKU's and associated BOMs and create dummy SKUs and BOMs is also included here.

5.5.1 Usage Requirements

| ID | Description | Comments | Priority |
|---|---|---|---|
| | | Dropped. File store related requirements will be captures in section 9.10. | |
| INT-1.2 | Check-in software release (image). | | 1 |
| INT-1.2.1 | Software item check-in should allow files to be checked-in to local mirror and uploaded to main store asynchronously. | | 1 |
| INT-1.3 | Schedule software integration activities. | *Future Requirement. Not in scope.* | NTH |
| INT-1.4 | Track software integration activities. | *Future Requirement. Not in scope.* | NTH |
| INT-1.5 | Event triggered notification concerning software integration activities. | *Future Requirement. Not in scope.* | NTH |
| INT-1.6 | System should not have any functional dependencies on any external build systems. | Build systems will be loosely coupled with ePic. | 1 |
| INT-1.7 | Monolithic Images will be created by selecting a SKU that has been loaded from DB Hero or manually created in the system (see INT-1.12). The system will automatically create the Image BOM using the series software BOM. | User must select which series SW BOM snapshot to use for this function. | 5 |
| INT-1.7.1 | Monolithic image BOMs are not editable by users. | User must edit the appropriate Series Software BOM to change monolithic BOMs. | 5 |
| INT-1.8 | ePic will support creation and deployment of MLHD configurations. | MLHD configurations are like SKUs that include software for more than one LangRegion. | 5 |
| INT-1.8.1 | MLHD BOM Template will be automatically generated based on user selected SKU BOM(s) loaded from DB Hero or manually created in ePic (see INT-1.12). | | 5 |
| INT-1.8.2 | MLHD BOM is not manually editable. | User should edit SKU BOM and associated Series Software BOM to change MLHD BOM contents. | 5 |

| ID | Description | Comments | Priority |
|---|---|---|---|
| INT-1.8.3 | MLHD BOM will be exposed to build system just like any other image BOM. | An attribute will allow VOE build system to distinguish MLHD BOMs from other images. | 5 |
| INT-1.9 | Component selector. Allow user to create DB Hero Component lists by selecting DB Hero specs and classes. | User can use this function to specify a configuration or just a set of components.<br><br>This function is used to specify component-to-release mappings during series SW BOM Creation (BOM-1.6) and dummy SKU BOM Creation (INT-1.12.2). It is intended to make it easier for users to select components by allowing them to select the same items a customer would in a sales system. | 2 |
| | | [] | |
| INT-1.9.2 | If user is creating a configuration, DB Hero constraints are checked by the system once all selections have been made. | This is necessary to create valid configurations. | 2 |
| INT-1.9.3 | DB Hero spec-to-component relations are used to convert user selected specs/classes to a list of components. | Thomas will not implement constraints enforcement which is required for ePic. | 2 |
| | | Dropped. VOA must adapt DB Hero deliverables to existing systems and Thomas will not have all required functionality. | 2 |
| INT-1.10 | Specify Component-to-Release Mappings. One or more DB Hero Components is mapped to one or more Releases on a Series SW BOM template. | These mappings will be included in the "installation data file," and factory tools will use these mappings to select the correct releases to install on a configuration based on the list of DB Hero components that make up that configuration (this is a SKU BOM). | 1 |
| INT-1.10.1 | If no mappings exist, the system will auto-generate mappings by using planning part associations to resolve which components will be selected. | [] | 1 |
| INT-1.10.2 | User can use component selector to select additional components to be used in a component/release mapping or select components directly. | [] | 1 |
| INT-1.10.3 | System will perform sanity checks upon submission of mappings:<br>• Ensure all SW items on the Series SW BOM have mappings with DB Hero components. | [] | 1 |
| INT-1.11 | Integrators can request images from non-local file stores be copies to the local store. | Images are not synced to other file stores by default. | 1 |
| INT-1.12 | Manage SKU's. A SKU represents an individual configuration. | SKU BOMs are used by the system to auto-create monolithic image BOMs (INT-1.7) and MLHD BOMs (INT-1.8).<br><br>A SKU (stock keeping unit) is a DB Hero part representing a configuration. The part number of such an item is also called SKU or F-number. A SKU BOM is a SKU part with a list of DB Hero component parts representing one configuration as children.<br><br>Some configurations (for retail products) are officially defined in DB Hero. These product configurations are referred to as Fixed SKUs. | 2 |
| INT-1.12.1 | SKU BOMs are loaded from DB Hero as part of DB Hero interface functionality. SKU BOMs contain a SKU item as parent and components as children. | | 2 |
| INT-1.12.2 | User can also manually create SKU's. User can use the component selector (INT-1.9) to create a SKU BOM. For manually created SKU BOMs, user should specify the SKU Description. | . | 2 |
| INT-1.12.3 | User cannot edit SKU BOMs originating from DB Hero. | | 2 |

5.5.2 User Interface Requirements

| ID | Description | Comments | Priority |
|---|---|---|---|
| | | Moved to section 9.4.2, requirement BOM-2.1. | |

5.5.3 Business Rules

| ID | Description | Comments | Priority |
|---|---|---|---|
| INT-3.1 | Both regional and global of foundation images will be supported by ePic. When reqional images are used, foundation images will be designed and built locally in each engineering division using ePic and local build tools. | | |

5.5.4 Interface Requirements

| ID | Description | Comments | Priority |
|---|---|---|---|
| INT-4.1 | Provide image BOM data and software items for VOA's build environment. | | 1 |
| | | Dropped. | |
| INT-4.3 | Provide image BOM data and software items for SDNA's build environment. | | 1 |
| INT-4.4 | Data and functionality will be exposed to build tools via interface DLL. | DB Connection will be used by SDNA. VOA and VOE will use web services. | 1 |
| INT-4.5 | Build data will be exported via system interface. | Build data is a snapshot of a BOM template for an engineering part. The interface should expose other data so that the remote user can select snapshots. | 1 |
| INT-4.5.1 | Data to be exported:<br>• Active Series Master<br>• LangRegion Master<br>• Image/module BOM Snapshots<br>• All entity attributes<br>• Binary data (in file store) | [] | 1 |
| INT-4.5.2 | Functions to be provided:<br>• Authenticate<br>• Get Active Series<br>• Get LangRegion Master<br>• Get Composite Parts for Series<br>• Get Snapshot List for Part<br>• Get Snapshot BOM<br>• Get Binary Data for SW Release ID (from file store) | Multiple calls required to get BOM. Filtering of data should be done client side. | 1 |
| INT-4.6 | Check-in functionality will be provided via system interface. | [] | 1 |
| INT-4.6.1 | Data to be imported:<br>• Release attributes<br>• Binary data (to file store)<br>• Part Registration | Part registration is needed since some parts (like "clean" or "base+" OS images) will be auto-created from build tools. | 1 |
| INT-4.6.2 | Functions to be provided:<br>• Authenticate<br>• Check-in (to ePic)<br>• Upload files (to local file store)<br>• Register Part (to facilitate auto-creation of related parts)<br>• Set default release | Register part functionality must be available remotely, for example, so that a PIDVD part (factory media) can be created by build tools automatically for each monolithic image created. | 1 |
| INT-4.7 | Config Range must be retrieved from DB Hero. | For INT-1.9. Interface specified in "DB Hero Common Interface Protocol Specification 2005-07-07", page 12 and 27. | 2 |
| INT-4.8 | Constraints must be retrieved from DB Hero. | For INT-1.9. Interface specified in "DB Hero Common Interface Protocol Specification 2005-07-07", page 14 and 30. | 5 |
| INT-4.9 | Spec-to-Component relations must be retrieved from DB Hero. | For INT-1.9. Interface specified in "DB Hero Common Interface Protocol Specification 2005-07-07", page 17 and 35. | 2 |
| INT-4.10 | All SKU BOMs must be retrieved from DB Hero and | For INT-1.7 SKUs are identified by F- | 2 |

| ID | Description | Comments | Priority |
|---|---|---|---|
| | stored in ePic. | number. Interface specified in "DB Hero Common Interface Protocol Specification 2005-07-07", page 10 and 24. | |

5.6 Factory Deployment

This section captures ePic requirements specific to factory deployment. Some of these requirements extend previously specified functionality. The requirements and data format for the installation data file is captured in section 9.8.

5.6.1 Usage Requirements

| ID | Description | Comments | Priority |
|---|---|---|---|
| MFG-1.1 | Snapshot Series Software BOM. This functionality should be available from the series software BOM management screens. | Snapshots are used for several operations: Installation Data File creation, Test Strategy management. | 1 |
| MFG-1.1.1 | A snapshot can be flagged as a Release Candidate (RC). | The latest RC snapshot is used for generating Test Strategies. This function would be used for the "BOM Freeze" milestone in VOA. | 2 |
| MFG-1.1.2 | User must enter a text version string (or snapshot name) for each series software BOM snapshot. This version string should be unique for Series/LangRegion combination. | For example, "1.0", "1.1.1-rc", or "Build 1". Business units will decide conventions this field.<br><br>This is in addition to system generated ID. It is used throughout the system and external tools as the name of the snapshot. | 1 |
| MFG.1.2 | Issue RTM or Test RTM. RTM's and Test RTM's will be issues by Series/LangRegion. | Test RTM's will be used as a mechanism for pre-releasing BOMs for PVT events. | 4 |
| MFG-1.2.1 | Only one snapshot for a given Series/LangRegion combination can be flagged as RTM or Test RTM. | This implies that different snapshots could be used for different LangRegion combinations. | 4 |
| MFG-1.2.2 | System must send when an RTM has been issued in the system. Email must include the following information:<br>• Installation data file name with hyperlink to ePic page from which it can be downloaded.<br>• Name and email of user who issued the RTM.<br>• Engineering organization of the user. | | 5 |
| MFG-1.3 | Running change management. | | 4 |
| MFG-1.3.1 | If a user issues an RTM against a Series/LangRegion combination for which a RTM snapshot already exists the system should warn the user that a previous snapshot was RTM'ed and this is a running change. | | 4 |
| MFG-1.3.2 | When system sends release mail to users, the mail should indicate that the change is a running change to RTM'ed software. In addition to items described in MFG-1.2.2 the following items should be included in the mail:<br>• List of releases added/deleted/changed since initial RTM. Items which are patches (EPCs) should be tagged as such.<br>• List of releases added/deleted/changed since the last running change release. Items which are patches (EPCs) should be tagged as such. | For example:<br><br>Changes since initial RTM:<br><part name> <detailed ver.> (<rel. id>) [ADDED]<br><part name> <detailed ver.> (<rel. id>) [DELETED]<br><part name> <detailed ver.> (<rel. id>) [CHANGED]<br><part name> <detailed ver.> (<rel. id>) [ADDED] [PATCH]<br><br>Changes since last RTM:<br><part name> <detailed ver.> (<rel. id>) ) [ADDED] | 5 |
| MFG-1.4 | Manage partitioning information. System will provide functionality for specifying partition sizes for all partitions to be used on production systems. Special partitions "recovery" and "system" (or C drive) can be defined. "System partition must always be specified. | This data will be included in the installation data file. | 5 |

| ID | Description | Comments | Priority |
|---|---|---|---|
| MFG-1.4.1 | Partitions sizes can be defined for each Series/LangRegion combination. | | 5 |
| MFG-1.4.2 | Partition sizes should be specified in MB (megabytes). | | 5 |
| MFG-1.4.3 | For the recovery partition, user can select "dynamic" instead of specifying a size. For system partition user can specify "single partition" instead of specifying a size. | If a partition size is dynamic, installation tools will decide what the size will be. If partition size is "single partition", then all available space remaining on the disk would be allocated for the partition. | 5 |
| MFG-1.4.4 | For the "system" partition, user must specify a minimum size. This is always required. | This is used in the factory so that a diagnostic partition can be created. For single partition models the partition size will be extended to the final size at the end of the factory process. | 5 |
| MFG-1.4.5 | If user selects "dynamic" for recovery partition size, user must also specify "recovery partition installed size." This is the size in MB of all data included in the recovery image. It is needed to calculate a dynamic partition size. | | 5 |
| MFG-1.4.5 | For each partition specified, user must specify a disk number, partition number, and label name. | For example, "Disk 1, Partition 2, SYSTEM." | 5 |
| MFG-1.4.6 | For each partition specified, user must specify a file system type. This type will be stored as a hexadecimal number, but system should prompt users with partition type name. | Standard partition types and numbers should be used. | 5 |
| MFG-1.5 | Factory Media Management. System should provide some addition functionality to facilitate media delivery to factories when defining factory media engineering parts. | | 4 |
| MFG-1.5.1 | System should provide function for auto-creating media BOM based on a series SW BOM snapshot. User can select the snapshot (by RTM, Test RTM, Latest, or version field) and system will prepare a BOM which includes the appropriate installation data file. | | 4 |
| MFG-1.5.2 | System should provide function for auto-creating a media set containing only files which have changed from another media set. User should select two series software BOM snapshots. Default is initial RTM'ed snapshot and latest RTM'ed snapshot. Appropriate installation data file will be included on the BOM. | | 4 |
| MFG-1.5.3 | User can manually add/remove releases from the Factory Media BOM. | | 4 |
| MFG-1.6 | Miscellaneous IDF data maintenance. Functions for managing data in the IDF not covered elsewhere in this document must be provided. | | 4 |

5.6.2 User Interface Requirements

| ID | Description | Comments | Priority |
|---|---|---|---|
| MFG-2.1 | RTM/Running Change Wizard. | | 5 |
| MFG-2.2 | Download Installation Data file. | | 3 |

5.6.3 Business Rules

| ID | Description | Comments | Priority |
|---|---|---|---|
| MFG-3.1 | ... | | |

5.6.4 Interface Requirements

| ID | Description | Comments | Priority |
|---|---|---|---|
| MFG-4.1 | | | |

5.7 Installation and Recovery (ePic)

These requirements describe ePic functionality required to support software installation and recovery.

5.7.1 Usage Requirements

| ID | Description | Comments | Priority |
|---|---|---|---|
| INST-1.1 | "Installation Data File" (IDF) Management. | | 1 |
| INST-1.1.1 | Installation Data File (IDF) must include the following elements for each Series/LangRegion:<br>• Minimum tools version number – checked by tools to ensure the correct version is being used (configurable value).<br>• Version number of the installation data snapshot.<br>• The contents of Snyinst.oem. Installation order for the modules.<br>• Mapping of DB Hero components to ePic SW releases.<br>• Data required for the installation tools to confirm successful installation of each release.<br>• CRC data for each binary file.<br>• Total size of each release binary data (used for dynamic partition size calculation).<br>• Path information required to locate binary files in the file store and download them (via SMB share).<br>• Partition size information for recovery and system partitions. All partition information defined in the system should be included and a field listing total number of partitions defined should be calculated and included in the file.<br>• BIOS time zone offset from GMT by the series/LangRegion (e.g., GMT +8, GMT -7).<br>• For each release included in the file, engineering organization for the developer who checked-in the release.<br>• Recovery type (HDD Recovery or media only).<br>• MLHD specific information, if applicable.<br>• Relevant MCode specification(s).<br>• List of all software releases and attributes of all software releases on the Series SW BOM (BLID will be included as an attribute of FI releases). | Satisfies VBD Factory Install WG requirements 1a-f.<br><br>Factory Install WG 1c and 1f-1 are satisfied since P1 images, patches, and running changes are treated like any other module. | 1 |
| INST-1.1.3 | An installation data file can be automatically downloaded to a factory file store, it can be retrieved manually via ePic UI, or it can be retrieved via DLL interface. | Intended to satisfy Factory Install WG requirement 3a. | 3 |
| INST-1.1.4 | Installation data files are generated for each Series Software BOM Snapshot. | There will be many IDF's. To make management easier special requirements have been specified for online (STOR-1.10 and STOR-1.14) and offline (MFG-1.5) factory deployment methods. | 2 |
| INST-1.1.5 | All users can retrieve the "Test RTM" or "RTM" version of the installation data file for a given series. Sony users can additionally retrieve the "latest" snapshot of an installation data file. | Satisfies Factory Install WQ requirement 1f-2. | 4 |
| INST-1.1.6 | Each installation data file must have a unique name with the unique identifier included in the name. | | 1 |

| ID | Description | Comments | Priority |
|---|---|---|---|
| INST-1.2 | "RTM", "Test RTM", and "latest" snapshots of installation data can be generated and stored in the system. | | 4 |
| INST-1.3 | Installation data will be "cycle-less." Installation data will support all cycles for a given series. | | 2 |
| INST-1.4 | All users must have a system account to access these services. | | 2 |
| INST-1.5 | Third party users should have access only to data relevant to them. Data will be restricted by series (see ADM-1.3). | | 5 |
| INST-1.6 | MCode management. | | 4 |
| INST-1.6.2 | A MCode specification (bit mapping to software releases) is defined for each Recovery Media Set. | This means that MCodes can be duplicated with each instance having different meanings. | 4 |
| INST-1.6.3 | The system will generate a MCode specification once the Recovery Media Set BOM and Series SW BOM for the associated series' are complete. This function can be re-run if the BOM changes and existing MCode Mappings will not be affected. | | 4 |
| INST-1.6.4 | The system can calculate a MCode given a list of SW releases or a list of DB Hero components representing a single configuration. | Satisfies VBD Factory Install WG requirement 2c. | 5 |
| INST-1.6.5 | The system can calculate the list of software based on a given MCode. | | 5 |
| INST-1.6.5.1 | User can produce a list of software from an encrypted MCode or unencrypted MCode. If the MCode is encrypted, user must also enter a UUID (text string) to facilitate decryption. | | 5 |
| INST-1.6.6 | The system can calculate a MCode based on a SKU BOM (user defined or from DB Hero) defined in the system. | System must first convert list of DB Hero components to a list of software releases to accomplish this.<br><br>A SKU BOM must be used, because calculating a valid MCode requires that DB Hero constraints have been enforced for the configuration (see Component Selector, INT-1.9). | 4 |
| INST-1.6.6.1 | User can optionally generate an encrypted MCode by entering a UUID in the system. | | 5 |
| INST-1.6.7 | The MCode specification will be included in the installation data file. | | 4 |
| INST-1.7 | Recovery Media Planner. Users can define a BOM template for a Recovery Media Engineering Part using a wizard or form. | | 4 |
| INST-1.7.1 | User selects the Series and LangRegion for which the recovery media will be created. User ~~can optionally~~ must select an OS, as well. | | 1 |
| INST-1.7.2 | System will auto create a Recovery Media BOM template. This function is identical to Series Software BOM auto-generation except that it is also constrained by OS selection. | | 4 |
| INST-1.7.2.1 | User can manually add/remove engineering parts/release/groups to the BOM template. | | 1 |
| INST-1.7.2.2 | User can create snapshots of the Recovery Media BOM template. Requirements are the same as for Series Software BOM. | | 1 |
| INST-1.7.2.3 | A function for comparing Recovery media BOM snapshots to series SW BOM snapshots should be available. Differences should be shown to the user. | Recovery Media BOM's and Series SW BOM's (their lifecycles are different) are not directly related. This function is necessary so that users can reconcile differences. | 5 |

| ID | Description | Comments | Priority |
|---|---|---|---|
| INST-1.8 | The ePic component selector function must provide a function for issuing an HTTP GET or POST to the OASIS system in the VOA (This system generates MCode writing floppy disks for Sony personnel around the world). The HTTP request will include an unencrypted MCode and any other data necessary to produce a MCode floppy in OASIS. | This is just a button or hyperlink.<br><br>This function cannot yet be merged into ePic because it is heavily tied to VSMS and legacy support will be required for a while. This can eventually be converted to a standalone tool which runs alongside ePic once the VSMS dependencies can be lifted. | 4 |

5.7.2 User Interface Requirements

| ID | Description | Comments | Priority |
|---|---|---|---|
| INST-2.1 | Recovery media planner (wizard). | | 1 |
| INST-2.1.1 | Select Series, LangRegion, and OS. One or more of any of these items may be selected. Set media specific attributes. | | 1 |
| INST-2.1.2 | System auto-generates media BOM. Show software releases and media layout. Allow user to add items to BOM. Items generated from Series SW BOM cannot be edited. | Series SW BOM is required for auto-generation. If it is unavailable, user may create BOM from scratch. | 4 |
| INST-2.1.3 | Generate MCode bit mappings. System stores bit mappings. Existing bit mappings are frozen if any Series/LangRegion assigned to media set it RTM'ed. Additional mappings may be created post-RTM. | | 4 |

5.7.3 Business Rules

| ID | Description | Comments | Priority |
|---|---|---|---|
| INST-3.1 | MCode format will be changed:<br>• Current MCode space occupied by PCODE will be replaced with a MCode Spec identifier.<br>• All remaining bits will be used for algorithmic mapping bits to software items. There will no longer be HW/SW MCode – only SW MCode. | | |
| INST-3.2 | HDD recovery and recovery from customer created recovery media will not be dependent on MCode. MCode is required only for recovery using Sony supplied recovery media (as defined in ePic). | | |

5.7.4 Interface Requirements

| ID | Description | Comments | Priority |
|---|---|---|---|
| INST-4.1 | ... | | |

5.7.5 MCode Specification Changes

5.7.5.1 Current MCode Implementation

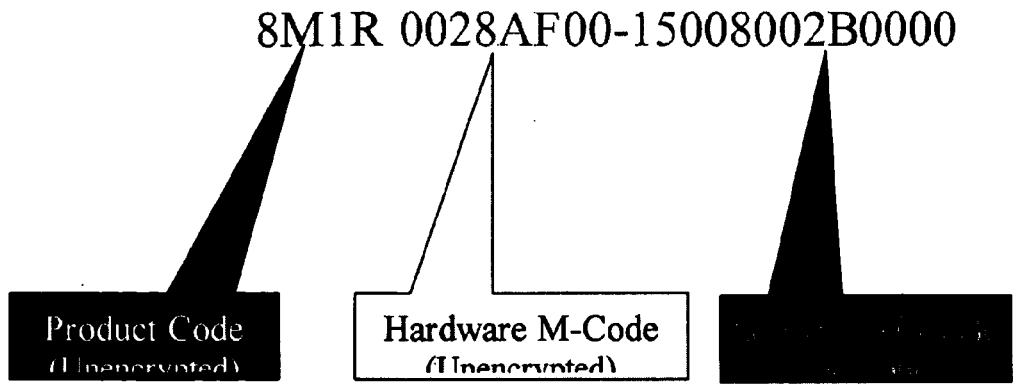
5.7.5.2 New MCode Implementation
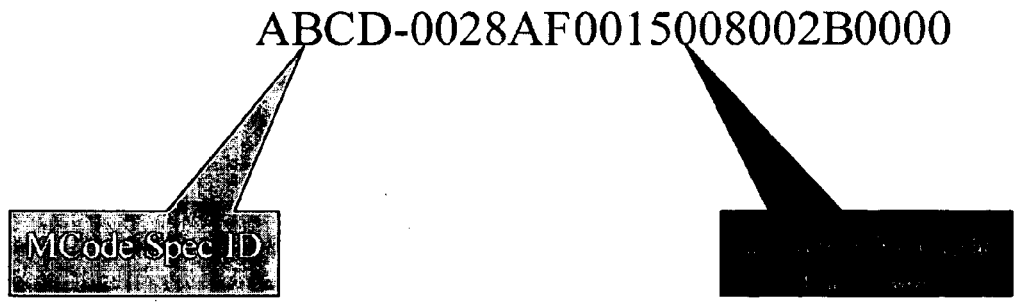
Changes:
- Number of bits available for software will increase from 48 to 80.
- PCode value will be replaced with an ePic "MCode Spec" identifier.
- Recovery tools will require only MCode and installation data file (included on media) to recovery a machine. Reliance on any other DMI fields will be eliminated.

*Installation Data File Mockup*

```xml
<?xml version="1.0" encoding="UTF-8"?>
<InstallationDataFile>

// Versioning information and other top level data
    <Header>
        <Series name=""/>
        <LangRegion name=""/>
        <BomSnapshot id="" versionString=""/>
        <MinimumToolVersion version="" />
    </Header>

// List of DB Hero component ID to SW release mappings
    // (created as part of Series Software BOM management)
    <ComponentReleaseMap>
        <Mapping>
                <ComponentIDList/>
                <ReleaseIDList/>
        </Mapping>
        ...
    </ComponentReleaseMap>

// List of MCode bit mappings
    // MCode spec by recovery media set or Series/LangRegion/OS
    <MCodeSpec>
        <OperatingSystem id="">
            <Mapping>
                    <MCode bitmask="" value=""/>
                    <ReleaseIDList/>
            </Mapping>
            ...
        </OperatingSystem>
        ...
    </MCodeSpec>

// Partition Data
    <ParitionInfo/>

// List of all releases and their attributes for the Series/LangRegion
    // (includes BIOS/Firmware releases)
    <SeriesSoftwareBom>
        <Release id="" blid="" ...>
                <SetupCommand/>
```

```
            <Dependencies/>
        </Release>
            ...
    </SeriesSoftwareBom>
</InstallationDataFile>
```

5.8 Installation and Recovery (Tools)

As part of the requirements process global modular and recovery specifications will be defined. These requirements describe changes that must be made to US installation and recovery tools in order to work with ePic. These tools will become the global Installation and Recovery Toolset.

5.8.1 Usage Requirements

| ID | Description | Comments | Priority |
|---|---|---|---|
| TOOL-1.1 | Image and Module part types can be downloaded and installed automatically using the same tools to be used in the factory. | Requirements TEST-1.1 to TEST-1.4 satisfy QA WG requirements for network installation item 2.<br><br>Patches and running changes are "Modules" and are thus included. | 2 |
| TOOL-1.2 | Installation without a Series SW BOM must be supported. | This functionality should be provided on a boot CD.<br><br>Software list building/storing functional requirements added to ePic per 2005-9-15 VBD review. | 2 |
| TOOL-1.3 | Installation of a clean OS should be possible. | VBD QA WG Requirement.<br><br>This is for early SW development (of drivers, for example). ePic will allow such images to be checked in and users can use QA installation tools to image units. | 2 |
| TOOL-1.4 | BIOS/Firmware and tools (e.g., to burn BIOS, write firmware or write DMI) part types should be downloaded automatically. | | 3 |
| TOOL-1.5 | BIOS/Firmware parts should be automatically installable. | | 3 |
| TOOL-1.6 | Release Notes and Bug Lists for all parts can be automatically downloaded. | | 2 |
| TOOL-1.7 | Paper manual contents can be automatically downloaded. | | 2 |
| TOOL-1.8 | QA download and installation services and tools must be available worldwide to VAIO engineering groups, outsourced QA groups, and ODMs. | Satisfies QA WG requirements for network installation item 3 and 5c.<br><br>Detailed list of users is included in the original document. | 2 |
| TOOL-1.9 | Tools should check the minimum required version in the installation data file and should return an error if they are a lower version. | | 2 |
| TOOL-1.10 | Tools will determine install order based on data from ePic. | | 2 |
| TOOL-1.11 | Tools must operate in WinXP and WinPE. | Satisfies QA WG requirements for network installation item 5e and 2i. | 2 |
| TOOL-1.12 | Tools must implement function to convert an MCode to a list of software releases (using the installation data file) and vice versa. | This enables the distribution of MCodes to factory for Fixed SKU production, and it enables calculation of MCodes on the fly by installation tools during the modular installation process. | 2 |
| TOOL-1.13 | Unique ID of each software release must be verified after installation. | Satisfies VBD QA WG requirement 3a. | 3 |

| ID | Description | Comments | Priority |
|---|---|---|---|
| TOOL-1.14 | Installation tools must be able to detect whether a module successfully installed. | Satisfies VBD QA WG requirement 3b. | 3 |
| TOOL-1.15 | Installation tools should support automatic creation of a target environment on a machine. | Satisfies QA WG requirements for network installation item 5a. | 3 |
| TOOL-1.15.1 | Target environment includes an HDD image. | Assumption is that this is a foundation image. | 3 |
| TOOL-1.15.2 | Target environment includes firmware and BIOS updates. | | 3 |
| TOOL-1.15.3 | Target environment includes updating of DMI data. | | 3 |
| TOOL-1.16 | Installation tools must have locking mechanism so that they only work on Sony PCs. | Satisfies QA WG requirements for network installation item 5b. | 3 |
| TOOL-1.17 | QA installation can be initiated using a WinPE boot CD. | Satisfies QA WG requirements for network installation item 5d. | 2 |
| TOOL-1.18 | Installation tools must work in Windows. | | 2 |
| TOOL-1.19 | Installation tools must support preparing recovery partition only without performing full install. | Satisfies QA WG requirements for network installation. | 3 |
| TOOL-1.20 | An automated system should exist that can scan hardware data for test systems and load it into ePic through a network connection. | This would help facilitate Test System data entry.<br><br>WMI based configuration checking implementation could be used to satisfy this requirement. | 3 |
| TOOL-1.21 | A DLL should be provided that utilizes MCode encoding/decoding and MCode decryption/encryption. | | 1 |
| TOOL-1.22 | Three use cases for installation tools will be supported:<br>1. Installation using a list of DB Hero component part numbers.<br>   a. Convert list of component part numbers to list of software releases.<br>   b. Generate MCode using list of software releases (optional – could be done offline).<br>   c. Install software.<br>2. Installation using a MCode.<br>   a. Generate list of software releases using MCode.<br>   b. Install software.<br>3. Installation using a list of releases.<br>   a. Generate MCode (optional – could be done offline).<br>   b. Install software. | | |

5.8.2 User Interface Requirements

| ID | Description | Comments | Priority |
|---|---|---|---|
| TOOL-2.1 | | | |

5.8.3 Business Rules

| ID | Description | Comments | Priority |
|---|---|---|---|
| TOOL-3.1 | For the use cases defined in TOOL-1.22:<br>• Factory Installation will use method #1 only. For retail models the DB Hero component part number list can be prepared offline and distributed at RTM time.<br>• Recovery Media Sets (RDVDs or Fulfillment Media) will use method #2.<br>• HDD Recovery and recovery using customer created media will use method #3.<br>• Test system preparation will use all three methods. | | |

5.8.4 Interface Requirements

| ID | Description | Comments | Priority |
|---|---|---|---|
| TOOL-4.1 | | | |

5.9 File Store/Mini-ePic

5.9.1 Usage Requirements

| ID | Description | Comments | Priority |
|---|---|---|---|
| | | Moved to Business Rules section. | |
| | | Moved to Business Rules section. | |
| STOR-1.3 | New module and application releases will automatically be synced with other engineering file stores. Images will not. | | 1 |
| STOR-1.4 | Sony user can request that images from another engineering file store be transferred to their local file store via ePic UI. | | 1 |
| STOR-1.5 | Factory engineers can automatically sync their local file store by providing installation data file to synchronization tool. | File store solution would thus require a function for parsing the installation data file. | 3 |
| STOR-1.5.1 | All binary data required will be automatically downloaded to factory file store according to installation data file. | | 3 |
| STOR-1.5.2 | Obsolete releases will be automatically deleted from factory file store according to installation data file. This function can be optionally disabled. | The "delete obsolete files" function is intended for factory use. Factories will usually only require latest RTM'ed releases. Obsolete releases would be any releases that were removed/replaced in the installation data file. Such a function ensures that factories will never need to allocate more storage than is absolutely necessary to the file store. | 3 |
| STOR-1.5.3 | Factory engineers can only download "RTM" or "Test RTM" releases as indicated in the installation data file they receive. | | 3 |
| STOR-1.6 | For each release, one or more files and directories can be checked into file store. | | 1 |
| STOR-1.6.1 | During release check-in, upload process should be a fully automated and atomic operation. | User should not have to zip up files or FTP them anywhere. | 1 |
| STOR-1.7 | During a download operation, the total size of the files to be downloaded can be reported to the user *before* the download starts. | | 3 |
| STOR-1.8 | Users must be able to load binary data into the file store from media. | Some factories will receive images and modules on DVD (factory media set). | 3 |
| STOR-1.9 | User must be able to operate the file store without a database connection to ePic. | Perhaps factory file store can work with just installation data file. Engineering stores may use database connection to acknowledge check-in(s) and perform other advanced functions. | 1 |
| STOR-1.10 | File store will provide a function for downloading latest installation data file for a Series/LangRegion. The Series/LangRegion list for this function should be kept in a configuration file and downloads should be manually triggered. | This function is for factories. | 3 |
| STOR-1.10.1 | User should be able to view/download the list of changes (the same as in requirement MFG-1.3.2) when the file store download is triggered. | | 3 |
| STOR-1.11 | The file store solution should be deliverable as an easily installable package with a simple configuration file. | Package is sent with user manual and required configuration parameters. | 1 |
| STOR-1.12 | The file store solution should be deployable to a wide range of system architectures. | File store users will have more flexibility in hardware selection or they can leverage existing infrastructure. | 1 |

| ID | Description | Comments | Priority |
|---|---|---|---|
| STOR-1.13 | File and directory management. | | 1 |
| | | | ↓ |
| STOR-1.13.2 | Files should be stored in a flat file structure with each file uniquely named. | It is acceptable to have a few directories on the file store, as long as it is human navigable.<br><br>Files could be named as the release ID with type prefix. | 1 |
| STOR-1.14 | A factory file store can be synchronized based on the installation data file. | Intended to satisfy Factory Install WG requirement 3b and 3d. | 3 |
| STOR-1.15 | Files and directories (binary data) in the file store should be uniquely named. | Satisfies Factory Install WG requirement 3c. | 1 |

5.9.2 User Interface Requirements

| ID | Description | Comments | Priority |
|---|---|---|---|
| STOR-2.1 | Solution should be command-line based. Some functions may be implemented in a daemon. | Operations can be scripted. No graphical UI required. | 1 |

5.9.3 Business Rules

| ID | Description | Comments | Priority |
|---|---|---|---|
| STOR-3.1 | Any business unit requiring a file store will be responsible for purchasing and maintaining hardware. | Storage requirements will vary for each installation. | |
| STOR-3.2 | Any non-GM software must be available for a specified period of time (e.g. 100 days) after the GM version has been released. | Satisfies QA WG requirements for network installation item 4. | |
| STOR-3.3 | Golden Master (GM) SW releases must be available for an indefinite period of time.<br><br>If indefinite period is impossible one of the following:<br>• By the end of OS support period.<br>• By the end of product support period.<br>By the end of key parts availability for HW services. | Satisfies QA WG requirements for network installation item 4. | |

5.9.4 Interface Requirements

| ID | Description | Comments | Priority |
|---|---|---|---|
| STOR-4.1 | File store must communicate with other file stores. | | 1 |
| STOR-4.2 | Files stores must authenticate before connecting to another file store or ePic for any reason. | | 1 |

5.10 Test Management and Defect Tracking

The following key concepts are central to ePic Test Management and Defect Tracking functionality:

- Test Case: Unit test case associated with a single hardware or software item.
- Test Case Strategy: A collection of test cases for a series or engineering part/major version. Partially auto-generated based on the releases on a series software BOM. The test case strategy changes over time as items on the series software BOM change.
- Defect: A flaw of a software or hardware item. Defects can be linked to test cases or standalone.
- Test System: A PC used for testing. ePic will track the configurations of test systems.

9.11.1 Usage Requirements

| ID | Description | Comments | Priority |
|---|---|---|---|
| TEST-1.1 | Three primary system roles are used for the Test/Defect components of ePic: "Project Test Lead," "Test Lead," and "Tester." | | 3 |
| TEST-1.1.1 | Only "Project Test Leads" and "Test Leads" can create/edit Test Cases and create/edit Test Strategies. | | 3 |
| TEST-1.1.2 | Testers can update the results of a Test Case or create/edit defects. Testers can edit Test Case definitions if they have been added to the owner list for the Test Case by a Test Lead or Project Test Lead. | | 3 |
| TEST-1.1.3 | Developers and Integrators can update status and resolution of defects, but cannot set resolution of defects to "Fix-verified." | "Fix-verified" resolution is used to confirm regression tests were successful. | 3 |
| TEST-1.1.4 | Any user with an assigned role in the system can enter a defect in open status. | Authenticated users without roles are given read-only access to all parts of the system. | 3 |
| TEST-1.2 | Defect management. | | 3 |
| TEST-1.2.1 | Defects can be associated with one or more engineering part/major versions, releases, series, or hardware parts. Defects cannot be associated with software planning parts from DB Hero. | Thus for hardware defects, DB Hero part numbers are used, and for software defects (including BIOS and firmware) ePic part numbers are used. | 3 |
| TEST-1.2.2 | If a user chooses to associate a defect with a series, the user should then have the option of selecting releases from the series software BOM (if available). | | 3 |
| TEST-1.2.3 | Before entering a defect, the user should be able to search existing defects to ensure that duplicates or similar defects do not already exist. | Search functions should be accessible from the create defect view. | 3 |
| TEST-1.2.4 | Defects can be associated with one or more Test Systems. | [] | 3 |
| TEST-1.2.4 | Defects must be associated with Test Cases if they are discovered as part of testing (see requirements TEST-2.1.4). Defects can also manually be associated with a test case. | [] | 3 |
| TEST-1.2.5 | Any changes made to an existing defect should be captured in a history log. The user, date/time, and attributes changed should be captured. Changes to values for status and resolution of defect should be tracked in the history log. For other attributes values do not need to be tracked. | [] | 3 |
| TEST-1.2.6 | Users checking-in new part releases are required to update the status and resolution of any open defects linked against that part/major version. | This will be required for ALL users who check in releases regardless of whether their organization uses the Test Mgmt/Defect Tracking functions of ePic. This is critical for correctly assessing the quality level in any release on the series SW BOM, as will as auto-generating the regression portion of a Test Strategy. | 3 |
| TEST-1.2.6.1 | System will display a table of open defects and allow user to enter status, resolution, and notes for each defect. | It is preferred that notes entry be a separate screen invoked by a link to facilitate a more compact UI. | 3 |
| TEST-1.2.6.2 | If user sets defect resolution to "Will Not Fix" or "Deferred" a note is required. | | 3 |
| TEST-1.3 | Foundation Image (FI) Defect Propagation Tool. | This is a special purpose function required because each FI is defined as separate engineering part in ePic, but defects found in the FI will often apply to many FIs (for example, defects cause by build tools). It is intended to be used by integrators/image builders as opposed to QA personnel. | 4 |
| TEST-1.3.1 | System displays all open defects against foundation images and a table of all active foundation image engineering parts and releases. | | 4 |

| ID | Description | Comments | Priority |
|---|---|---|---|
| TEST-1.3.2 | Attributes displayed for foundation images facilitate dimensional analysis to identify other FIs affected by a defect. User can sort table by column or filter table by column values. | | 4 |
| TEST-1.3.3 | User can select one defect and one or more releases in the FI table and assign the defect to all selected FIs. | | 4 |
| TEST-1.4 | Create/edit test system. User can define test systems (PCs used for testing software and hardware) in ePic. | | 5 |
| TEST-1.4.1 | Each BOM should include a list of basic categories to help user create test BOM: CPU, HDD, ODD, Motherboard, LCD, etc. Parts for specific categories are *not* required to be entered; these categories are used only as filters for the hardware parts list. | Such categories are maintained in DB Hero as an attribute of parts called "Classification." This attribute should be used for this function. | 5 |
| TEST-1.4.2 | The user can create a BOM for the hardware (DB Hero HW parts) and Firmware (ePic eng. parts) in a test system. User can browse parts by series or description. | | 5 |
| TEST-1.4.3 | The user should be able to define addition parts on a test system BOM template that are not included in DB Hero part lists. User defined parts will only be available for test system management. User defined parts will use the same categories as normal DB Hero parts. | Sometimes users must substitute parts that are not on the DB Hero BOM in the test system. User defined HW parts would use the same attributes as DB Hero HW parts.<br><br>This function will also be used for special items which must appear on the RTM report, like firmware versions. | 5 |
| TEST-1.4.4 | User can use parts from more than one series on a test system BOM. | Appropriate parts may not be available so user should be able to use any part in test systems. | 5 |
| TEST-1.4.5 | When a defect is related to a test system, the test system BOM template and other data is automatically snapshotted. The snapshot must be related to the defect. | | 5 |
| TEST-1.4.6 | DMI settings for each test system must be stored in ePic. The user can enter the values for a set of keys. The keys required are "Manufacturer," "Model Name," "BIOS Lock ID," "MCode (Un-encrypted)," "MCode Tool Version (CDS Models Only)," "BIOS Information," "Universal Information." Keys should be configurable (no admin screen necessary). | This data is included on RTM report. This data is output from the SXSYSINF tool maintained by System Engineering. Keys must be kept in sync with the development of this tool. | 4 |
| TEST-1.4.7 | User can associate a test BOM or SKU BOM with a test system. This BOM will be used to image the system. | | 4 |
| TEST-1.5 | Test Case Management. | | 3 |
| TEST-1.5.1 | Test Cases can be associated with a series or engineering part/major version combo. An association is not required. | | 3 |
| TEST-1.5.1.1 | A Test Case result (Pass/Fail/Impeded/Not Tested) can be stored for each combination of series and part release. Results are not stored unless the test case is added to a test strategy (default is "Not Tested"). A text note and timestamp must be stored for each result entered in the system. User should be able to retrieve the Test Case result history for a test case for a given Test Strategy or Release. | | 3 |
| TEST-1.5.1.2 | Test cases have the following categories: Basic, Ad-hoc, Use Case, Compatibility, FIV, Benchmarks, MDA, Screen Shot Capture, Accessory, Business Unit, and Other. Some categories have special requirements. See description of categories in section 9.11.5.1. | | 3 |

| ID | Description | Comments | Priority |
|---|---|---|---|
| TEST-1.5.1.2.1 | Benchmark and MDA Tests results include admin defined category/key sets. Category, Key, and the Value stored are all text fields. Categories should have names and long descriptions. | | 3 |
| TEST-1.5.1.2.2 | Only users with admin privileges can define key names to be used for Benchmark and MDA testing. | These keys change regularly but infrequently. An admin screen (not config file) is required for this function. | 3 |
| TEST-1.5.1.2.3 | Screen Shot Capture tests can have an image file (.JPG, .PNG, or .BMP) attached to it. | This is a special test case used for the RTM report. | 3 |
| TEST-1.5.1.2.4 | Compatibility Tests can have a list of required parts attached to them. This is a text field filled out manually. | | 3 |
| TEST-1.5.1.3 | For all test cases "Level" can be set. Levels can be 1, 2, 3, or "Sampling/Sanity Check" (see section 10.4.8, TST-13). | This attribute is used in Test Strategy generation functions (see below). | 3 |
| TEST-1.5.1.4 | Test Case data for a single test case can be exported to an Excel spreadsheet. | Per VOE review, 2005-11-10. | 3 |
| TEST-1.6 | Users can define named Test Case Groups. | Functionality is similar but not identical to groups used in software BOM creation. | 3 |
| TEST-1.6.1 | Test Case Groups can be public or private. Private groups are visible only to the user that created the group. | | 3 |
| TEST-1.6.2 | Test Case Groups can be assigned to the same entities as Test Cases. Such assignments are used as defaults when a user creates a new test within a group. | | 3 |
| TEST-1.7 | Test Strategy Management. | | 3 |
| TEST-1.7.1 | Each series defined in the system will have a test strategy associated with it by default. A series test strategy is a list of test cases and/or defect regressions to be executed against the latest series software BOM snapshot for that series. | | 3 |
| TEST-1.7.2 | User can create and ad-hoc named test strategy to facilitate pre-integration testing. This test strategy can be associated with exactly one engineering part/major version. | | 3 |
| TEST-1.7.3 | Test cases and defect regressions can belong to more than one test strategy. Test case can be added to a strategy only once (no duplicates allowed). | | 3 |
| TEST-1.7.4 | Test strategy auto-update and editing: Test strategies are partially auto-updated when a Project Test Lead accesses the test strategy for a given Series/LangRegion combination. | Only project test leads can perform these activities. | 4 |
| TEST-1.7.4.1 | For series test strategies, if a new series software BOM snapshot has been changed or if the status of the snapshot has been changed to Release Candidate (RC), the system will auto-update the test strategy for any releases or that have changed since the last time the test strategy was generated. Release for composite parts will be recursively processed (system will examine the BOMs for each composite part, including FIs). | | 4 |
| TEST-1.7.4.2 | For ad-hoc test strategies the system will examine the associated engineering part. Composite parts will be recursively processed. | | 4 |
| TEST-1.7.4.3 | Auto-update of test strategies is performed only for the selected LangRegion. | | 4 |
| TEST-1.7.4.4 | 1st build (release) test strategy auto-update: Triggered for the first release checked-in for the first major version of an engineering part. | | 4 |
| TEST-1.7.4.4.1 | Level 1 and 2 test cases associated with the series/part and Level 1 and 2 test cases with no associations are added to the test strategy. | | 4 |
| TEST-1.7.4.4.2 | User can manually add level 3 test cases and test case groups. User can remove any auto-added test cases. | | 4 |

| ID | Description | Comments | Priority |
|---|---|---|---|
| TEST-1.7.4.5 | Minor revision test strategy auto-update: Triggered for any new releases/defaults which are not the first release. Test cases are updated as follows: | | 4 |
| TEST-1.7.4.5.1 | Defect regressions are added to the test strategy: Defects with resolution "Fixed" which are associated with the *current* engineering part/major version or any of its releases are added to the test strategy as "defect regressions." There are no test cases associated with defect regressions (though there may be test cases associated with the defect itself, they are not used here). | | 4 |
| TEST-1.7.4.5.2 | System adds test cases for any open defects against the *current* engineering part/major version with Priority of "Must Fix" or "Should fix." Test cases for open defects with Priority equal to "None" and Severity equal to "1" are also added to the test strategy. | If defects matching the criteria do not have associated test cases then they are ignored by the system. | 4 |
| TEST-1.7.4.6 | Major Revision test strategy auto-update: Triggered for the first release checked in against a major version that is not the first major version. | | 4 |
| TEST-1.7.4.6.1 | Defect regressions are added to the test strategy: Defects with resolution "Fixed" which are associated with the *previous* engineering part/major version or any of its releases are added to the test strategy as "defect regressions." There are no test cases associated with defect regressions (though there may be test cases associated with the defect itself, they are not used here). | | 4 |
| TEST-1.7.4.6.2 | System adds test cases for any open defects against the *previous* engineering part/major version with Priority of "Must Fix" or "Should fix." Test cases for open defects with Priority equal to "None" and Severity equal to "1" are also added to the test strategy. | If defects matching the criteria do not have associated test cases then they are ignored by the system. | 4 |
| TEST-1.7.4.7 | Final build test strategy auto-update: Triggered whenever the latest series software BOM snapshot has been flagged as a Release Candidate (does not apply to ad-hoc test strategies). | | 4 |
| TEST-1.7.4.7.1 | System adds Compatibility, FIV, and Screen Shot Capture Test Cases to the test strategy. | If a new snapshot has been generated and then flagged as an RC before the test strategy has been auto-updated, the system should also run the appropriate auto-update tasks. | 4 |
| TEST-1.7.4.8 | User can re-initiate test strategy auto-update manually at any time. | | 4 |
| TEST-1.7.4.9 | When an auto-update executes, system should display changes (test case adds, deletes, and status changes) to the user visually. | For example, using color coding. | 4 |
| TEST-1.7.5 | User can select a part on the test strategy and view all open defects. | | 3 |
| TEST-1.7.5.1 | User can add test cases associated with open defects to the test strategy. | | 3 |
| TEST-1.7.5.2 | User can add the defect as a defect regression (implies changing status to "closed" and resolution to "fixed"). | | 3 |
| TEST-1.7.6 | User can add/delete any test case or test group from a test strategy (even if the test case was added as part of an auto-update action). | | 3 |
| TEST-1.7.6.1 | If a level 1 or regression test case is deleted, a warning/confirmation dialog is displayed to the user. | Only one warning should be displayed for multiple selections. | 3 |
| TEST-1.7.6.2 | A note indicating that level 1 or regression test cases were deleted from a test strategy, and who deleted it when, should be added to the history log. | | 3 |

| ID | Description | Comments | Priority |
|---|---|---|---|
| TEST-1.7.7 | System should invalidate (set to "pending") any test case result for parts if a new release for a part on which they depend (based on dependencies defined in ePic) has been checked in. The invalidated test cases should be indicated (highlighted) for the user on screen. Results of the previous test case result should be retained by the system for reference. | This will only be done for Series Test Strategies, not Ad-Hoc ones. | 4 |
| TEST-1.7.8 | Leads can assign Test Cases on a Test Strategy to individual testers. | | 3 |
| TEST-1.7.9 | User can attach one or more test BOMs created using the function described in section 9.4.1, requirement BOM-1.9. | A test BOM can be extracted from the system via interface and used by installation tools to prepare a test system. | 4 |
| TEST-1.7.10 | User can attach one or more SKUs to the test strategy which have been created using the function described in section 9.6.1, requirement INT-1.12. | The BOM associated with the SKU can be extracted from the system via interface and used by installation tools to prepare a test system. | 5 |
| TEST-1.7.11 | When a tester accesses a test strategy, the system will display test cases/defect regressions assigned to that user, and any test cases/defect regressions not assigned to any user. Tester can update the result of each test case and the status/resolution or each defect displayed. | | 3 |
| TEST-1.7.12 | Test must select the Test System used before any test results can be changed. | | 5 |
| TEST-1.7.13 | System must provide a view of a test strategies by active series which displays the percentage of test cases completed. | See RPT-21. | 4 |
| TEST-1.8 | System must provide function to escalate defect to VELSUN (global sustaining system). | This requires an interface to the VELSUN system maintained by SDNA. | 5 |
| TEST-1.9 | System must provide function to push defect to VALSUN (software defect system used by SDNA/VBD). | This requires an interface to the VALSUN system maintained by SDNA. | 5 |
| TEST-1.10 | Reports currently provided by VSMS for CISC must be available in ePic. | | 4 |
| TEST-1.11 | All notes/text area fields should provide advanced editing functionality. | | 5 |
| TEST-1.11.1 | Spell checker functionality should be available. | | 5 |
| TEST-1.11.2 | Formatting functionality as follows:<br>• Bullets<br>• Numbered lists<br>• Color text<br>• Font selection | | 5 |
| TEST-1.11.3 | Formatting applied in edit screens should be maintained for reports. | | 5 |
| TEST-1.12 | Benchmark/MDA Field editor. User can define delete keys used for Benchmark/MDA test case categories. Only users with admin privileges can use this function. | | 3 |

9.11.2 User Interface Requirements

| ID | Description | Comments | Priority |
|---|---|---|---|
| TEST-2.1 | User interfaces for viewing test cases/strategies should provide efficient means for updating data. | | 3 |
| TEST-2.1.1 | List of test cases and defect regressions should be displayed in upper right panel. Test cases can be marked as pass/fail and defect resolution can be changed in this panel without opening other windows, only scrolling and clicking. | | 3 |
| TEST-2.1.2 | Facilitating for updating multiple test cases should be provided. | For example, check boxes for selecting test cases and action buttons that apply attribute changes to all select test cases. | 3 |
| TEST-2.1.3 | Details of each selected test case should be displayed in lower right panel. | | 3 |

| ID | Description | Comments | Priority |
|---|---|---|---|
| TEST-2.1.4 | Test cases marked as "failed" should trigger a prompt for entering a defect. Defects created in this manner will be automatically linked to the appropriate test case. | | 3 |
| TEST-2.2 | Defects can be entered directly from the main menu/navigation panel or can be entered when a test case has been marked as failed. If a defect is entered in connection with a test case the defect. | | 3 |
| TEST-2.3 | Installation tools and recovery images can be downloaded from ePic manually by UI. | Same as requirement DEV-2.2 since these items will be defined as engineering parts in ePic. | 1 |

9.11.3 Business Rules

| ID | Description | Comments | Priority |
|---|---|---|---|
| TEST -3.1 | | | |

9.11.4 Interface Requirements

| ID | Description | Comments | Priority |
|---|---|---|---|
| TEST-4.1 | VELSUN Interface. Used to escalate defects to global sustaining group. | Satisfies US sustaining requirements. | 5 |
| TEST-4.2 | VALSUN Interface. Used to push defects into software development defect database used in VBD/SDNA | | 5 |
| TEST-4.4 | Tools interface. Tools will provide functions for selecting test BOMs and SKU BOMs to be provided to installation tools. | Assumption is that testers will perform all test case/defect updating and test BOM preparation via ePic UI. | 4 |
| TEST-4.4.1 | Data to be exported:<br>• Active Series Master<br>• LangRegion Master<br>• Test BOMs<br>• SKU BOMs<br>• All DB Hero Data for Component Selector | These requirements can be merged with build tool requirements since the same tools platform will be used to interface to ePic. | 4 |
| TEST-4.4.2 | Functions to be provided:<br>• Authenticate.<br>• Get Active Series.<br>• Get open defects for engineering part (used during release check-in).<br>• Update defect status and resolution (used during release check-in).<br>• Get Test Strategy for series/part.<br>• Get Test BOMs for test strategy.<br>• Get SKU BOMs for test strategy.<br>• Get Installation Data File for series.<br>• Get Binary Data for SW Release ID (from file store).<br>• Functions to allow the component selector function to be used remotely with tools to create and save SKU BOMs. | Some functions defined in requirements INT-4.5 and INT-4.6 will be used and are duplicated here.<br><br>Test BOMs contain software release ID's and thus don't require an installation data file. SKU BOMs are DB Hero component lists and will require an Installation Data File. | 4 |

9.11.5 Definitions

9.11.5.1 Test Case Types

| Name | Description |
|---|---|
| Basic | |
| Ad-hoc | |

| Name | Description |
|---|---|
| Use Case | Describes a regular user scenario. |
| Compatibility | List of steps to test compatibility with external devices (e.g., printer or camera). |
| FIV (Final Image Validation) | |
| Benchmarks | Performance parameters captured as key/value pairs. |
| MDA (Microsoft Development Agreement) | Performance parameters dictated by Microsoft captured as key/value pairs. |
| Screen Shot Capture | Special test case consisting of just an image, which is included on the RTM report. |
| Business Unit | |
| Accessory | |
| Other | |

9.11.6 Screen Shot Mock-ups

Figures 12-17 show various non-limiting screen shots for defect submission, defect update, test case submit form, defect view, test results, and test case update, respectively.

Reporting and Notification

9.12.1 General Requirements

| ID | Description | Comments | Priority |
|---|---|---|---|
| RPTREQ-1 | System must provide a custom reporting engine which will allow custom SQL to be stored and run. | | 3 |
| RPTREQ-2 | Reports can be viewed on screen or downloaded in the following file formats:<br>• Adobe Acrobat (PDF)<br>• Microsoft Excel<br>• Comma Separated Values (CSV)<br>• XML (Test/Defect Reports only except for RTM)<br>• Microsoft Word (RTM Report Only) | XML is not required for software integration and factory deployment reports, because the installation data file contains all required information in a single XML file.<br><br>MS Word format is required for the RTM report. If Word format files cannot be generated then a format that can be imported into MS word is acceptable as a substitute. | 3 |
| RPTREQ-3 | Some complex reports are configurable by the user. Which data sets to be included and criteria for the report data can be specified before the report is generated. | Details are specified in report descriptions. | 3 |

9.12.2 Reports

The following predefined reports must be provided by ePic. Samples can be found in the appendix (chapter 13.3).

| ID | Report Name | Description | Comments | Priority |
|---|---|---|---|---|
| RPT-1 | Series Report | Report of all relevant information for a given Series (SW BOM and Metadata). | | 2 |

| ID | Report Name | Description | Comments | Priority |
|---|---|---|---|---|
| RPT-2 | Series BOM Report | Report of all relevant SW BOM information for a given Series. | | 2 |
| RPT-3 | Series Metadata Report | Report of all relevant metadata for a given Series. | | 2 |
| | | ID was skipped (it is retained to avoid confusion). | | |
| RPT-5 | BOM Report | Report of all relevant information for a given Part, Group or Release which has a BOM. | Has Optional Data Choices: parts, dependencies, parents, children, releases. | 2 |
| RPT-6 | Module Release Report | Report of all relevant information for a given Module Release including BOM and Metadata. | Has Optional Data Choices: parts, dependencies, parents, children, releases. | 2 |
| RPT-7 | Group Report | Report of all Parts and Releases in a given group. | Has Optional Data Choices: parts, dependencies, parents, children, releases. | 2 |
| RPT-8 | Image BOM Report | Report of all Parts and Releases in a given Image BOM. | Has Optional Data Choices: parts, dependencies, parents, children, releases. | 2 |
| RPT-9 | BOM Freeze Report | Report of all relevant information for a given Series BOM —which includes a report of new items, updated items, missing items, removed items (from previous report). | Previous report is an optional drop down menu of ALL available Series BOM Snapshot revisions (this means you could compare two different Series). The user would be required to select a BOM Snapshot to do the report for and then a BOM Snapshot to compare it to. If no comparison BOM Snapshot is provided it simply creates the report. | 2 |
| RPT-10 | Media Set Report | Report of all Components, Parts and Releases used in a given factory or recovery media set. | Factory Media Report would include Metadata for Factory. | 2 |
| RPT-11 | Part Report | Report of all relevant information for a given Part. | Has Optional Data Choices: part releases, dependencies, parents, children. | 2 |
| RPT-12 | Part Release Report | List of all Releases by major part with basic attribute information. | Has Optional Data Choices: dependencies, parents, children. | 2 |
| RPT-13 | Part Release Version Report | Report of all relevant information for a given Part Release Version. | Has Optional Data Choices: dependencies, parents, children. | 2 |
| RPT-14 | RTM Report | This is a multi-part report containing test system information, detailed SW BOM information, defects, test cases/results, and other items.<br><br>User must select a Series/LangRegion and one or more OSs from the report. User must also select which sub-reports to include. The system will then extract all required information from the relevant test strategy and BOMs and format it.<br><br>The report must be output in MS Word (or compatible format) since it must be edited further after being generated from ePic.<br><br>See sample in appendix (13.3.14) for more details. | Test/Defect report. | 3 |

| ID | Report Name | Description | Comments | Priority |
|---|---|---|---|---|
| RPT-15 | Test Status for Series | This Report should list 'Unresolved Defects' and 'Test Cases' that needs to be executed for a particular Series.<br><br>User can specify where test cases, defects or both are to be included in the report.<br><br>Unresolved Defects: Defects with 'Defect Status' equal to Open and 'Defect Resolution' not equal to 'Fixed', 'Deferred', 'Will not Fix', 'Duplicate.'<br><br>Defect Attributes to include in the report: Defect ID, Part, Summary, Severity, Exposure, Defect Resolution (sorted by Priority).<br><br>Test Cases that need to be executed: List of test cases with 'Test Results' equal to 'Not Tested' or 'Impeded.' | Test/Defect report. | 2 |
| RPT-16 | Test Status for all Active Series | Same as above for all active series. Sorted by Series. | Test/Defect report. | 2 |
| RPT-17 | Defect report for Individual Defect | Displays all available attributes for a defect. User can optionally request that defect history be included in the report. | Test/Defect report. | 2 |
| RPT-18 | Defects by user, team, series, cycle, etc. | This is a configurable report for Defect analysis. It is intended to be a way to export defect data for analysis into external tools or for importing to other systems.<br><br>Filtering fields for Defect: Defect ID, Defect Status, Defect Resolution, Responsible persons, Priority, Severity, Exposure, Champion, Defect Submitter, Submit Date, Close Date, Frequency, Assigned to, Microsoft Defect ID, Beta ID, Sustaining Status, Sustaining Priority, Days Open (less than or equal to given number), Series, Part.<br><br>System will include all available defect attributes in one table/data structure. | Test/Defect report. | 3 |
| RPT-19 | Test Case Report | This report is similar to RTP-18 except it is for test cases.<br><br>Filtering fields for Test Case: Test Case ID, Test Case Type, Test Results, Part, Series, Test Area, Status, Level, Submitter, Last Updated, Excluded Series, Submit Date, Linked Defects (to a particular test case).<br><br>System will include all available test case attributes in one table/data structure. | Test/Defect report. | 2 |
| RPT-20 | Test Strategy Report | Listing of test cases on a test strategy. User can optionally request a view. | Test/Defect report. PQD would like this report to function similarly to the view on http://platform.itd.sel.sony.com/ (click on "test cases" on menu). | 2 |
| RPT-21 | Test Strategy Status Report | A view of a test strategies by active series which displays the percentage of test cases completed. | | 2 |

| ID | Report Name | Description | Comments | Priority |
|---|---|---|---|---|
| RPT-22 | End-of-cycle Defect Report | This report contains summary information on various defects for one or more series and/or time periods. It is to be used as a post-cycle analysis tool.<br><br>User can select one or more Series/LangRegions. User can also select one or more cycles or date ranges (for product cycle, initial product cycle attribute of the series would be used). User can also select which sub-reports to include.<br><br>Data is exportable as PDF or excel files (it is okay if more than one excel file is generated).<br><br>The sub-reports are as follows:<br>• Defect Priority<br>• Defect Severity<br>• Defect Exposure<br>• Defect Resolution by Application Champion<br>• Defect Resolution by Module (recursive for FI BOM)<br>• Top Ten Deferred/Will Not Fix Defects. | | 3 |
| RPT-23 | Build Count | Table of Series, OS, FI build count, and Recovery media build count.<br><br>User must select cycle, date range, or all active series. | Test/Defect report. Used for end-of-cycle accounting. | 2 |
| RPT-24 | FI Test Case Report | Test Case results for a cycle or date range by FI release. | Test/Defect report. | 2 |
| RPT-25 | Module Test Case Report | Test Case results for a cycle by Series SW BOM snapshot (test strategy). | Test/Defect report. | 2 |

9.12.3 Notification

9.12.3.1 General Requirements

| ID | Description | Comments | Priority |
|---|---|---|---|
| NOTE-1 | Email notifications will not be tied to roles, but functions for adding sets of email addresses to a notification list by system role or group should be available. Any email address can be added to a notification list (not just system users). | | 4 |
| NOTE-2 | When a new user is assigned a role in ePic system should present a list of events to the administrator for which notification is available. User will be added to the list for any events selected. | | 4 |
| NOTE-3 | All notification lists can be edited manually in the system. | | 4 |

9.12.3.2 Events

The following events will trigger email notification to users. On screen notifications are indicated elsewhere in this document.

| ID | Description | Reference | Comment |
|---|---|---|---|
| EVENT-1 | Email notification is issued when a release check-in is completed (files have been uploaded to file store). | DEV-1.2.8 | |
| EVENT-1.1 | Email notification lists should be stored for each Engineering Part Type (editable via admin screen). | | This requirement will satisfy the need to monitor image builds (Pilot, RC, GM events). |
| EVENT-2 | RTM email notification requirements. RTM emails should be sent when "Test RTMs," "RTMs," and "running change RTMs" are issued in the system. | MFG-1.2.2, MFG-1.3.2 | |
| EVENT-2.1 | Email lists should be maintained by series. | | |

| ID | Description | Reference | Comment |
|---|---|---|---|
| EVENT-2.2 | Emails should clearly indicate which event for which the email is being sent. | | |
| EVENT-2.3 | Each email notification should contain a unique identifier in the subject line and body of the message that can be used to refer to the message. RTM email notifications should be logged in a history log that can be viewed via ePic UI. | | |
| EVENT-2.4 | Email content should also be attached as a PDF document to the email message (to be used as official documentation). | | |
| EVENT-3 | Series SW BOM snapshot created. Changes since the last snapshot (per MFG-1.3.2) should be included in the notification. | | Notification of changes to the Series SW BOM (module/image insertions). |
| EVENT-3.1 | Email lists are maintained by Series. | | |
| EVENT-4 | Series Software BOM snapshot flagged as release candidate. | | This is a "BOM Freeze". |
| EVENT-4.1 | Email lists are maintained by Series. | | |
| EVENT-5 | Defect submission or defect status/resolution change. Defect monitoring is performed by engineering part. Users can also choose to receive all. | | |
| EVENT-5.1 | Application champion and any users on the owner list for the affected engineering part should be automatically added to the notification list. Any owners of a test case associated with the part must also be notified. | | If a user wants to monitor a specific part they must be added to the owner list. |
| EVENT-5.2 | Users can also subscribe to receive defects events by Series and/or LangRegion. | | |
| EVENT-6 | New series loaded in ePic from DB Hero. | | |

9.13 Administration

9.13.1 Usage Requirements

| ID | Description | Comments | Priority |
|---|---|---|---|
| ADM-1.1 | Add/edit user. | | 1 |
| ADM-1.1.1 | User is required to be associated with an engineering organization. | | 1 |
| ADM-1.1.2 | User can be assigned one or more roles. | | 1 |
| ADM-1.1.3 | Users email address must be stored by system. | | 1 |
| ADM-1.2 | Add/edit engineering organization. | U | 1 |
| ADM-1.2.1 | Engineering organizations can be Sony or 3rd party. | U | 1 |
| ADM-1.3 | Manage 3rd party data access. | U | 3 |
| ADM-1.3.1 | One or more series can be assigned to a 3rd party organization. The 3rd party organization users will only be able to see/download data concerning the series' which have been assigned to them. | U | 3 |
| ADM-1.4 | Add/edit LangRegion's. | U | 1 |
| ADM-1.4.1 | User can add/remove LangRegions to/from the master. | | 1 |
| ADM-1.4.2 | DB Hero SPECS are mapped to corresponding LangRegions defined in the system. | This requirement can be dropped if LangRegion relationship to DB Hero SPECS and COMPONENTS can be identified programmatically. | 1 |
| ADM-1.5 | System will provide functionality to make batch changes to attributes entities. User can search for entities, select groups of items to change, and change one or more attributes for all items in the group. | This is an admin function only. Users must change items one by one. | 2 |

| ID | Description | Comments | Priority |
|---|---|---|---|
| ADM-1.6 | System should provide a function for defining teams of users. | Some test/defect functions call for assignment to a team. The group management functionality implemented in ePic prototypes may satisfy this requirement. | 2 |
| ADM-1.7 | Admin functions for defining values for Test Area (10.4.9, TST-006) and Status (10.4.9, TST-013) should be available. | | 2 |

9.13.2 User Interface Requirements

| ID | Description | Comments | Priority |
|---|---|---|---|
| ADM-2.1 | | | |

9.13.3 Business Rules

| ID | Description | Comments | Priority |
|---|---|---|---|
| ADM-3.1 | | | |

9.13.4 Interface Requirements

| ID | Description | Comments | Priority |
|---|---|---|---|
| ADM-4.1 | | | |

9.14 ePic Interface Library

This section describes requirements for the ePic database interface library API for Build Tools and Test System Preparation Tools. Some interface requirements and tools requirements in other sections of this document are satisfied in whole or in part by this API.

VOA tools covered are Magellan and Modular Image Network Download System (MINDS).

All VOA build tools use ePic data, but most of the tools use flat files created by Magellan, as the source of data. Build tools also check in software releases and images and thus need to be able to write data to the ePic database and upload files to the file store.

VOA test system preparation is performed using MINDS tools. These tools are provided on a WinPE CD. This toolset will be made available to ePic users.

SDNA will use VOA provided build tools.

9.14.1 ePic Database Interface Requirements

The ePic database interface should provide the following functions. When a "Recordset" is specified as return value, all applicable attributes for the entity should be included in the Recordset.

| ID | Function | Parameters | Return value | Comments | Used By | Priority |
|---|---|---|---|---|---|---|
| DLL-1 | Authenticate | User<br>Password<br>Action (optional) | UserID<br>SecurityToken | Authenticate user. The security token should be passed on to all other functions. All other functions can then check for a valid security token before getting data. | Magellan,<br>MINDS | 2 |
| DLL-2 | GetImageBOMData | SecurityToken<br>BOM Snapshot ID<br>isBasePlus (optional)<br>isOPK (optional)<br>isRecoverable (optional) | Recordset | This function should return all items on the specified Image BOM that meet the criteria set by the optional arguments. If an optional argument is not passed to the function, that criteria should be ignored | Magellan | 1 |
| DLL-3 | GetModulesEPCs | SecurityToken<br>Series ID<br>LangRegion<br>isPermanent (optional) | Recordset | This function should return all modules and EPCs for the specified Series/LangRegion. If Permanent argument is True, return all permanent items. If it is False, return all temporary items. If it is not specified return all items. | Magellan | 1 |
| DLL-4 | GetSeries | SecurityToken | Recordset | This function should return all active series. | Magellan,<br>MINDS | 1 |
| DLL-5 | GetLangRegions | SecurityToken | Recordset | This function should return all available LangRegion values. | Magellan,<br>MINDS | 1 |
| DLL-6 | GetBOMList | SecurityToken<br>Series ID<br>LangRegion<br>isImageBOM (optional)<br>isModuleBOM (optional) | Recordset | This function should return a list of available Image BOM Snapshots/Module BOM Snapshots/ All BOM Snapshots (depending on optional arguments) for given Series/LangRegion. | Magellan,<br>MINDS | 1 |
| DLL-7 | GetBOM | SecurityToken<br>BOM Snapshot ID | Recordset | This function should return the BOM contents (parts release list) for selected BOM Snapshot ID. | Magellan,<br>MINDS | 1 |
| DLL-8 | UploadFiles | SecurityToken<br>Part Release ID<br>Files to be uploaded. | Boolean | This function should upload Part Release files to the ePic file store. One function call should upload all the required files. We do not want to call this function for each file. This function *must* be called after CheckInPart Release. It may be called minutes or hours after CheckInPartReleasefor modules (because modules require release ID to be embedded in the module). | Magellan,<br>MINDS | 1 |

| ID | Function | Parameters | Return value | Comments | Used By | Priority |
|---|---|---|---|---|---|---|
| DLL-9 | CheckInPartRelease | SecurityToken<br>All Part Release data for this Part Type. | Part Release ID | This function should add a new Part Release to the ePic database. | Magellan | 1 |
| DLL-10 | UpdatePartRelease | SecurityToken<br>Part Release ID.<br>All other Part Release data for this Part Type. | Boolean | This function should update Part Release record. This function is required as some part releases may be created using ePic and then updated from Magellan | Magellan | 1 |
| DLL-11 | GetSeriesForPart | SecurityToken<br>Part ID | Recordset | This function should return a list of Series that have this Part on their BOM Templates. | Magellan | 2 |
| DLL-12 | AddPartReleaseToSeries | SecurityToken<br>Part Release ID<br>Series IDs | Boolean | This function should assign the specified Part Release to one or more Series. | Magellan | 2 |
| DLL-13 | GetDefectsForPart | SecurityToken<br>Part ID<br>Status (optional) | Recordset | This function should return a list of defects that are currently assigned to this Part. Optionally result set can be filtered by defect status. | Magellan | 2 |
| DLL-14 | UpdateDefects | SecurityToken<br>Part Release ID<br>Defect IDs<br>New Defect Statuses<br>New Defect Resolutions<br>New Defect Notes | | This function should update the defect status of specified defects. This allows the user to specify what defects have been fixed in this Release | Magellan | 2 |
| DLL-15 | GetReleaseEmailContents | SecurityToken<br>Part Release ID | Text | Get the email text. This is used to display the email notification to the user before it is actually sent out.<br>Emails sent from Magellan will provide information on PAC Files, FI image, AppInfo and DataFile contents. | Magellan | 2 |
| DLL-16 | SendMail | SecurityToken<br>Part Release ID<br>CCText | Boolean | Send email notification. The contents of the email will be generated automatically like part releases checked in from ePic. Emails sent from Magellan will have a different target recipient list. User should be able to add additional recipients. | Magellan | 2 |
| DLL-17 | LaunchComponentSelector | SecurityToken<br>Series ID<br>LangRegion is FreeStyle. | String/Recordset | Launch Component Selector to allow user to select a configuration, check for validity and returns valid selection of parts.<br>This is used to create a SKU BOM in freestyle mode | MINDS | 2 |
| DLL-18 | GetSKUBOMSnapshotList | SecurityToken<br>Series ID<br>LangRegion | Recordset | This function should return a list of available SKU BOM snapshots for given Series/LangRegion | MINDS | 2 |

| ID | Function | Parameters | Return value | Comments | Used By | Priority |
|---|---|---|---|---|---|---|
| DLL-19 | GetSKUBOM | SecurityToken<br>BOM Snapshot ID | Recordset | This function should return the SKU BOM contents (parts list). It should also return the installation data file (either as XML or location from where it can be obtained). | MINDS | 2 |
| DLL-20 | AddLog | SecurityToken<br>MACAddress<br>IPAddress<br>SessionID<br>User<br>Action PartReleaseName<br>ReleaseID<br>Size<br>StartTimestamp<br>EndTimestamp<br>Time<br>Mode | BOOL | This function adds a record to the log. | MINDS | 2 |
| DLL-21 | GetLog | SecurityToken<br>LogID (optional) | Recordset | This function should get the specified log record. | MINDS | 2 |
| DLL-22 | GetSystemTime | SecurityToken | String | Get time on DB server; value used in AddLog. (This can be implemented within AddLog in which case this function is not required). | MINDS | 2 |
| DLL-23 | IsHDDProject | SecurityToken<br>Series<br>LangRegion | BOOL | Check if Series uses HDD recovery | MINDS | 2 |

9.14.2 Technical Requirements

- Database access for use in MINDS must be able to run in the stripped down version of Windows, Windows Preinstall Environment. (This generally means the code must be written in C++. It's possible to write the programs in Java, Python, Perl, etc., but this would need to be tested and set up within WinPE.)
- The Database Interface Layer should support applications running in different environments and developed using different programming languages, as shown in the Appendix 1.3.1.
- All functions in the ePic Database Library should implement stateless security. For example, The Authenticate function should return a SecurityToken object that is then passed to other functions. These functions then check if the security token is valid before interacting with the database. Any other security mechanism can also be used.

9.14.3 Architecture

9.14.3.1 VOA Tools

Figure 18:
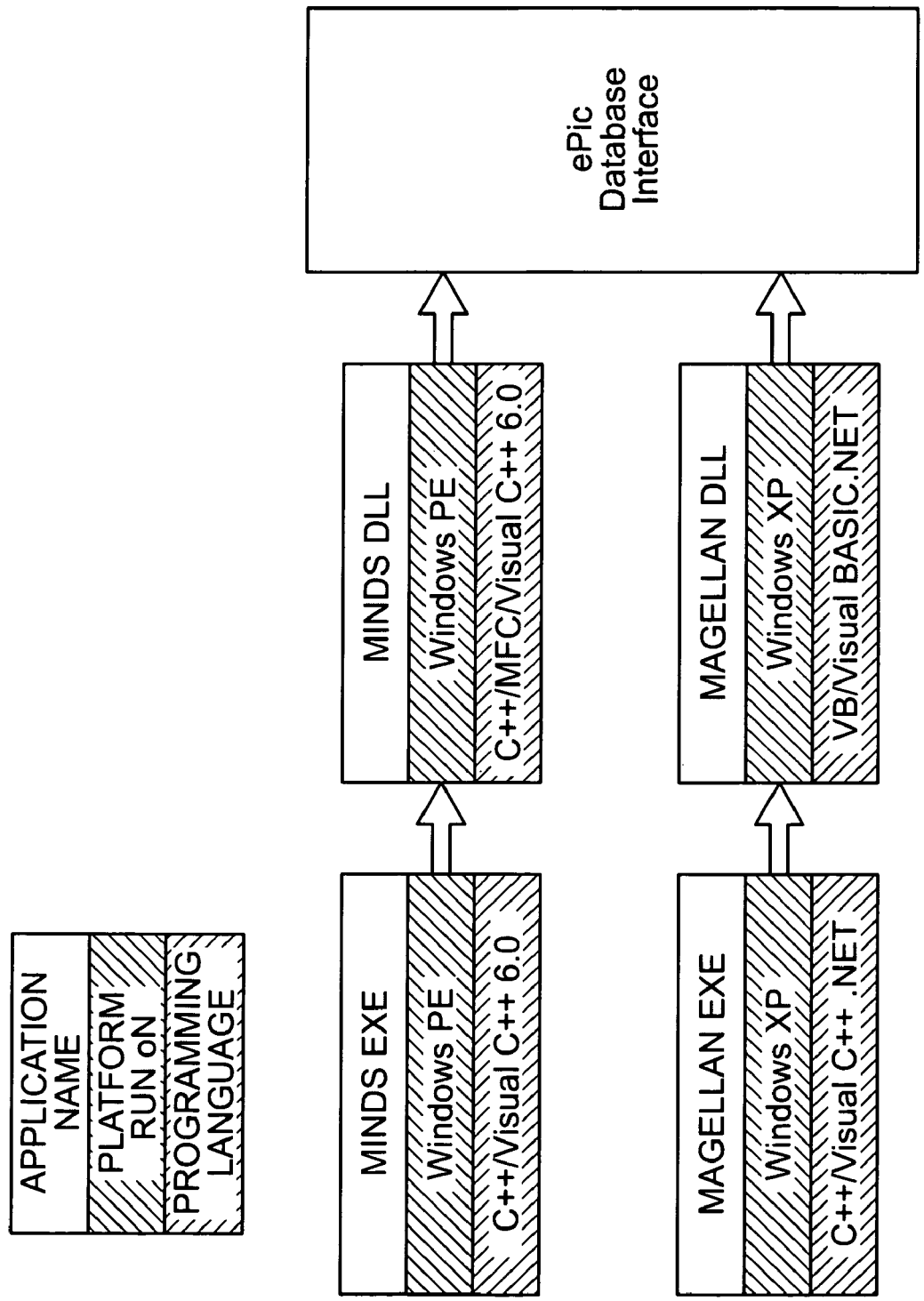
FIG. 18 is a diagram showing software inputs to the ePic database interface.

Figure 18 shows the non-limiting architecture of VOA Tools.

9.14.4 Usage Scenarios

9.14.4.1 MINDS usage scenarios

Figure 18A:
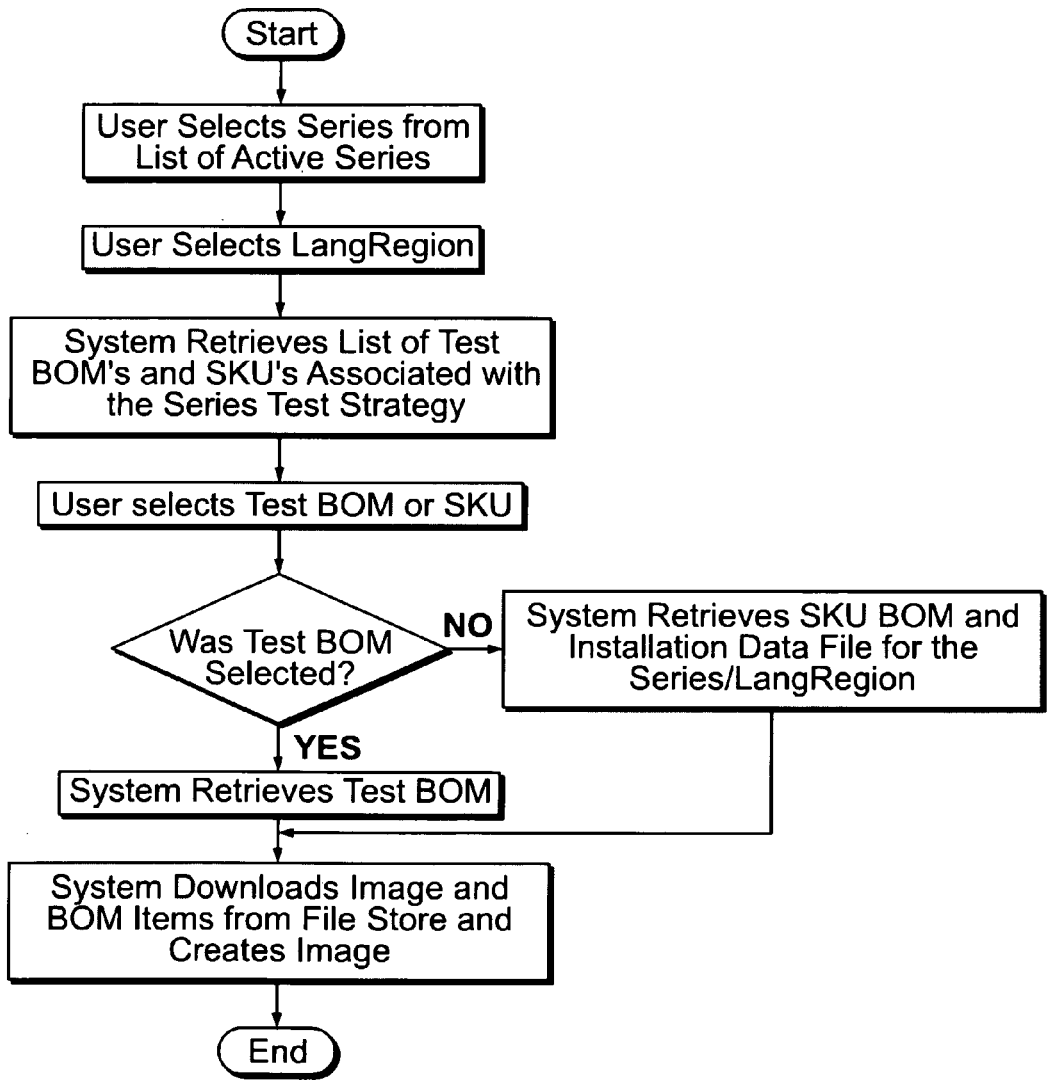
FIG. 18A is a flow chart of logic of downloading an image to a test system.

9.14.4.1.1 Download image to test system from MINDS CD.
Figure 18A logic can be used by testers and by integrators.

9.14.4.1.2 Upload Foundation Image.
Figure 19 refers, which has been described above and which can be used by integrators.

9.15 Sustaining

This section describes requirements for ePic from the Global Sustaining Group. These requirements will extend existing functionality.

9.15.1 Usage Requirements

| ID | Description | Comments | Priority |
|---|---|---|---|
| SUS-1.1 | Sustaining modules will be managed in ePic. | | 5 |
| SUS-1.1.1 | A new part type "Sustaining Module" must be added to ePic. | | 5 |
| SUS-1.1.2 | Addition sustaining specific attributes must be supported. | | 5 |
| SUS-1.1.2.1 | Sustaining ID (or SP-ID), separate from normal Part/Release ID must be maintained by ePic and returned when applicable by check-in functions. (ePic will manage this sequence.) | | 5 |
| SUS-1.1.3 | Sustaining module release notifications will be sent to a different email notification list than for other modules. | | 5 |
| SUS-1.1.4 | Sustaining modules must have a unique identifier embedded in them to support post-installation verification by "VAIO Update" software. | This is similar functionality as other ePic modules. | 5 |
| SUS-1.2 | Sustaining users should be able to retrieve software BOM information from ePic UI. | | 5 |
| SUS-1.3 | Support groups require a network installation system. | Test System Preparation CD can be used for this purpose. | 5 |
| SUS-1.4 | Maintenance Desk requires Recovery Media (RDVD's/Fulfillment Media). | | 5 |
| SUS-1.5 | Module Specification should be unified with Sustaining Patch specification. | This is so developers only need to create on format. | 5 |
| SUS-1.6 | Software BOM views in ePic should also display any applicable sustaining patches. | | 5 |
| SUS-1.7 | Search function should allow entry of a model name. | | 5 |
| SUS-1.8 | Search functions should allow Series/LangRegions to which a particular sustaining patch has been applied to be to be found by Sustaining Part ID (SP-ID). | | 5 |
| SUS-1.9 | User can use Part Name/Major Version as a search key to find Series/LangRegion or list of sustaining patches. | | 5 |
| SUS-1.10 | Legacy data must be maintained in ePic for a time period suitable to sustaining. | | 5 |

9.15.2 User Interface Requirements

| ID | Description | Comments | Priority |
|---|---|---|---|
| SUS-2.1 | | | |

9.15.3 Business Rules

| ID | Description | Comments | Priority |
|---|---|---|---|
| SUS-3.1 | | | |

9.15.4 Interface Requirements

| ID | Description | Comments | Priority |
|---|---|---|---|
| SUS-4.1 | | | |

10 Data Model

10.1 Concepts

Figure 20:
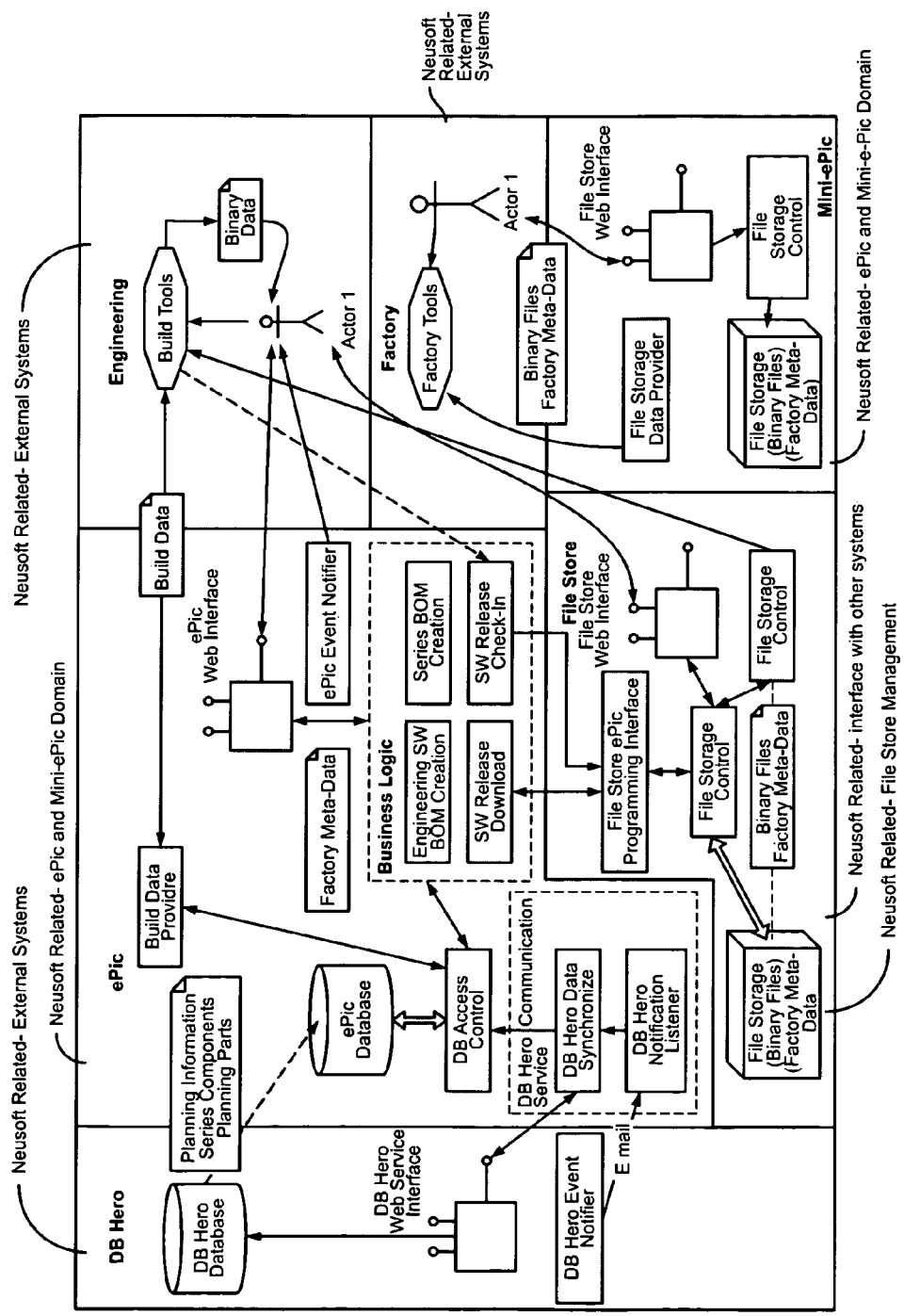
FIGS. 20 and 21 are consolidated diagrams showing the interaction between various entities in a non-limiting implementation.

Figure 20 shows the overall, non-limiting system architecture for Sony PC production. The figure gives an overview for an ePic related systems diagram.

10.2 Data Structure

Figure 21:
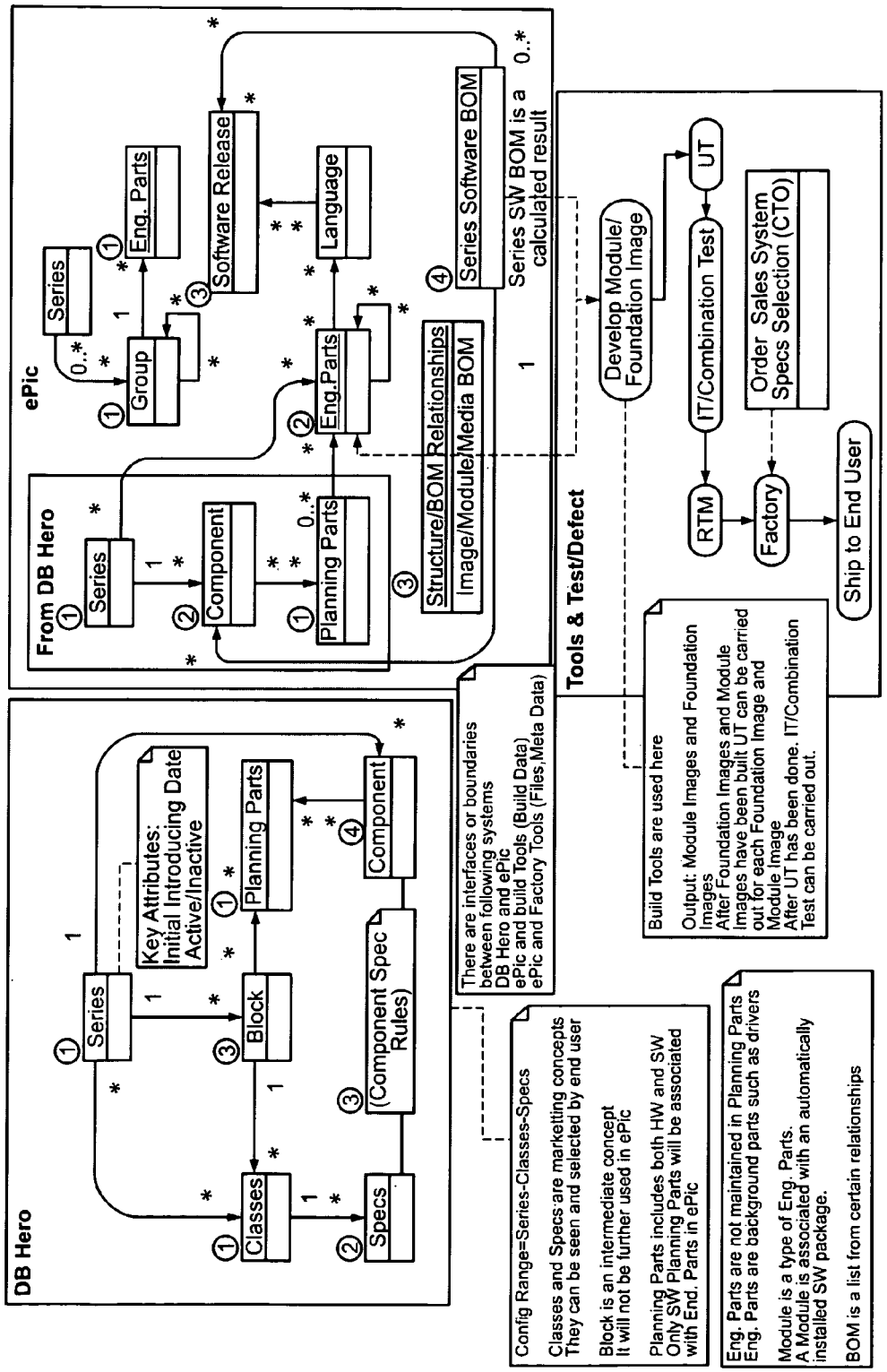

Moving to Figure 21, the data structure and flow chart of ePic are shown.

10.3 Database Entities

Figure 22:
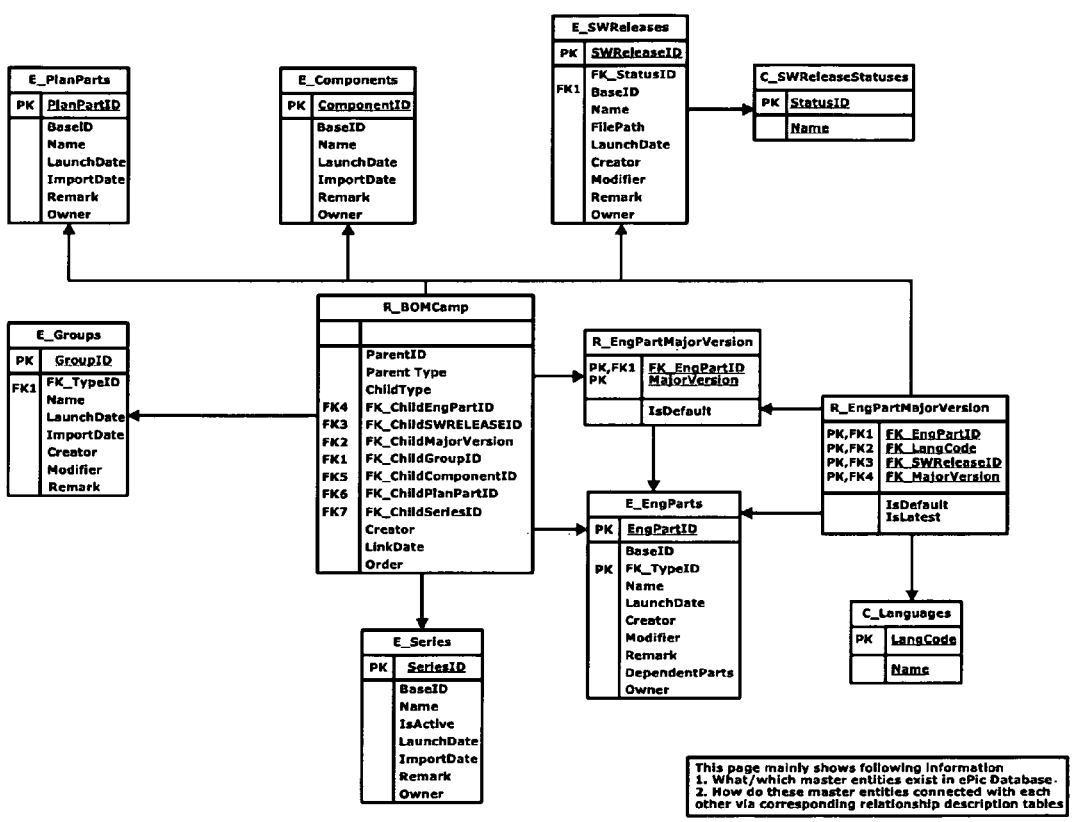
FIG. 22 is a diagram showing various data entities in the ePic database and some of their attributes.

Figure 22 illustrates a non-limiting ePic database entities diagram.

10.4 Attributes

10.4.1 Series

| ID | Attribute Name | Description | Comments | Intended Usage | Examples | Required | Modifiable | Basic Search | Ext. Search |
|---|---|---|---|---|---|---|---|---|---|
| SER-001 | Series ID | Auto-generated system identifier. | | | | | | | |
| SER-002 | Series Name | IRX or ATX number. | | | IRX-3150, ATX-2230 | Y | N | Y | Y |
| SER-003 | Code Name | Textual code name for the series. | | | Diablo EPD | Y | N | Y | Y |
| SER-004 | Marketing Name | There will be many (region to region, cycle to cycle). For Example: PCV-RS500 | May be mapped to a series SW BOM and one or more LangRegions. Functionality depends on DB Hero handling of Marketing Model name. | Selection criteria in system screens reporting. | VGN-S270, VGN-S27, VGN-S270A, VGC-RB30, VGC-RB30C | Y | Y | Y | Y |
| SER-005 | On Sales Date | One date for each LangRegion. | Maintained independently in ePic. May be useful for satisfying sustaining requirements. | Reporting. | | N | Y | N | Y |

| ID | Attribute Name | Description | Comments | Intended Usage | Examples | Required | Modifiable | Basic Search | Ext. Search |
|---|---|---|---|---|---|---|---|---|---|
| SER-006 | Off Sales Date | One date for each LangRegion. | Maintained independently in ePic. May be useful for satisfying sustaining requirements. | Reporting. | | N | Y | N | Y |
| SER-007 | End of Life | Yes/ No. Defaults to no. | Maintained independently in ePic. May be useful for satisfying sustaining requirements. | Reporting. | | N | Y | N | Y |
| SER-008 | Status | Planning, active, archive, obsolete, sustaining. | Maintained independently in ePic. | Reporting. | | Y | Y | Y (req) | Y (req) |
| SER-009 | Comments | Long description of a series. | Maintained independently in ePic. | Reporting. | | N | Y | N | Y |
| SER-010 | Created By | | Series should not be created manually -- only imported from DB Hero. DB Hero "created by" is not necessary here. | | | | | | |
| SER-011 | Created Date | | | | | | | | |
| SER-012 | Active | Yes/ No | Maintained independently in ePic. | Control display and default series lists. | | Y | Y | Y | Y |
| SER-013 | Planning Cycle/Season | List of planning cycles applicable for this series. | | Reporting. | 2005 Q3, 2005 Q4, 2006 Q1 | Y | Y | Y | Y |
| SER-014 | Change Log | History, system generated/maintained | Maintained independently in ePic. | | | | | | |
| SER-015 | Production Site | List of production sites for this series. | Maintained independently in ePic. | May be used for RTM and test-RTM release status by production site to facilitate file store functionality and reporting. | NFCH, UCCH, DPCH, IT-M, SNT | N | Y | N | Y |
| SER-016 | LangRegions Supported | List of LangRegions to be supported by this engineering part. | Maintained independently in ePic. | Used to filter the list of LangRegions on screens and for reporting. | en_US, en_UK, jp_JP, etc. | N | Y | Y | Y |

10.4.2 Components

| ID | Attribute Name | Description | Comments | Intended Usage | Examples | Required | Modifiable | Basic Search | Ext. Search |
|---|---|---|---|---|---|---|---|---|---|
| COM-001 | Component ID | | | | | | | Y | Y |
| COM-002 | Component Name | | | | | | | Y | Y |
| COM-003 | Active | Yes/No | | | | | | Y | Y |
| | | | Components are unique per series so this is really a series attribute. | | | | | Y | Y |
| COM-005 | Type | | | | | | | N | Y |
| | | | Components are system generated in | | | | | N | Y |

| ID | Attribute Name | Description | Comments | Intended Usage | Examples | Required | Modifiable | Basic Search | Ext. Search |
|---|---|---|---|---|---|---|---|---|---|
| | | | DB Hero. There is no comments field. | | | | | | |
| COM-007 | Child Parts | List | | | | | | N | Y |
| COM-008 | List of Specs | Spec-to-Component relationship may be needed for ePic functionality. | | | | | | N | Y |

10.4.3 Planning (DB Hero) Parts

| ID | Attribute Name | Description | Comments | Intended Usage | Examples | Required | Modifiable | Basic Search | Ext. Search |
|---|---|---|---|---|---|---|---|---|---|
| PP-001 | Part Name | | | | | | | Y | Y |
| PP-002 | Part ID | DB Hero Part Number (not vendor part number). | | | | | | Y | Y |
| PP-003 | Active | Yes/No | | | | | | Y (req) | Y |
| PP-004 | SW/HW | Flag | | | | | | Y | Y |
| PP-005 | Major Version | | Assumption is that it will be separated from description in DB Hero fro SW items. | | | | | Y | Y |
| PP-006 | Vendor | | | | | | | Y | Y |

10.4.4 Engineering Parts

| ID | Attribute Name | Description | Comments | Intended Usage | Examples | Required | Modifiable | Basic Search | Ext. Search |
|---|---|---|---|---|---|---|---|---|---|
| EP-001 | Part Name | This is only application name with no version information. | | Can be added to a group. | Adobe Premiere, Sonic Stage Studio, Radeon 7500 Driver | Y | | Y | Y |
| EP-002 | Parent Planning Part | | Relation | Used to facilitate Series SW BOM creation. | Index to DB Hero | N | Y | Y | Y |
| EP-003 | Active | Yes/No | | Used to control display of parts to users. Only active parts should be shown in most screens. Inactive part releases can be archived from file store. | flag (0 or 1) | Y | Y | Y (req) | Y (req) |

| ID | Attribute Name | Description | Comments | Intended Usage | Examples | Required | Modifiable | Basic Search | Ext. Search |
|---|---|---|---|---|---|---|---|---|---|
| EP-004 | Major Version | Major version number (For Example: 1.1, 1.2, 1.3). | New major versions are created when specifications change -- not when defects are fixed or minor changes are made. | Can be added to a group. | 1.1, 2.4, 6.0, 7.0, 4.2.00.06070(Not for LA) | Y | Y | Y | Y |
| EP-005 | Part Type | Image, OS Setup, Installable Application, Internal Tools, BIOS/Firmware, Media Set, Other | See below. | | Lookup List including: Image, OS Setup, Installable Application, Internal Tools, BIOS/Firmware, Media Set, Other | Y | N | Y | Y |
| EP-006 | Part Sub Type | Image (Foundation, P1, Monolithic Image) / Installable Application (Application, Driver, Online Documents, OS Add-on, Module) / Media Set (Recovery, Factory) | See below. | | Lookup List including: Image (Foundation, P1, Monolithic Image) / Installable Application (Application, Driver, Online Documents, OS Add-on, Module) / Media Set (Recovery, Factory) | Y | N | Y | Y |
| EP-007 | Dependency Append | Textual description of a dependency that is not enforced by the system. | | Information for builders. | Text field: IE can only be installed on Tuesday. | N | Y | N | Y |
| EP-008 | Dependency | List of parts with "Don't care," "Need," or "Exclude" specified for each part. System can enforce/interpret these dependencies. | | Used to validate/complete release lists for testers and during BOM creation. | Relation to another engineering part index. | N | Y | N | Y |
| EP-009 | Install Order | List of parts with "Don't care," "Before," or "After" specified for each part. | | Used by installation tools to control order of release install. | Relation to another engineering part index. | N | Y | N | Y |
| EP-010 | Customer Label | Used in Single Application Recovery. Text for each LangRegion. | | Displayed to customer during application recovery. | Adobe Premiere Standard for Windows XP English, nVidia Graphics Driver, DVGate 2.0 | Y (for recoverable applications only) | Y | N | Y |
| EP-011 | Customer Desc | Marketing Desc/Hover text used in Single Application Recovery. Text for each LangRegion. | | Displayed to customer during application recovery. | Instant Video Everywhere: Sign up for IP Video Conferencing. | Y (for recoverable applications only) | Y | N | Y |

| ID | Attribute Name | Description | Comments | Intended Usage | Examples | Required | Modifiable | Basic Search | Ext. Search |
|---|---|---|---|---|---|---|---|---|---|
| EP-012 | BLID | Used for Foundation Image sub type only. BLID = BIOS Lock ID. | Assigned manually currently. Uniquely identifies foundation image in VOA. One FI can have multiple BLIDs in VBD/VOE. | Used during installation of releases. Stored in DMI. | UCV156PEUM | Y (for FI only) | Y | Y | N |
| EP-013 | Is Default | Yes/no (default for each Part Name, Major Version, Release, LangRegion combination). Defaults to false. | Actual implementation per the data model provided by Neusoft. | Creating Snapshots of BOM Templates (Groups). | flag (0 or 1) | Y | Y | N | Y |
| EP-014 | Champion | Person responsible for testing info. One or more persons can be listed. | | | Relation to a user index. | N | Y | N | Y |
| EP-015 | Owner | Contact Persons/Developer. One or more persons can be listed. | | | Relation to a user index | Y | Y | N | Y |
| EP-016 | Localized By | Eng. Organization which localized the part. Manually maintained. | | For information only. Not used by system. | text field: VOE, SDNA, VOA, STC, VBD | N | Y | N | Y |
| EP-017 | Target Series | List that describes BOM template(this part needs to go on these series). Specified by developers, integrators. Used to generate series s/w bom. | | | IRX-3440, IRX-3760, ATX-7100 | N | Y | N | Y |
| EP-018 | Series Dependency | Text description for information, if any. | | For information only. May be used by builders/testers. | Text description for information, if any. | N | Y | N | Y |
| EP-019 | Supported LangRegions | List of LangRegions to be supported by this part. | | Unsupported LangRegions should not be shown to users in other screens/functions. | Relatuion to Language Region indexes: ENU-US, ENU-UK, SPA-LA, etc. | N | Y | N | Y |
| EP-020 | Localized Variation | Yes/No -- enables functionality for defining Planned Localized Variations. | | UI control. | flag (0 or 1) | N | Y | Y | Y |
| EP-021 | Planned Localized Variation | A named group of LangRegions. The name of variation is manually specified and can be anything. For example: "EN-NTSC" -> en_US, en_UK; "EN-PAL"->en_DE | | Alternate way to select multiple LangRegions for screen functions. Releases are associate with LangRegions and not Planned Release Variations. | Look up table to LangRegionGroups | N | Y | N | Y |
| EP-022 | Change Log | History, system generated/maintained. | All changes should be logged with who and when. | | History, system generated/maintained. | | | | |

| ID | Attribute Name | Description | Comments | Intended Usage | Examples | Required | Modifiable | Basic Search | Ext. Search |
|---|---|---|---|---|---|---|---|---|---|
| EP-023 | OS | XPP, XPH, MCE, WinPE, etc. Only used when Part Type is Image. | | | XPP, XPH, MCE, WinPE, etc. Only used when Part Type is Image. | Y | Y | N | Y |
| EP-024 | EPC/Module/X-Module | For Module sub-types only. Select one of these (mutually exclusive). EPC = Engineering Process Change. | Used in VSMS (VOA) to describe a Module. May change pending installation tool/recovery specification definition. | Used by builders and installation tools. | Look up table : EPC/Module/X-Module. | Y (for modules only) | Y | N | Y |
| EP-025 | Is Temporary | Specifies the part must be deleted from recovery partition after installation in the factory. Defaults to *false*. | Inverse of VOA "Is Permanent" attribute. | Used by installation tools. | flag (0 or 1) | N | Y | N | Y |
| EP-026 | SpecificationFreezeSched | One date for each Planned Localized Variation. | | For information only. In the future, will be used to trigger email notifications. | Date field per LangRegionGroup specified above. | N | Y | N | Y |
| EP-027 | GUIFreezeSched | One date for each Planned Localized Variation. | | For information only. In the future, will be used to trigger email notifications. | Date field per LangRegionGroup specified above. | N | Y | N | Y |
| EP-028 | FeatureFreezeSched | One date for each Planned Localized Variation. | | For information only. In the future, will be used to trigger email notifications. | Date field per LangRegionGroup specified above. | N | Y | N | Y |
| EP-029 | RCRelaseSchedule | One date for each Planned Localized Variation. | | For information only. In the future, will be used to trigger email notifications. | Date field per LangRegionGroup specified above. | N | Y | N | Y |
| EP-030 | GMReleaseSched | One date for each Planned Localized Variation. | | For information only. In the future, will be used to trigger email notifications. | Date field per LangRegionGroup specified above. | N | Y | N | Y |
| EP-031 | GMReleaseActual | One date for each Planned Localized Variation. | | For information only. In the future, will be used to trigger email notifications. | Date field per LangRegionGroup specified above. | N | Y | N | Y |
| EP-032 | Default Installer Type (select from list). | INF, EXE/BATCH, FILE COPY | Install Property : Defined in MajorVersion as defaults, carried over to Release, can be modified at check-in. | | lookup table: INF, EXE/BATCH, FILE COPY | N (for major version) | Y | N | Y |

| ID | Attribute Name | Description | Comments | Intended Usage | Examples | Required | Modifiable | Basic Search | Ext. Search |
|---|---|---|---|---|---|---|---|---|---|
| EP-033 | Default Setup File | Path to setup file relative to top level folder of release. Text Field. | Install Property: Defined in MajorVersion as defaults, carried over to Release, can be modified at check-in. | Used by build tools to find setup executable. | \setup.exe or \DVGATE\config\setup.exe | N (for major version) | Y | N | Y |
| EP-034 | Default Command Line Arguments | Arguments to be passed to "Setup File". Text Field. | Install Property: Defined in MajorVersion as defaults, carried over to Release, can be modified at check-in. | Used by build tools when running setup executable. | /quiet /passive /norestart -s | N (for major version) | Y | N | Y |
| EP-035 | Default OPK | Yes/No: Set for each Engineering Organization | Install Property: Defined in MajorVersion as defaults, carried over to Release, can be modified at check-in. | Used by build tools. | flag (0 or 1) | Y (for major version) | Y | N | Y |
| EP-036 | Default Base Plus | Yes/No: Set for each Engineering Organization | Install Property: Defined in MajorVersion as defaults, carried over to Release, can be modified at check-in. | Used by build tools. | flag (0 or 1) | Y (for major version) | Y | N | Y |
| EP-037 | Default Recoverable | Yes/No: Set for each Engineering Organization | Install Property: Defined in MajorVersion as defaults, carried over to Release, can be modified at check-in. | Used by tools. | flag (0 or 1) | Y (for major version) | Y | N | Y |
| EP-038 | Default Interactive | Yes/No: user interaction required? | Install Property: Defined in MajorVersion as defaults, carried over to Release, can be modified at check-in. | Used by build tools. | flag (0 or 1) | Y (for major version) | Y | N | Y |

| ID | Attribute Name | Description | Comments | Intended Usage | Examples | Required | Modifiable | Basic Search | Ext. Search |
|---|---|---|---|---|---|---|---|---|---|
| EP-039 | Vendor | Vendor of the software. | This is simply an additional attribute. It should not be concatenated with part name. There should be a separate table with basic Vendor information. Vendor name may also be included in part name if it makes sense. | | Relation to Vendor Index | Y | N | Y | Y |

10.4.4.1 Engineering Part Types

| Type | Sub-Type | Description | Special Requirements |
|---|---|---|---|
| Image | | Image file(s) | |
| | Foundation | | |
| | P1 | WinPE image used for HDD Recovery Partition. | |
| | Monolithic Image | | |
| OS Setup | | OPK unattend setting, i386 folder. | May include some OPK specific attributes. |
| Installable Application | | Installed on customer partition. | |
| | Application | Application as delivered from vendor. May be repackaged. | |
| | Driver | | |
| | Online Documents | PDF Files and other documents installed on systems. | |
| | OS Add-on | QFE's, Patches | |
| | Module | Packaged application: non-interactive installation, secured, ready for factory delivery. Usually includes an application and some internal tools. | Can be X-module, module, or EPC. |
| Internal Tools | | Tools, DLL layer, P1 tools/files. | |
| BIOS/Firmware | | Firmware updates not recoverable by customer. | |
| Media Set | | | |
| | Recovery | Customer recovery media. | |
| | Factory | Media set for factory deployment. | |
| Other | | Catch all for other types of files. Can be anything, For Example "manual settings requests." | |

- Part types will have different system workflows.

- Some types or sub-types may require additional attributes to be captured in the system.
- Functionality for sub-types within a part type is mostly the same.

10.4.4.2 LangRegion Table

The following table lists the LangRegions to be used initially.

| Language | LangRegion | Description |
|---|---|---|
| en | en_US | English for USA. |
|  | en_GB | English for UK and other EU. |
|  | en_int | English for Asia Pacific. |
| de | de_DE | German for Germany, Austria, Switzerland. |
| fr | fr_FR | French for France, Belgium, Switzerland. |
|  | fr_CA | French for Canada. |
| ja | ja_JP | Japanese for Japan. |
| ko | ko_KR | Korean for Korea. |
| es | es_ES | Spanish for Spain. |
|  | es_lat | Spanish for Latin America. |
| it | it_IT | Italian for Italy, Switzerland. |
| nl | nl_NL | Dutch for the Netherlands, Belgium. |
| zh | chs_CN | Simplified Chinese for China. |
| zh | cnt_TW | Traditional Chinese for Taiwan. |
| pt | pt_PT | Portuguese for Portugal. |
| el | el_GR | Greek for Greece. |
| ru | ru_RU | Russian for Russia. |

References:
Language code (ISO-639)
http://ftp.ics.uci.edu/pub/ietf/http/related/iso639.txt Region code (ISO-3166)
http://www.iso.org/iso/en/prods-services/iso3166ma/02iso-3166-code-lists/list-en1.html

10.4.5 Software Releases

For the attributes listed as "required" in search columns, only one of the required fields must be specified by the user.

Some attributes are duplicated between Engineering Part and Release: The attributes set for engineering part should be used as defaults when creating a new release. User can override values set for engineering part at the release level. This function is intended to reduce repetitive data entry due release check-in.

| ID | Attribute Name | Description | Comments | Intended Usage | Examples | Required | Modifiable | Basic Search | Ext. Search |
|---|---|---|---|---|---|---|---|---|---|
| REL-001 | Release ID | Integer identifier (possibly with part type prefix). System generated. | SITID(VOA) /ESP # (VOE)/ Software ID (ITC) | | | Y (auto) | N | Y (req) | Y (req) |
| REL-002 | Detailed Version | Full release version identifier. Text field. | Can include the Major Version value. This is the same as BOM VAIO's "Developer Software Release Version" For Example: Major Version = 1.4, Detailed Version = 1.4.2 or 1.4.02.06070. | | 4.0.4.00.25691 | Y | Y | Y (req) | Y (req) |
| REL-003 | Release Name | Concatenation of "Part Name" + "Detailed Version." Not user editable. | For Example: Sonic Stage 1.4.02.06070 | Reporting. | Generated: Adobe Premiere Standard 4.0.4.00.25691 | Y (auto) | N | Y (req) | Y (req) |
| REL-004 | Target LangRegions | List of LangRegions to be supported by this release. (en_US,en_GB,en_int,de_DE,fr_FR,fr_CA,,ja_JP,ko_KR,es_ES,es_lat,it_IT, nl_NL,cns_CN,cnt_TW,pt_PT,el_GR,ru_RU) | Relation. | | Relation to one or more LangRegions. | N | Y | N | Y (req) |
| REL-005 | Release Notes | A log of notes. Each notes can belong to one of the categories listed below. | User can add a note to a release. User specifies category of the note at data entry time and categories can be used to filter display. | For Information Only. Reporting. | | Y | Y | N | N |
| REL-006 | Status | ES/Test,FF, Pilot,CF,RC,GM | FF (Feature Freeze)/CF (Code Freeze) = WHQL candidate. | Sanity checks during BOM snapshotting. Reporting. | Lookup table: ES/Test,FF, Pilot,CF,RC,GM. | Y | Y | Y (req) | Y (req) |
| REL-007 | Submitted By | User who checked-in the release. | Released By (VOE), Contact to Developer (ITC) | | Relation to user index. | Y | N | Y (req) | Y (req) |
| REL-008 | Next Release | Text field which specifies next expected release version and date. | | For Information Only. Reporting. | 4.0.4.00.25693A to be released in late August 2007. | N | Y | N | N |
| REL-009 | Virus Check | Dropdown | | For Information Only. Reporting. | TBD | N | Y | N | Y (req) |
| REL-010 | WHQL status | No submission/under submission/passed/not applicable. | | Sanity checks during BOM snapshotting. Reporting. | Lookup table: no submission/under submission/passed/ not applicable. | N | Y | N | Y (req) |
| REL-011 | PlmStatus | Dropdown | | | | N | Y | N | Y (req) |
| REL-012 | Is Default Release | Yes/No | | Snapshotting of BOMs. | flag (0 or 1) | N | Y | N | Y (req) |
| REL-013 | Is Latest Release | Yes/No | | Snapshotting of BOMs. | flag (0 or 1) | N | Y | N | Y (req) |
| REL-014 | Version Path | Registry or file path (text). | May be changed as part of a project globalization of installation tools. | Used by current VOA installation tools to verify installation of a module. | HKEY_LOCAL_MACHINE\SOFTWARE\Microsoft\Updates\Windows XP\SP3\KB901214\Description\ | Y | Y | N | N |
| REL-015 | Version ID | Version of file or reg key value(text). | May be changed as part of a project globalization of installation tools. | Used by current VOA installation tools to verify installation of a module. | Security Update for Windows XP (KB901214) | Y | Y | N | N |

| ID | Attribute Name | Description | Comments | Intended Usage | Examples | Required | Modifiable | Basic Search | Ext. Search |
|---|---|---|---|---|---|---|---|---|---|
| REL-016 | Version check before installation. | Text field. Describes required installer version for the given release. | | For Information Only. Reporting. | [How to identify this version] Before Installation Check Version.txt in installer | N | Y | N | N |
| REL-017 | Version check after installation. | Text field. Describes another method to validation installation. | | For Information Only. Reporting. | [How to identify this version]After Installation Check: Version.txt under C:\Program Files\Sony\SonicStage Mastering Studio including 2.0.00.18220 | N | Y | N | N |
| REL-018 | Change Log | System generated history: who changed release when. | | | System generated history: who changed release when. | | | | |
| REL-019 | Installed Folder Path | Text field describing path to installed files. | | Some build tools may use this field. | \\us-sd-itd-san-1\swlibrary\isvrelease\0518002.SNC\ | Y | N | N | N |
| REL-021 | Installer Type (select from list) | INF, EXE/BATCH, FILE COPY | Install Property : Defined in MajorVersion as defaults, carried over to Release, can be modified at check-in. | | lookup table: INF, EXE/BATCH, FILE COPY | Y | N | Y (req) | Y (req) |
| REL-022 | Setup File | Path to setup file relative to top level folder of release. Text Field. | Install Property : Defined in MajorVersion as defaults, carried over to Release, can be modified at check-in. | Used by build tools to find setup executable. | Setup.exe | Y | Y (if files not uploaded) | N | N |
| REL-023 | Command Line Arguments | Arguments to be passed to "Setup File". Text Field. | Install Property : Defined in MajorVersion as defaults, carried over to Release, can be modified at check-in. | Used by build tools when running setup executable. | /quiet /passive /norestart -s | N | Y | N | N |
| REL-024 | OPK | Yes/No: Set for each Engineering Organization | Install Property : Defined in MajorVersion as defaults, carried over to Release, can be modified at check-in. | Used by build tools. | flag (0 or 1) | N | Y | N | Y (req) |
| REL-025 | Base Plus | Yes/No: Set for each Engineering Organization. | Install Property : Defined in MajorVersion as defaults, carried over to Release, can be modified at check-in. | Used by build tools. | flag (0 or 1) | N | Y | N | Y (req) |
| REL-026 | Recoverable | Yes/No: Set for each Engineering Organization. | Install Property : Defined in MajorVersion as defaults, carried over to Release, can be modified at check-in. | Used by tools. | flag (0 or 1) | N | Y | Y (req) | Y (req) |
| REL-027 | Interactive | Yes/No: user interaction required? | Install Property : Defined in MajorVersion as defaults, carried over to Release, can be modified at check-in. | Used by build tools. | flag (0 or 1) | N | Y | N | Y (req) |

| ID | Attribute Name | Description | Comments | Intended Usage | Examples | Required | Modifiable | Basic Search | Ext. Search |
|---|---|---|---|---|---|---|---|---|---|
| REL-028 | Repackaged | Yes/No: Means release has been modified from ISV original release. | Install Property | For Information Only. Reporting. | flag (0 or 1) | N | Y | N | Y (req) |
| REL-029 | Snapshot ID | Identifier of the BOM snapshot which was used for this release (componsite parts only). | Relation. | For Information Only. Reporting. | Relation to Snapshot Index | N | N | N | N |
|  |  |  | *Dropped. System will use active/inactive status instead.* |  |  | N | Y | N | Y (req) |

10.4.5.1 Release Notice Categories

| Category | Description |
|---|---|
| By Champion |  |
| By Builder |  |
| Other Notes |  |
| Description |  |
| Technical Description |  |
| New Features |  |
| Notification | E.g. "Same as 2005.2Q" |
| Installation Steps | Step by step description of a manual install. |
| Uninstall Steps | Step by step description of a manual uninstall process.C26 |

*10.4.6 Groups*

| ID | Attribute Name | Description | Comments | Intended Usage | Examples | Required | Modifiable | Basic Search | Ext. Search |
|---|---|---|---|---|---|---|---|---|---|
| GRP-001 | Group Name |  |  |  | Windows XP HE OS Parts | Y | Y | Y |  |
| GRP-002 | Group ID | Index ID |  |  | Generated Index | Y | N | Y |  |
| GRP-003 | Comments |  |  |  | Text field: This group is for all Windows XP HE images built between 2002 and 2006. | Y | Y | Y (keyword search) |  |
| GRP-004 | Parts List | Group Members | Can be group, part name, major version, release. |  | Relation to a list of indexes. | N | Y | Y (req) |  |
| GRP-005 | Active | Yes/No |  |  | flag (0 or 1) | Y | Y | Y (req) |  |
|  |  |  | Dropped. Too Complicated. |  |  |  |  |  |  |
|  |  |  | Dropped. Too Complicated. |  |  |  |  |  |  |
|  |  |  | Dropped. Too Complicated. |  |  |  |  |  |  |
| GRP-009 | Target Engineering Organization | One or more eng org, all eng org. | This will be part of a "Define Target Criteria" function used throughout the system. |  | Lookup Table(s) | N | Y | Y |  |

| ID | Attribute Name | Description | Comments | Intended Usage | Examples | Required | Modifiable | Basic Search | Ext. Search |
|---|---|---|---|---|---|---|---|---|---|
| GRP-010 | Target Series | List of one or more series for which this group can only be used. | | | IRX-3370, ATX-7100 | N | Y | Y | |
| GRP-011 | Target OS | Select a single OS or "All". Default to all. | This will be part of a "Define Target Criteria" function used throughout the system. | For filtering, reporting. Possibly used for sanity checks. | Lookup Table | N | Y | Y | |
| GRP-012 | Target LangRegions | One or more LangRegions. | | Used to select the correct release for BOM snapshots. | Lookup Table | N | Y | Y | |
| GRP-013 | Usage | Intended usage for the group. | | For filtering and organizing groups. | Text field: This group is for all Windows XP HE images built between 2002 and 2006, but only on Tuesdays. | N | Y | Y | |

10.4.7 Snapshots (BOMs)

| ID | Attribute Name | Description | Comments | Intended Usage | Examples | Required | Modifiable | Basic Search | Ext. Search |
|---|---|---|---|---|---|---|---|---|---|
| SNP-001 | BOM ID | Index field auto-generated. | | | Index field auto-generated. | Y | N | N | Y |
| SNP-002 | Description | Name & Revision (IE: Horizon 3-HE Build01) | (Series / FI / RDVD / Monolithic / Module/ Factory Media) | | Horizon 3-HE Build01 | Y | Y | N | Y |
| SNP-003 | Time and Date Stamp | Auto-Generated | | | Auto-Generated: August 21, 2006 PST | | | | |
| SNP-004 | Parent Part ID | ID of Series, Image, module, etc. | Relation | | Relation to Index of Parent part or Group. | Y | N | Y | Y |
| SNP-005 | Child Part Release Ids | All part releases on the BOM. | Relation | | Relation to a lisst of Release Indexes. | Y | N | Y (return list of snaps with mathcing child) | Y |
| SNP-006 | CTO Type | Required/Optional/HW Dependent | Relation | | Lookup Table Required/Optional/HW Dependent | Y | Y | N | Y |

10.4.8 Defect Attributes

| ID | Attribute Name | Description | Comments | Intended Usage | Examples | Required | Modifiable | Basic Search | Ext. Search |
|---|---|---|---|---|---|---|---|---|---|
| DEF-001 | Defect ID | Auto generated sequence. | | | | Y | N | Y | Y |

| ID | Attribute Name | Description | Comments | Intended Usage | Examples | Required | Modifiable | Basic Search | Ext. Search |
|---|---|---|---|---|---|---|---|---|---|
| DEF-002 | Defect Status | Open/Closed | Defects can only be closed if "Defect Resolution is Fix-verified, Will Not Fix, Deferred, Duplicate, or Withdrawn." | | | Y | Y | Y | Y |
| DEF-004 | Defect Resolution | Fixed, Fix-verified, Will Not Fix, Deferred, Duplicate, Withdrawn. | Dropdown. Should be a configurable item. | | | Y | Y | Y | Y |
| DEF-005 | Responsible persons. | Can be one or more users or a team. | | | | N | Y | Y | Y |
| DEF-006 | Priority | Must Fix, Should Fix, Optional Fix, None | Dropdown. | | | N | Y | Y | Y |
| DEF-007 | Summary (Defect Title) | | Text field. | | | Y | Y | Y | Y |
| DEF-008 | Description | | Text area. | | | Y | Y | Y | Y |
| DEF-009 | Frequency | Once, Always, Sometimes | Dropdown. | | | N | Y | N | Y |
| DEF-010 | Frequency Statistics | X out of Y | This can be entered if "Frequency" is "Sometimes." User can enter multiple "X of Y" sets for each defect. | For use in statistical analysis. | | N | Y | N | N |
| DEF-011 | Notes | | Text area | | | N | Y | N | Y |
| DEF-012 | Related Test Cases | Association with one or more test cases. | This cannot be a required attribute because defects can be logged without associated test cases. | | | N | Y | N | Y |
| DEF-013 | Steps to reproduce. | Can be copied from related test cases (attribute TST-010) and edited. | Text area. | | | Y | Y | N | Y |
| DEF-014 | Expected Results | Can be copied from related test cases (attribute TST-011) and edited. | Text area. | | | Y | Y | N | Y |
| DEF-015 | Workaround | | Text area. | | | N | Y | N | Y |
| DEF-016 | Severity | Values: 0-None 1 2 3 | Dropdown. Should be a configurable item -- admin screen not required. | | | N | Y | Y | Y |

| ID | Attribute Name | Description | Comments | Intended Usage | Examples | Required | Modifiable | Basic Search | Ext. Search |
|---|---|---|---|---|---|---|---|---|---|
| DEF-017 | Exposure | Values:<br>• 1-LI (Legal Implications)<br>• 2-HVCG (High Volume Call Generator)<br>• 3-LNFU (Likely to Notice with Frequent Use)<br>• 4-LIDB (Likely to Ignore Defective Behavior)<br>• 5-VUS (Very Unlikely will See) | Dropdown. Should be a configurable item – admin screen not required. | | | N | Y | Y | Y |
| DEF-018 | Assigned to (parts) | List of one or more engineering part/major versions, releases, HW parts, or user defined parts associated with the defect. Should be auto-populated if submitting from a failed test case. | | | | Y | Y | Y | Y |
| DEF-019 | Defect Submitter | | | | | Y | N | N | Y |
| DEF-020 | Submit Date | | | | | Y | N | N | Y |
| DEF-021 | Close Date | | | | | N | Y | N | Y |
| DEF-022 | Attachments | | | | | N | Y | N | N |
| DEF-023 | Sustaining status | | | | | N | Y | N | Y |
| DEF-024 | Sustaining Priority | | | | | N | Y | N | Y |
| DEF-025 | Microsoft Defect ID | | | | | N | Y | N | Y |
| DEF-026 | Beta ID | | | | | N | Y | N | Y |
| DEF-027 | LangRegion | One or more LangRegion's to which the defect applies. User can also select All "LangRegions." | | | | Y | Y | Y | Y |
| DEF-028 | Target Series | The series for which the defect was first discovered. | | | | Y | Y | N | Y |
| DEF-029 | Applicable Series | List of all other series for which a defect was discovered. | This could be a system maintainable attribute based on part information. | | | N | Y | N | Y |

10.4.9 Test Case/Strategy Attributes

| ID | Attribute Name | Description | Comments | Intended Usage | Examples | Required | Modifiable | Basic Search | Ext. Search |
|---|---|---|---|---|---|---|---|---|---|
| TST-001 | Test Case ID | Auto-generated sequence. | | | | Y | N | Y | Y |
| TST-002 | Test Case Type/Category | Basic, Ad-hoc, Use Case, Compatibility, FTV, Benchmarks, MDA, Screen Shot Capture, Business Unit, Accessory, and Other. | Drop-down. For Benchmarks and MDA categories: key, value, and expected value can be entered. For Screen Shot Capture category a .jpg or .bmp image file can be attached. | | | Y | N | Y | Y |
| TST-003 | Test Results | Pass/Fail/Not Tested/Impeded stored by series, release combo. | Defaults to "Not Tested." | | | Y | Y | Y | Y |
| TST-004 | Part/Major Version | One or more part/major versions to which the test case is constrained. | | | | N | Y | N | Y |
| TST-005 | Series | One or more series to which the Test Case is constrained. | | | | N | Y | N | Y |
| TST-006 | Test Area | Audio, Video, Still Picture, Productivity, Etc. | Dropdown. Should be a configurable item via admin screen. | | | Y | Y | N | Y |
| TST-007 | Purpose | | Text area. | | | Y | Y | N | Y |
| TST-008 | Requirements | | Text area. | | | N | Y | N | N |
| TST-009 | Initial Conditions | | Text field/Dropdown. | | | N | Y | N | N |
| TST-010 | Steps | | Text area. | | | Y | Y | N | N |
| TST-011 | Expected Results | | Text area. | | | Y | Y | N | N |
| TST-012 | Notes | | Text area. | | | N | Y | N | Y |
| TST-013 | Status | Active, Obsolete, Etc. | Dropdown. Should be a configurable item via admin screen. | | | Y | Y | Y | Y |
| TST-014 | Level | 1 – Always Run, 2 – Sometimes Run, 3 – Random Sampling/Sanity Check | Dropdown | | | Y | Y | Y | Y |
| TST-015 | Time to Execute | User estimate of time required to complete the test. Integer (in minutes). | | | | Y | Y | N | Y |
| TST-016 | Submitter | Auto – user who creates test case. | | | | Y | N | N | Y |
| TST-017 | Related Links | One or more hyperlinks. Can be a text field but system should interpret values as hyperlinks. | | | | N | Y | N | N |
| TST-018 | Last Updated | Auto | | | | Y | Y | N | Y |
| TST-019 | Excluded Series | One or more series which are excluded from this test case. | | | | N | Y | N | Y |
| TST-020 | Submit Date | Date user created test case. | | | | Y | N | N | Y |

11 Production Rollout Plan

11.4 Deployment Locations

Figure 23:
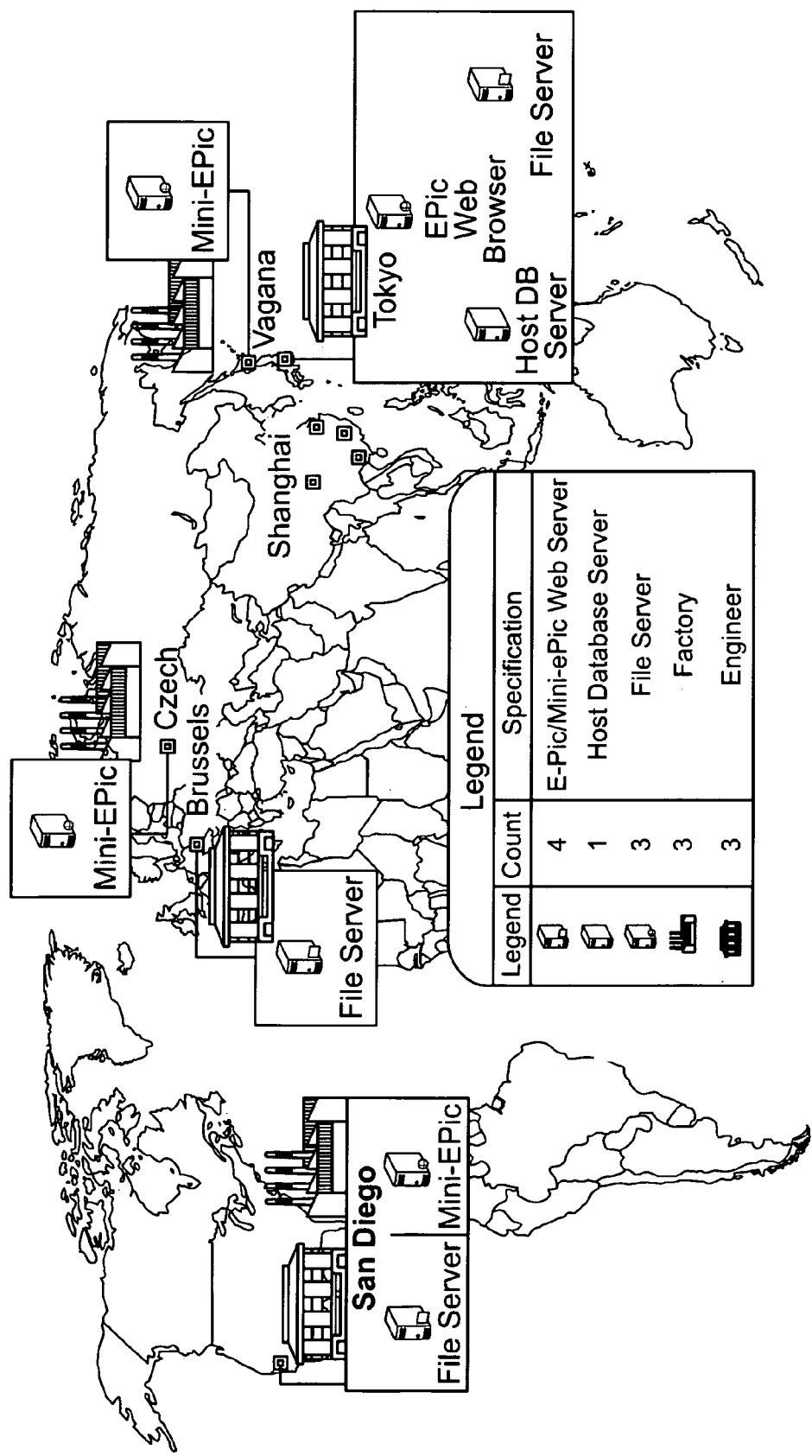
FIG. 23 is a map showing a non-limiting deployment regime.

Now referencing Figure 23, a non-limiting production rollout plan is shown.

As a global system, More than six places are involved in ePic network:
- Tokyo
- Vagana
- Shanghai
- Czech
- Brussels
- San Diego
- Other three factories in China Engineers and factories are in these places:
- Engineer: San Diego, Brussels, Shanghai, Tokyo
- Factory: San Diego, Czech, Nagano, Other three factories in China Network deployment diagram

11.5 Phased Rollout

EPic will be rolled out in two phases.

11.5.1 Phase 1 Release

Phase 1 Requirements will include the following ePic functionality:
- Parts Registration
- Image and Module BOM Creation
- Build System Interface
- Series Software BOM Creation
- DB Hero Interface
- File Store This release includes full support for image and module building and series software BOM creation. This is essentially the ePic "kernel."

11.5.2 Phase 2 Release

Phase 2 Requirements will include the following ePic functionality:
- Test Management
- Defect Tracking
- Release to Manufacturing
- Installation and Recovery Tool Support

- VALSUN Interface
- Mini-ePic

This release adds factory deployment, quality assurance, and customer recovery functionality to the ePic system.

11.5.3 Sony Software Development Activities

VOA tools will be adapted to become the global recovery and installation tools. The release date for these new tools will be timed to coincide with the phase 2 release.

Build system modifications must be completed by VOA, VOE, and SDNA in order to build images and modules with ePic.

*Plans for implementing and testing changes to build systems must be made with the following milestones in mind:*
- All required ePic system functionality will be implemented in the phase 1 release.
- A warranty period will be in effect for a TBD period from date of the phase 2 release. After this, changes will be more costly.

12 Changes to Legacy Systems

12.1 Summary

12.1.1 VBD

Current Tools and Systems
- BOM VAIO – SDNA build system.
- VELSUN/VALSUN – Defect tracking systems.

Changes to Tools & Systems
- BOM VAIO will be replaced with VOA's ABU/Magellan.
- VELSUN/VALSUN –transfer of defects from ePic to VELSUN/VALSUN must be established.

12.1.2 VOE

Current Tools and Systems
- EIS – VOE Project and Software Management System.
- Tracker – Image Building and Tracking System.

Changes to Tools & Systems
- ePic will not support VOE build system since images will no longer be developed at VOE.

12.1.3 VOA

- SW Plan – excel file defining the software BOM.
- VSMS – the "VAIO Software Management System."
- ABU/Magellan – automated image building tools.
- Oasis – MCode tool used to support testing.
- MINDS – automated installation system used by testers.
- Pacific – tools used to install software in the factory.
- Recovery Tools - use a localized version of the SDNA GREEN engine.

Changes to Tools & Systems
    - The SW Plan excel file will no longer be used. The data contained therein will be maintained in DB Hero.
    - VSMS, Oasis, and MINDS will be replaced with ePic.
    - ABU/Magellan will be made to interface with the ePic.
    - VOA installation and recovery tools will be modified to become the global toolset.
    - OASIS must be modified to create a floppy based on a single direct HTTP request.

12.2 Build System Changes

Three regional build tool implementations must be modified to work with ePic. Objects created by each regional build system may change to comply with the global modular and recovery specifications, which are to be defined as part of this project.

This section lists current build system artifacts from each region's build system and mappings to ePic fields. The ePic fields listed below are detailed in Section 10.4 of this document. Note that in some cases the format and meaning of the attribute may have changed from the current state. For example, Software Release ID (formerly ESP #, SITID, etc.) will now be an integer with a prefix denoting part type (this will necessitate changes to all three build systems).

*Architectural note:*
- *Build process should not be interrupted by WAN outages.*
- *Caching build data can shield you from WAN outage:*
    - *Option 1: Build tools interface directly with ePic; caching mechanism can be built into build tools.*
    - *Option 2: Existing SW system (EIS, BOM VAIO, VSMS) can be used to cache ePic data (possibly lessening impact to build tools).*

[VOA has chosen to build a caching mechanism into its build system.]

12.2.1 VOA-E Build Tools

12.2.1.1 Build Tools Overview

Build Tools create the following objects:
- Foundation Image
- Base Plus Image
- Monolithic Image
- P1 Recovery Image
- Module, X-Module, EPC
- Factory Deployment Media (RDVD, PIDVD, BDVD)
- PAC Files
- P1 Recovery Image
- PE Module
- Data file Database information required includes: Project Info, BOM Info, Component Info (location on server etc).

Files required by Build tools include: OS files, Component Installers (drivers, apps) Output files created by Magellan for use by Automated Build Utility (ABU), Chrysalis recovery tools and others are discussed in the next sections.

12.2.1.2 Files required by Automated Build Utility (ABU) to create Foundation and Base-Plus Images.

*Script.INI*: Contains all items on Image BOM with BasePlus set to FALSE.
*BScript.INI:* Contains all items on Image BOM with BasePlus set to TRUE and IntegrationMethod is not OPK.
*OPKScript.INI:* Contains all items on Image BOM with BasePlus set to TRUE and IntegrationMethod is OPK.

| VSMS Fields used to create above 3 files. | Corresponding ePic fields (refer ePic-Attribs_20050808.xls). |
|---|---|
| Project name: *used for querying and to create folder on network to store these files.* | EP-001 |
| Build name: *used for querying and to create folder on network to store these files.* | REL-003 |
| BasePlus: *check OPK integration method only for Base Plus.* | REL-025 |
| IntegrationMethod: *used by tools & check for OPK items.* | EP-005, EP-006, REL-021 |
| Silent: *Don't use IntegrationMethod if not Silent.* | EP-038, REL-027 |
| BiosLockNo: *uniquely identifies image.* | EP-012 |

| VSMS Fields used to create above 3 files. | Corresponding ePic fields (refer ePic-Attribs_20050808.xls). |
|---|---|
| ReleaseName | REL-003 |
| Sitid | REL-001 |
| NetPath | REL-020 or Mini ePic part |
| Switches | REL-023 |
| InstallInstructions | REL-Installation steps |
| BuildInfo | REL- By Builder |
| VersionPath | REL-014 |
| VersionID | REL-015 |

12.2.1.3 Files required to automate Module creation.

*MScript.INI:* Contains all items on Module BOM.
VSMS Fields used: Same as above.

12.2.1.4 Files required by Chrysalis recovery tools.

*SonyPac.cmd*
Is a batch file that creates the structure of one or more PAC files by copying the software releases (that make up the PAC file) from the network to a folder on the local machine. Each folder corresponds to a PAC file. The builder then runs the Pack tool to create a PAC file from the contents of each folder. It is required to create more than one PAC file as one PAC file may not fit on one disc. It contains all items on Image BOM with IsSingleApplicationRecovery is TRUE.

| VSMS Fields used: | Corresponding ePic fields. |
|---|---|
| ProjectName: *used for querying, not contained in the file.* | EP-001 |
| Build: *used for querying, not contained in the file.* | REL-003 |
| SITID: *to create folder on local machine.* | REL-001 |
| IsSingleApplicationRecovery: *used for querying, not contained in the file.* | REL-026 |
| SITInstallProgram: *Location on file server.* | REL-020 / Mini ePic |
| Pac_File: *this value is set in VSMS prior to creating this file by calculating (according to size) which PAC file this software goes on.* | Obsolete in ePic. Move the Pac file assignment functionality to Magellan (dynamically assign instead of storing in database). |

*Appinfo.ini:* Contains all applications and drivers that go on the Foundation Image and are available for recovery through Chrysalis (Single Application Recovery).

| VSMS Fields used: | Corresponding ePic fields. |
|---|---|
| Project name: *used to create folder on network to store these files.* | EP-001 |
| Build name: *used to create folder on network to store these files.* | REL-003 |
| ARCDFolder: *used to distinguish Drivers from Applications.* | EP-005, 006 |
| ARCDTitle: used *as display title for Applications.* | EP-010 |
| IntegrationMethod: *should be OPK-Driver for drivers. Used for querying.* | EP-006 |
| ReleaseName: *used as display title for Drivers.* | REL-003 |
| ARCDSpec: *text description (hover text).* | EP-011 |
| SITInstallProgram: *installer file.* | REL-020,022 / Mini ePic |
| SITID: *used for unpacking.* | REL-001 |
| IsSingleApplicationRecovery: *determine if compressed.* | REL-026 |
| Pac_File: used *to determine correct PAC file.* | Obsolete; generated by external tool dynamically. |
| InstallOrder: *used to install in a given sequence.* | EP-009 |
| Prompts: | |

12.2.1.5 Files required for BDVD

*AllModules.TXT:* Contains all modules and EPCs on a base unit.

| VSMS Fields used: | Corresponding ePic fields. |
|---|---|
| ProjectName: *used for querying, not contained in the file.* | EP-001 |
| ReleaseName | REL-003 |
| Installer | REL-020,21,22 |

12.2.1.6 Files required for Media Creation

*perm_modules.cmd:* Contains all permanent modules and EPCs for base unit (IsPermanent is TRUE).

*temp_modules.cmd:* Contains all temporary modules and EPCs for base unit (IsPermanent is FALSE).

| VSMS Fields used: | Corresponding ePic fields. |
|---|---|
| ProjectName: *used for querying, not contained in the file.* | EP-001 |
| isPermanent | EP-025(reverse logic) |
| ReleaseName | REL-003 |
| Installer | REL-020,21,22 |
| Sitid | REL-001 |

12.2.1.7 Files required by MINDS/ Pacific

*MINDS.CSV*

| VSMS Fields used: | Corresponding ePic fields. |
|---|---|
| Pcode | Series attributes TBD |
| BLID | EP-012 |
| Phase | REL-003 |
| Setup | REL-022 |
| VersionID | REL-015 |
| Swmcode | TBD |
| Version | REL-002 |
| SITID | REL-001 |
| Release Name | REL-003 |
| BaseUnit | Series attributes TBD |
| Type | EP-005,006 |

12.2.1.8 Files required by Japan

*BaseUnitInfo.INI:* Contains all base units for a project.

| VSMS Fields used: | Corresponding ePic fields. |
|---|---|
| BaseUnit | Series attributes TBD |
| BaseUnitID | |
| SalesType | |
| ModelNo_JP | |
| OS | |
| Product Mcode | |
| C-Partition Size | |
| P1 Partition Size | |

12.2.1.9 Other functionality

Build tools also check in software releases and images and thus need to be able to have a method of writing release data to the database.

13 Appendix

13.4 Terminology

Business related

| | | | | |
|---|---|---|---|---|
| | CTO | General | Configure To Order | Produce (configure) a product after taking the order. |
| | BTO | General | Build To Order | |
| | Retail sales, | General | | Selling product through normal shop channel. |
| | Direct sales, Online sales | General | | Selling product through internet (Web). |
| | B2B | General | Business To Business | Selling product to corporate customer directly from Sony. |
| | B2C | General | Business To Consumer | |
| | SMB | General | Small Business | Small company like 50 employees. |
| | Enterprise | General | Enterprise | Big company. |
| | SOHO | General | Small Office Home Office | Very small company like 0 to 3 employees. Use home as office. |

Product Design activity

| | | | | |
|---|---|---|---|---|
| | BOM | General | Bill Of Material | List of parts (materials) to produce a product. |
| | SW BOM | General | Software Bill Of Material | |
| | ES | | Engineering Sample | |
| | FF | | Feature Freeze | |
| | Pilot Build | | Pilot Build | Test Build |
| | RC | General | Release Candidate | |
| | GM | General | Golden Master | Final and approved master software file. |
| | RTM | | Release to Manufacturing | |
| | DVT | Sony | Design Validation T | Hardware prototype for design validation. |
| | PVT | Sony | Production Validation T | Hardware prototype for production validation, almost final product. |
| | MP | | Mass Production | Real product production, not sample, not prototype. |
| | Ex factory | | | First shipping out of the mass production product. |
| | SKU | General | Stock Keeping Unit | |
| | Build | | | Combine many software pieces to make single big image file to be copied onto Hard Disk Drive of target PC. |
| | Image build, build image | | | Combine many software pieces to make single big image file to be copied onto Hard Disk Drive of target PC. |
| | Integration | | | Combine many software pieces to make single big image file to be copied onto Hard Disk Drive of target PC. |
| | Software Integration | | | Combine many software pieces to make single big image file to be copied onto Hard Disk Drive of target PC. |
| | Preinstall | | | Install application onto a product so that customer doesn't have to install the software himself. |

| | | | |
|---|---|---|---|
| Recovery | Microsoft | | When a customer wants to go back to factory state, "Recovery" to be done. |
| Hard Disk Recovery | Microsoft | | |
| External Recovery Media | Microsoft | | |
| Recovery CD, Recovery DVD | Microsoft | | |
| BIOS Lock ID, BLID | Sony | | |
| M-Code | Sony | | |
| | | | |
| BIOS | PC | | |
| DMI | PC | | |
| Registry | Microsoft | | |
| OPK | Microsoft | OEM Pre-installation Kit | |
| OOBE | Microsoft | Out Of Box Experience | Windows Setup screens at very first power-on. |
| Serial number | General | | |
| Service Tag | PC | | |
| | | | |
| OSR | ITC | OS Recovery or System Recovery | Recover the image file. |
| APR | ITC | Application Recovery | Recover (install) application(s). |
| SAR (ITE) | ITE | Smart Application Recovery | Same meaning as "APR" in SDNA. |
| VSRU | ITC | VAIO System Recovery Utility | Utility name. Recover the image file, using Green Engine. |
| VARU | ITC | VAIO Application Recovery Utility | Utility name |
| | | | |
| Wise | General | www.wise.com | Software name to make a package. |
| Install Shield | General | www.installshield.com | Software name to make an installer. |
| | | | |
| F.I. | VOA | Foundation Image | |
| MINDS | VOA | Module Installation ... | |
| VSMS | VOA | VAIO Software Management System | |
| ABU | VOA | Automatic Build Utility | |
| | | | |
| EIS | ITE | Engineering Information System | |
| Tracker | ITE | | |
| BomVAIO | ITC | | |
| BugVAIO | ITC | | |
| Valsan | ITC | | |
| IRT server | ITC | | |
| | | | |
| Librarian | VOA | | Image planning. |
| Build Architect | ITE | | Image planning. |
| Builder | ITC | | Image planning. |
| PM | | Project Manager | |
| Multi Language SKU | ITE | | |

DB Hero terminology

| | | | |
|---|---|---|---|
| Series | VBD | | A product platform. For example, "Horizon." |
| Class | VBD | | A concept representing a set of customer choices. For example "Hard Drive" (choices might be "100GB", "200GB", or "250GB"). |
| Spec | VBD | | Represents a single customer choice. |

| | | | | |
|---|---|---|---|---|
| Factory terminology | Config Range | VBD | | The set of classes that constitute the full (global) range of customer choices for a given series. Can be used by a sales system to provide CTO offerings to customers. |
| | Component | VBD | | Phantom BOM item. Derived from Config range during DB Hero block definition process. |
| | Component Structure | VBD | | List of components for a given structure with parts as children. This is considered the "manufacturing BOM." |
| | PCN | | Production Change Notice | Change form used to disclose any non-BOM related changes to the factory. |
| | ECN | | Engineering Change Notice | Change form used to disclose BOM changes to the factory. |
| | EPC | VOE/VOA | Engineering Process Change | Running change to software. Consists of change notification and a corresponding software module. |
| | Factory Process | | | Generic term used to refer to all activities performed in the factory in order to produce units. |
| | ERP | | Enterprise resource planner | Generic term for inventory, planning, and order management systems used in support of manufacturing or order fulfillment. Oracle, SAP, JD Edwards, etc. |
| | Configuration BOM | VOA | | The bill of materials for a specific PC configuration. |
| | Platform BOM | VOA | | A bill of materials which encapsulates CTO customer choices (like the DB Hero Config range). |
| | Phantom BOM | VOA | | A bill of materials representing the manufacturing BOM for a series (like DB Hero component structure). Phantom BOM items can be included as customer choices on the platform BOM. |
| | SMAP | | Simple Manufacturing Advanced Process | Unit testing framework used to drive the automated factory process in Sony VAIO factories. Imaging in the factory occurs as a SMAP process step. |

Sony Terminology:
Department name

| | | | | |
|---|---|---|---|---|
| | VBD or ITC | VAIO Business Division | Tokyo Group | Formerly called ITC. |
| | VOA or ITD | VAIO of America | America Group, San Diego | Formerly called ITD or ITA. |
| | VOE or ITE | VAIO of Europe | Europe Group, Brussels | Formerly called ITE. |
| | STC | Sony Shanghai Tec Center | | |
| | SNT | Sony Nagano Factory | 200 km from Tokyo | |
| | IT-M | Sony San Diego Manufacturing division | | |
| | SVL | Taiwan Exteranl Labo | | |
| | ODM | China Manufacturing | | |
| | SDNA | Sony Digital Network Applications Inc., | Tokyo Group | Formerly a part of ITC. |

Others

| | | | |
|---|---|---|---|
| | SEN | Sony Enterprise Network | Sony Corporate Network (intranet). Firewalled. |

13.5 Current Process Flows

13.5.1 VOA & IT-M

13.5.1.1 Planning
Below is sequence of how VOA SW planning occurs currently:

- Explore new ISV business opportunities [VOA-Product Planning & VOA-PM] [Ongoing, but not necessary need to be tracked in DB].
- Create 1st draft of SW Planning Strategy in ppt by VOA-E PM (N-17).
  - SW Strategy consists of:
    - No platform or project information yet.
    - 80% of Sony software titles leveraged from previous cycle (including utilities & Sony software, but no drivers).
    - Sony Utilities are not updated at this point (No visibility until engineering meeting).
    - Some Sony Software is updated at this point (Info is through grapevine, and not firm until engineering meeting).
    - SW Planning strategy or planning BOMs do not reflect drivers.
    - 20% of ISV software (mostly leverage from previous cycle).
    - Any ISV addition here are 75% firm.
  - Software is also added or remove from SW CTO configuration strategies chart.
    - Grouping of multiple modules to define an offering strategy starts here. Also defines offering rules.
  - Project code names at this point only, no detailed base units names or configuration on PPT.
- Review 1st draft of SW Planning Strategy in ppt with VOA-PP & ITPD (N-16).
  - Gather questions & consensus prior to Engineering meeting.
    - Make necessary SW plan or offering strategy adjustment up to engineering meeting.
  - Usually not much change here, mostly just to keep ITPD in sync with upcoming strategy.
  - 95% of ISV software are fixed.
- Present 2nd draft of SW Planning Strategy in ppt @ Engineering meeting in Japan (N-15).
  - 2rd draft includes & updates from PP & ITPD meeting from above.
  - Below is what occurs during engineering meeting:
    - Gather updates & add new Sony Utilities (Utilities strategy are fixed & owned by ITC per platform).
- Gather updates & add new Sony Software (Sony SW strategies are mostly fixed and owned by ITC per platform. Occassionally, each region are given a choice on certain software pending lead time or if conflicts with local ISV SW strategy.
- Versions of the above are gathered and updated to SW Strategy ppt (Build revisions are not reflected in SW Strategies or SW planning BOM since they are fixed during integration stage, only reflected in VSMS).
- ISV Software are presented to ITC (purely to inform them of local strategies).

- Create 3rd draft of SW Planning Strategy (still in ppt format) (N-14).
  o 3rd draft of the ppt includes updates from engineering meeting.
    - Platform is reflected only if certain software are assigned to specific SKUs.
  o Review 3rd draft with ITPD and VOA-PP to share information from engineering meeting.
- Review with internal groups (SIT & PQD) by N-13.
  o SW Planning strategy ppt should be fixed.
  o SIT starts to prepare BOM layout in VSMS with SKU & HW config charts.
- From N-13 to RTM.
  o VOA-PM turns the ppt into SW Planning BOM (in xls format) & adds platform & base units.
    - SW Plan reflects how SW are associated in VSMS to each base units.
    - Either as modules or in foundation image.
    - If in modules, it also reflects if it should be Require "R", Default "D", or Optional "O" per base unit.
    - Changes throughout the cycle occurs first in xls & announced to SIT & PQD (VOA-PP & ITPD as well) every Thursday.
    - SW Plan is also used during BOM Freeze (Milestone) to verify that modules assigned in VSMS are all accounted for in both plan & BOM (per base units with each particular projects's BOM Freeze).
    - SW Plan will also be used by ITM royalty reporting group after project RTMs.
    - SW Plan is not used by marketing spec sheet generation, instead a VSMS base unit BOM is used (base unit BOM includes every software, including drivers).
- Future objectives
  o Elimination of SW planning BOM.

- Go straight from Strategy ppt to VSMS.
- Updates should occur in VSMS and populated to projects.
  ○ Royalty information be assigned according to base units/platform or SW module (Not necessary at planning stage, but need it by RTM).

13.5.1.2 Software Integration

Figure 23A:
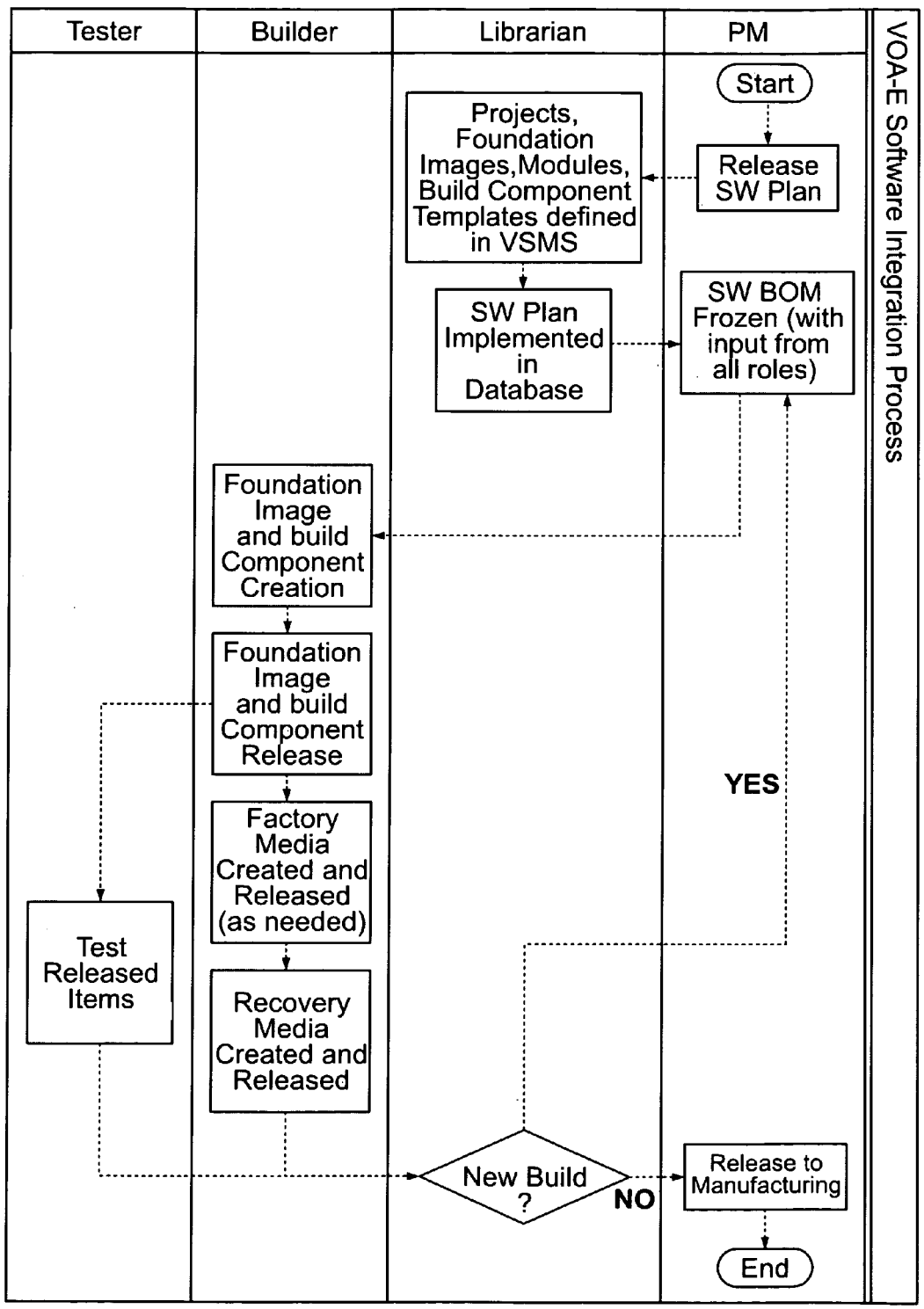
FIG. 23A is a flow chart showing software integration logic.

Figure 23A shows a non-limiting software integration process:

13.5.1.3 Factory Deployment Process

Figure 24:
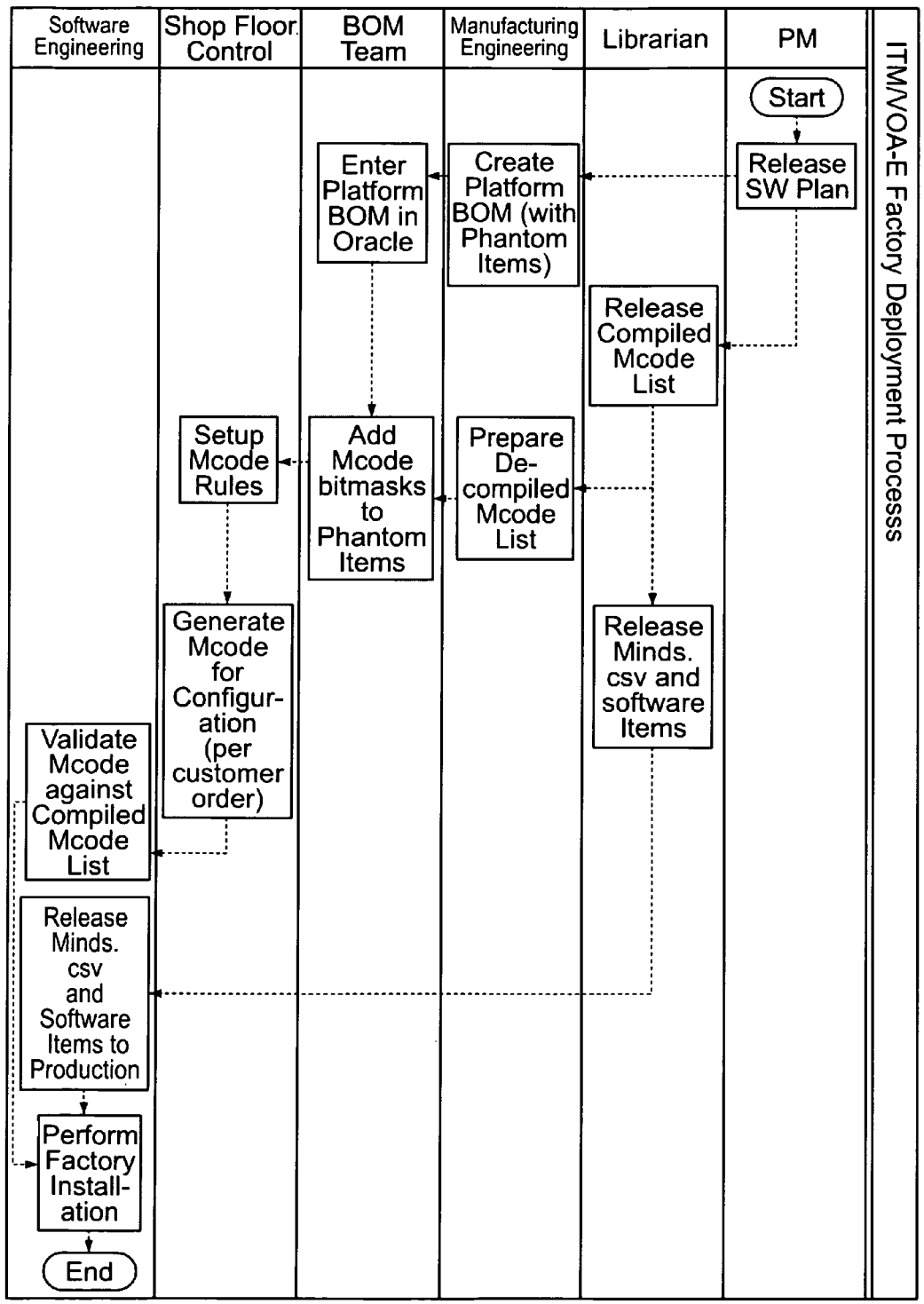
FIG. 24 is a flow diagram showing a non-limiting factory deployment process.

In reference to Figure 24, the process flow captures a process for deploying CTO software in the factory.

Many of the activities depicted in Figure 24 are manual, with some small helper applications in use to speed up the work. Some of these activities are executed in parallel with the software integration process.

13.5.2 VOE

13.5.2.1 Software Integration

- Engineers enter ESP numbers from software plan into EIS via UI.
- EIS provides a build script via UI.
- Builder supplies script to build system.
- Build system builds item.
- Tracker provides BIOS lock number, image number, and other data to build system.

13.5.3 VBD

13.5.3.1 Software Integration (SDNA)

- BOM VAIO is standalone database system.
- Build tools retrieve build data via database link to BOM VAIO.

13.6 Sample Reports

13.6.1 RPT-1: Series Report

13.6.2 RPT-2: Series BOM Report

13.6.3 RPT-3: Series Metadata Report

13.6.4 RPT-4

None. Number skipped.

13.6.5 RPT-5: BOM Report

13.6.6 RPT-6: Module Release Report

*Release Information*

BOM Version: 7.0.0.0
Purpose: Integration  Location: Server
Version Verification ID: 0503904.SND
Version Verification Path: HKEY_LOCAL_MACHINE\Software\Sony Corporation\Modules\MOD-Premiere_Pro\Version

Date Submitted: 2/8/05 4:23:54 PM
Source Size (Bytes): 307704991
Type: Module

*Integration Information*

Install Comand Line: \\us-sd-itd-san-1\swlibrary\isvrelease\0503904.SND\VIDP070503904.exe -*56GnAtS40

Application Recovery Text:

Single Application Recovery?  Requires User Interaction?  WHQL Certified?
☑

*Notes*
Build Info:
--------------------------------------------------------------
[Smith 4- 2/20/05 10:23:00 AM]
Summer05 - New Version of VEC and New Mread.exe.

Install Instructions:
--------------------------------------------------------------
[Smith 4 - 2/20/05 10:23:00 AM]

Installed by MINDS, Factory, Recovery Product.

Uninstall Instructions:
------------------------------------------------------------

[Smith4 - 2/20/05 10:23:00 AM]
Use Add/Remove programs.

Release Notes:
------------------------------------------------------------

[Smith 4 - 2/20/05 10:23:00 AM]
New Version of VEC and fixed mread issue.

By Champion:

By Builder:

Other Notes:

13.6.7 RPT-7: Group Report

13.6.8 RPT-8: Image BOM Report

13.6.9 RPT-9: BOM Freeze Report

FI-Inazma-PR (Build03) Image BOM Report

| VCC Descriptions | | | |
|---|---|---|---|
| Vendor | Component | Release Name | Hover Text |
| Adobe | Productivity | Adobe Reader | <ENG>Document viewer: View, navigate, and print PDF and E-Book format documents.</ENG> <FRA>Visionneuse de document: La vue, dirigent, et impriment des documents de format de PDF et E-Book</FRA> <ESN>Espectador del documento: La visión, navega, e imprime documentos del formato del PDF y del E-Book.</ESN> |
| Alps | Driver-Mouse | Touchpad | Touchpad Driver |
| Google | Communication | Google Toolbar | <ENG>Maximizes your web searching experience.</ENG> <FRA>Facilite vos recherches sur internet.</FRA> <ESN>Maximiza su tela que busca experiencia.</ESN> |
| Intel | Driver-System | Intel 915GM_PM_GMS_910GML_Alviso | Intel 915GM/PM/GMS 910GML Alviso Driver |
| Macromedia | Multimedia | Flash Player | <ENG>Play back videos and audio generated in Flash.</ENG> <FRA>Lecture de vidéos et de fichiers audio créés avec Flash</FRA> <ESN>Juegue los videos traseros, audio generado en flash.</ESN> |
| Sony ITC | System Tool | Battery Check Utility | <ENG>Manage your notebook power settings.</ENG> <FRA>Gérez les paramètres d'alimentation de votre ordinateur portable.</FRA> <ESN>Maneje sus ajustes de energía del cuaderno.</ESN> |
| Sony ITC | Shared Library | ImageStation Library | <ENG>A program utility facilitating ImageStation access.</ENG> <FRA>Un utilitaire facilitant l'accès à ImageStation.</FRA> <ESN>Una utilidad del programa que facilita el acceso de ImageStation.</ESN> |
| Sony ITC | System Tool | Memory Stick Pro Formatter | <ENG>A program utility for formatting a Memory Stick.</ENG> <FRA>Un utilitaire permettant de formater un Memory Stick.</FRA> <ESN>Una utilidad del programa para ajustar a formato un Memory Stick.</ESN> |
| Sony ITC | Multimedia | OpenMG Setup | <ENG>A program utility required by OpenMG.</ENG> <FRA>Un utilitaire indispensable à OpenMG.</FRA> <ESN>Una utilidad del programa requerida por OpenMG.</ESN> |
| Sony ITC | System Tool | Setting Utility Series | <ENG>A program for customizing your utility series settings.</ENG> <FRA>Un programme pour personnaliser les paramètres de vos utilitaires.</FRA> <ESN>Un programa para modificar sus ajustes para uso general de la serie para requisitos particulares.</ESN> |
| Sony ITC | Shared Library | Sony Shared Library | <ENG>A program utility required for Sony applications.</ENG> <FRA>Un utilitaire pour les applications Sony.</FRA> <ESN>Una utilidad del programa para los usos de Sony.</ESN> |
| Sony ITC | Shared Library | Sony Video Shared Library | <ENG>A program utility required for video editing applications.</ENG> <FRA>Un utilitaire indispensable pour les applications d'édition vidéo.</FRA> <ESN>Una utilidad del programa requerida para el vídeo que corrige usos.</ESN> |
| Sony ITC | Shared Library | SonyUtils | <ENG>A program utility required for VAIO |

FI-Inazma-PR (Build03) Image BOM Report

| VCC Descriptions | | | |
|---|---|---|---|
| Vendor | Component | Release Name | Hover Text |
| | | | applications.</ENG> <FRA>Un utilitaire indispensable pour les applications VAIO.</FRA> <ESN>Una utilidad del programa requerida para los usos de VAIO.</ESN> |
| Sony ITC | Multimedia | VAIO Entertainment Platform | <ENG>A utility program that installs the VAIO Entertainment Platform.</ENG> <FRA>Un utilitaire permettant d'installer la Plateforme VAIO Entertainment.</FRA> <ESN>Un programa utilitario que instala la VAIO Entertainment Platform.</ESN> |
| Sony ITC | System Tool | VAIO Event Service | <ENG>A program utility to control specific applications in your VAIO computer.</ENG> <FRA>Un utilitaire pour contrôler les applications spécifiques de votre ordinateur de VAIO.</FRA> <ESN>Usos específicos de un tocontrol para uso general del programa en su computadora de VAIO.</ESN> |
| Sony ITC | System Tool | VAIO Power Management | <ENG>Manage your notebook power settings.</ENG> <FRA>Gérez les paramètres d'alimentation de votre ordinateur portable.</FRA> <ESN>Maneje sus ajustes de energía del cuaderno.</ESN> |
| Sony ITC | System Tool | VAIO Update | <ENG>Get notifications of the latest driver and news related to your VAIO computer.</ENG> <FRA>Recevez les notifications vous informant des pilotes les plus récents ainsi que les dernières nouvelles concernant votre ordinateur de VAIO.</FRA> <ESN>Consiga las notificaciones del conductor y de las noticias más últimos relacionados con su computadora de VAIO.</ESN> |
| Sony ITD | Documentation | Latest Information | <ENG>Latest Information.</ENG> <FRA>La Plus défunte Information</FRA> <ESN>La Información Más última</ESN> |
| Sony ITD | Documentation | Recovery Guide | <ENG>VAIO Recovery Guide.</ENG> <FRA>Guide De Réinstallation</FRA> <ESN>Guía De la Recuperación</ESN> |
| Sony ITD | Tools | VAIO Drivers | <ENG>VAIO Drivers installs the VAIO drivers to their original shipping condition.</ENG> <FRA>VAIO Drivers installe les conducteurs de VAIO sur leur condition d'expédition originale.</FRA> <ESN>VAIO Drivers instala los conductores de VAIO a su condición de envío original.</ESN> |
| Sony ITD | Documentation | VAIO User Manual | <ENG>VAIO User Guide is a program that opens user manuals on your VAIO computer.</ENG> <FRA>VAIO Manuel D'Utilisateur</FRA> <ESN>Guía de Usuario de VAIO</ESN> |
| Sun Microsystems | Windows | Java 2 Runtime Environment | <ENG>Installs the Sun MicroSystems Java 2 Runtime Environment.</ENG> <FRA>Installe l'environnement d'exécution de Java 2 de Sun MicroSystems.</FRA> <ESN>Instala el ambiente del tiempo de pasada de Java 2 de los Sun MicroSystems.</ESN> |
| Veritas | Productivity | PxEngine | <ENG>PxEngine is a shared dynamic link library for optical device burning.</ENG> <FRA>PxEngine est une bibliothèque de lien dynamique partagée pour la brûlure de circuit optique.</FRA> <ESN>PxEngine es una biblioteca de acoplamiento dinámica compartida para quemarse del dispositivo óptico.</ESN> |

| FI-Inazma-PR (Build03) BOM Details ||||||||
|---|---|---|---|---|---|---|---|
| Vendor | Component | Release Name | Champion | SITID | Version | IRT ID | Recovery |
| Reference ||||||||
| Sony ITC | Reference | Boot Option Setting Request | Smith 7 | 0429908.snc | 041017 | SP-008333-01 | False |
| Sony ITC | Reference | HQ Filter setting request | Smith 6 | 0504901.SNC | 1.5.02180 Spirit 2 | SP-009406-00 | False |
| Sony ITC | Reference | Power Options Setting Requests | Smith 6 | 0517803.SNC | 050627 | SP-010128-00 | False |
| Sony ITC | Reference | Volume Control Settings | Smith 6 | 0503821.SNC | 050201 | SP-009178-00 | False |
| Sony ITD | Reference | FI Spec | Smith 8 | 0509604.SND | 3.0.4 || False |
| Sony ITD | Reference | HW Build Document | Smith 9 | 0521508.SND | Inazma-PR Build v1.5 || False |
| Sony ITD | Reference | SCR Specification Document | Smith 10 | 0507409.SND | 1.1.00.050315 0_English || False |
| Operating System ||||||||
| Microsoft | Windows | CDCR patch for Media Player | Smith 5 | 0320501.mst | 1.0.0.0 || False |
| Microsoft | Windows | KB307154 LowBatteryAlarm QFE | Smith 5 | 0428804.MST | English | SP-008374-00 | False |
| Microsoft | Windows | KB835221 HD Audio QFE | Smith 5 | 0503804.MST | 1.0-200408180 English | SP-008559-00 | False |
| Microsoft | Windows | KB870669 Critical Desktop Update for MDAC | Smith 5 | 0420516.mst | multilingual || False |
| Microsoft | Windows | KB873333 Security Update MS05-012 | Smith 5 | 0504104.mst | English 1.0-200502090 | SP-009238-00 | False |
| Microsoft | Windows | KB873339-Security Update MS04-043 | Smith 5 | 0515914.MST | English 1.0-200412150 | SP-009052-00 | False |
| Microsoft | Windows | KB883939 - Cumulative Security Update for IE | Smith 5 | 0517207.MST | English 1.0-200506200 | SP-010023-00 | False |
| Microsoft | Windows | KB884018-Add and Remove programs copy error | Smith 5 | 0422501.MST | English || False |
| Microsoft | Windows | KB884575 BatteryPowerDrain QFE | Smith 5 | 0428801.MST | English | SP-008390-00 | False |
| Microsoft | Windows | KB885250 Security Update MS05-011 | Smith 5 | 0504101.MST | English 1.0-200502090 | SP-009229-00 | False |
| Microsoft | Windows | KB885835 Security Update MS04-044 | Smith 5 | 0503813.MST | KB885835 English || False |
| Microsoft | Windows | KB885836 Security Update MS04-041 | Smith 5 | 0503807.mst | KB885836 English | SP-009043-00 | False |
| Microsoft | Windows | KB886185 Security Update | Smith 5 | 0503801.MST | KB886185 English | SP-009089-00 | False |
| Microsoft | Windows | KB886612 Memory Stick Icon Fix | Smith 5 | 0427201.mst | english || False |
| Microsoft | Windows | KB886903 Security Update MS05-004 | Smith 5 | 0513204.mst | KB886903 Generic || False |
| Microsoft | Windows | KB887472 Security Update MS05-009 | Smith 5 | 0504516.mst | English 1.0-200502090 | SP-009312-00 | False |
| Microsoft | Windows | KB887742 WLanBlueScreenQFE | Smith 5 | 0503810.MST | KB887742 English || False |
| Microsoft | Windows | KB888113 Security Update MS05-015 | Smith 5 | 0504507.mst | English 1.0-200502090 | SP-009318-00 | False |
| Microsoft | Windows | KB888239 MP10_MS OOBE splash screen fix | Smith 5 | 0434401.MST | English KB888239 || False |
| Microsoft | Windows | KB888302 Security Update MS05-007 | Smith 5 | 0504510.MST | English 1.0-200502090 | SP-009330-00 | False |
| Microsoft | Windows | KB890046 - Security Update MS05-032 | Smith 5 | 0517201.MST | English 1.0-200506200 | SP-010076-00 | False |
| Microsoft | Windows | KB890859-Security Update MS05-018 | Smith 5 | 0515908.MST | English 1.0-200506030 | SP-009693-00 | False |

FJ-Inazma-PR (Build03) BOM Details

| Vendor | Component | Release Name | Champion | SITID | Version | IRT ID | Recovery |
|---|---|---|---|---|---|---|---|
| Microsoft | Windows | KB891781 Security Update MS05-013 | Smith 5 | 0504504.MST | English 1.0-200502090 | SP-009288-00 | False |
| Microsoft | Windows | KB893056 Hibernate Button Turn Off fix | Smith 5 | 0507506.mst | English KB893056 | | False |
| Microsoft | Windows | KB893066-Security Update MS05-019 | Smith 5 | 0517301.MST | English 2.0-200506200 | SP-009713-01 | False |
| Microsoft | Windows | KB893086-Security Update MS05-016 | Smith 5 | 0515901.MST | KB893086 English 1.0-200506030 | SP-009684-00 | False |
| Microsoft | Windows | KB893803 - Windows Installer 3.1 | Smith 5 | 0515904.MST | 3.1-KB893803-1.0-200506060 | SP-009766-00 | False |
| Microsoft | Windows | KB894391 - SVC Host error fix | Smith 5 | 0515905.MST | English 1.0-200505190 | SP-009724-00 | False |
| Microsoft | Windows | KB896358 - Security Update- MS05-026 | Smith 5 | 0517304.MST | English 1.0-200506200 | SP-010013-00 | False |
| Microsoft | Windows | KB896422 - Security Update- MS05-027 | Smith 5 | 0517204.MST | English 1.0-200506200 | SP-010055-00 | False |
| Microsoft | Windows | KB896428 - Security Update MS05-033 | Smith 5 | 0522305.MST | English 1.0-200506200. | SP-010081-00 | False |
| Microsoft | Windows | KB901214 - Security Update MS05-036 | Smith 5 | 0521301.mst | English OEM distribution | | False |
| Microsoft | Windows | KB903235 - Security Update MS05-037 | Smith 5 | 0521304.mst | English OEM Distribution | | False |
| Microsoft | Windows | Media Player 10 | Smith 10 | 0429401.MST | English OPK | | False |
| Microsoft | Windows | Windows .NET Framework Service Pack | Smith 5 | 0513101.mst | SP1 KB867460 | | False |
| Microsoft | Windows | Windows Media Connection | Smith 5 | 0516001.MST | ver.X10-86962 | SP-009834-00 | False |
| Microsoft | Windows | Windows XP OPK MUI | Smith 10 | 0132507.mst | GM | | False |
| Microsoft | Windows | Windows XP Professional Edition | Smith 10 | 0421902.mst | English SP2 Gold | | False |
| Microsoft | Windows | Windows.NET | Smith 10 | 0314926.mst | Framework 1.1 OPK Support | | False |
| Sony ITC | Windows | SLP Files | Smith 10 | 0516012.SNC | 1.1.1.0-200506040 | | False |
| Sun Microsystems | Windows | Java 2 Runtime Environment | Smith 10 | 0515401.sun | 1.5.0.03 | | True |
| Driver | | | | | | | |
| Alps | Driver-Mouse | Pointing Driver Registry Patch | Smith 6 | 0519301.ALP | 050629 | SP-010147-00 | False |
| Alps | Driver-Mouse | Touchpad | Smith 6 | 0421501.alp | 5.3.511.2c WHQL | SP-001993-36 | True. |
| Connexant | Driver-Modem | Smart MC3Z | Smith 6 | 0518101.CXT | 7.28.00.50-050628logo | SP-008161-08 | False |
| Intel | Driver-Network | Ethernet driver | Smith 6 | 0430001.itl | 8.0.13.0 WHQL | SP-002515-11 | False |
| Intel | Driver-Display | Intel 915G graphics | Smith 6 | 0518801.itl | 6.14.10.4333h WHQL | SP-007709-14 | False |
| Intel | Driver-System | Intel 915GM_PM_GMS_910GML Alviso | Smith 6 | 0520902.itl | 6.1.0.1008 WHQL | SP-008174-00 | True |
| Intel | Driver-Display | Intel Graphics Driver Registry Patch | Smith 6 | 0515102.itl | v01 | SP-009674-00 | False |
| Intel | Driver-Wireless LAN | Intel Pro 2915ABG 2200BG | Smith 6 | 0516401.ITL | 9.0.2.25a-logo | SP-007020-07 | False |
| RealTek | Driver-Sound | Audio Driver | Smith 6 | 0519601.RTK | 5.10.0.5129-050715_WHQL | SP-008252-28 | False |
| Sony Ericsson | Driver-Modem | VDC EGPRS Modem Driver | Smith 11 | 0506001.ser | 3.0.0.1510 WHQL | SP-009393-00 | False |
| Sony ITC | Driver-System | Notebook Control | Smith 12 | 0429202.SNC | 6.0.1.08290-020604 WHQL | SP-004458-00 | False |
| Sony ITC | Driver-System | SonyPi | Smith 12 | 0418902.SNC | 7.0.3.820 WHQL | SP-004457-00 | False |

| FI-Inazma-PR (Build03) BOM Details | | | | | | | |
|---|---|---|---|---|---|---|---|
| Vendor | Component | Release Name | Champion | SITID | Version | IRT ID | Recovery |
| Sony ITC | Driver-Mouse | USB Mouse | Smith 6 | 0508001.SNC | 1.56-whql (resubmitted) | SP-002012-05 | False |
| Sony ITC | Driver-Imaging | VAIO USB Camera | Smith 6 | 0306208.snc | 1.2.00.01172 WHQL | SP-004578-01 | False |
| Sony ITC | Driver-Hard Disk | VGP-MCA10 registry patch | Smith 6 | 0428705.snc | 1.0.0.10130 | SP-007787-02 | False |
| Texas Instruments | Driver-Hard Disk | Memory Stick Driver | Smith 6 | 0520601.tex | 2.0.0.5_Logo | SP-009671-04 | False |
| Texas Instruments | Driver-Hard Disk | Memory Stick driver Registry patch | Smith 6 | 0517802.tex | 1.0.0.0-20050610 | SP-010131-00 | False |
| Toshiba | Driver-System | Bluetooth driver | Smith 13 | 0519901.TOB | 3.03.13SO-04_RC3.20050708 | SP-009675-03 | False |
| Toshiba | Driver-System | Bluetooth Registry Patch | Smith 13 | 0517801.TOB | 1.0.0.0 | SP-010130-00 | False |
| Utility | | | | | | | |
| Sony ITC | System Tool | AV Mode Button Utility | Smith 6 | 0519303.SNC | 1.0.00.06291 | SP-010142-00 | False |
| Sony ITC | System Tool | Battery Check Utility | Smith 12 | 0506701.SNC | 1.0.02.01240 | SP-007112-03 | True |
| Sony ITC | System Tool | Memory Stick Pro Formatter | Smith 12 | 0503605.snc | 2.4.0.13260.0 502040 | SP-005054-04 | True |
| Sony ITC | System Tool | OCA Marker | Smith 6 | 0404201.snc | 1.03.1.040113 0 | | False |
| Sony ITC | System Tool | SetReso | Smith 12 | 0429607.snc | 2.3.1.2702 | SP-002911-18 | False |
| Sony ITC | System Tool | Setting Utility Series | Smith 12 | 0516014.SNC | 1.2.00.05270 | SP-008403-11 | True |
| Sony ITC | System Tool | VAIO Central | Smith 14 | 0516704.SNC | 1.1.02.061005 | | False |
| Sony ITC | System Tool | VAIO Event Service | Smith 12 | 0516805.SNC | 2.2.00.06130 | SP-008245-21 | True |
| Sony ITC | System Tool | VAIO Power Management | Smith 12 | 0521405.SNC | 1.7.00.08011 | SP-008404-19 | True |
| Sony ITC | System Tool | VAIO Update | Smith 11 | 0516103.SNC | 2.1.02.01250( Not for LA) | | True |
| Sony ITD | System Tool | Sony Digital Signature | Smith 15 | 0121802.snd | 1.0 | | False |
| Sony ITD | System Tool | VAIO Support Central | Smith 14 | 0519320.SND | 1.0.0.63005 | | False |
| Library | | | | | | | |
| Sony ITC | Shared Library | ImageStation Library | Smith 16 | 0318106.snc | 3.0.01.05290 | SP-005050-01 | True |
| Sony ITC | Shared Library | Sony MP4 Shared Library | Smith 17 | 0503512.snc | 1.1.00.12200 | SP-009172-00 | False |
| Sony ITC | Shared Library | Sony Shared Library | Smith 18 | 0503811.snc | 2.10.00.01250 XP | SP-005988-01 | True |
| Sony ITC | Shared Library | Sony Video Shared Library | Smith 17 | 0503505.snc | 2.0.01.12200 | SP-009171-00 | True |
| Sony ITC | Shared Library | SonyUtils | Smith 12 | 0515908.snc | 6.2.00.17310 | SP-008151-18 | True |
| Application-AudioVideo | | | | | | | |
| Macromedia | Multimedia | Flash Player | Smith 19 | 0420101.MAC | 7.0.19.0 | | True |
| Sony ITC | Multimedia | OpenMG Setup | Smith 17 | 0516005.snc | 4.2.00.06070( Not for LA) | SP-009199-02 | True |
| Sony ITC | Multimedia | Sonic Stage Mastering Studio Audio Filter Presets | Smith 17 | 0430713.snc | 1.4.00.10260_ Aroma-IRX3190 | SP-007851-03 | False |
| Sony ITC | Multimedia | VAIO Entertainment Platform | Smith 17 | 0517204.snc | 1.2.11.06150 | SP-009842-01 | True |
| Application-Productivity | | | | | | | |
| Adobe | Productivity | Adobe Reader | Smith 1 | 0504801.ADB | 7.0.0.0-English Updated | | True |
| Adobe | Productivity | Adobe Reader Patch | Smith 1 | 0515201.adb | 7.0.1 | | False |

| FI-Inazma-PR (Build03) BOM Details ||||||||
|---|---|---|---|---|---|---|---|
| Vendor | Component | Release Name | Champion | SITID | Version | IRT ID | Recovery |
| Veritas | Productivity | PxEngine | Smith 20 | 0518101.VER | 2.4.35.500a | SP-007059-10 | True |
| Application-Communications | | | | | | | |
| Google | Communication | Google Toolbar | Smith 1 | 0503801.goo | 2.0.114.10_US | | True |
| Applications-Marketing | | | | | | | |
| Sony ITC | Marketing Material | Memory Stick Icon | Smith 12 | 0209504.snc | 1.2.0.0-20010912 | SP-002377-02 | False |
| Sony ITC | Marketing Material | VAIO LiteFlow Wallpaper | Smith 18 | 0515905.snc | 1.0.01.05100 | SP-008504-01 | False |
| Sony ITC | Marketing Material | VAIO Long Battery Life Wallpaper | Smith 18 | 0516607.SNC | 1.0.00.05200(RC) | SP-009801-00 | False |
| Sony ITC | Marketing Material | VAIO Original Screen Saver | Smith 18 | 0516001.snc | 1.1.01.06070 | SP-008470-05 | False |
| Sony ITC | Marketing Material | VAIO Scene Screensaver | Smith 18 | 0503503.snc | 1.0.01.12280_Scene_SD_Wide | SP-008486-01 | False |
| Sony ITD | Marketing Material | Bookmarks-IE | Smith 1 | 0503801.SND | 1.0.00.050207 0(US) | | False |
| Sony ITD | Marketing Material | Image Station Photo Printing RegKeys | Smith 5 | 0508804.snd | 1.0.0.0503280 | | False |
| Sony ITD | Marketing Material | VAIO Registration | Smith 15 | 0519419.SND | Fall05-14.0.2 | | False |
| Documentation | | | | | | | |
| Sony ITD | Documentation | Latest Information | Smith 21 | 0522304.SND | Fall05 English V2 | n/a | True |
| Sony ITD | Documentation | Recovery Guide | Smith 21 | 0520301.SND | Fall05 English | n/a | True |
| Sony ITD | Documentation | VAIO User Manual | Smith 21 | 0520701.SND | 1.00.16EN072 51 (IRX-3250 ENU) | SP-010132-02 | True |
| SIT Build Tools | | | | | | | |
| Sony ITD | Tools | E-Flyer pop up utility | Smith 4 | 0507506.SND | 1.2.1901.20464 | | False |
| Sony ITD | Tools | HDD Kick Tool | Smith 3 | 0520614.SND | 3.1.5.0 | | False |
| Sony ITD | Tools | VAIO Drivers | Smith 10 | 0521610.SND | G336B02 | | True |

Items associated to series:

| Type | Release Name | Index |
|---|---|---|
| MODULE | MOD-Click_To_DVD | (0518903.snd) |
| MODULE | MOD-DVGate_Plus | (0516403.snd) |
| MODULE | MOD-IceMaker | (0519313.snd) |
| MODULE | MOD-Image_Converter | (0517211.snd) |
| MODULE | MOD-Moodlogic | (0516810.snd) |
| MODULE | MOD-MS_Works_Bundle | (0506705.snd) |
| MODULE | MOD-NIS_2005_Trial | (0521324.snd) |
| MODULE | MOD-Office_2003_Basic | (0505102.snd) |
| MODULE | MOD-Office_2003_Professional | (0520615.snd) |
| MODULE | MOD-Office_2003_Small_Business | (0520613.snd) |
| MODULE | MOD-Office_2003_Small_Business_Trial | (0519613.snd) |
| MODULE | MOD-Office_2003_Student_Teacher_Trial | (0519616.snd) |
| MODULE | MOD-PhotoShop_Album_Starter_Edition | (0517909.snd) |
| MODULE | MOD-Photoshop_Elements | (0505510.snd) |
| MODULE | MOD-Premiere_Pro | (0503904.snd) |

| Type | Release Name | Index |
|---|---|---|
| MODULE | MOD-Premiere_Standard | (0520304.snd) |
| MODULE | MOD-Quicken_New_User_Edition | (0504901.snd) |
| MODULE | MOD-Roxio_DigitalMedia_SE | (0518107.snd) |
| MODULE | MOD-S_S_M_S | (0518801.snd) |
| MODULE | MOD-Spy_Subtract | (0517402.snd) |
| MODULE | MOD-Toshiba_Bluetooth | (0518111.snd) |
| MODULE | MOD-VAIO_Media | (0519301.snd) |
| MODULE | MOD-VAIO_Survey_Standalone | (0518615.snd) |
| MODULE | MOD-WinDVD | (0518607.snd) |
| MODULE | MOD-Wireless_Help_Utility | (0504904.snd) |
| MODULE | MOD-Wireless_Switch_Setting_Utility | (0518108.snd) |
| MODULE | XMOD-AOL_Software | (0519417.snd) |
| MODULE | XMOD-SonicStage | (0517302.snd) |
| Recovery Image | P1 Recovery Image | (0520914.snd) |

Changes from Previous:

Missing From Module Build 7

| Vendor | Release Name | Defect Owner | Index | Version |
|---|---|---|---|---|
| | | | | |

New Components to Premiere Pro Module Build 7

| Vendor | Release Name | Defect Owner | Index | Version | IRT ID | Recovery |
|---|---|---|---|---|---|---|
| | | | | | | |

New Releases to Premiere Pro Module Build 7

| Vendor | Release Name | Index | New Version | Old SITID | Old Version |
|---|---|---|---|---|---|
| | | | | | |

Removed from Premiere Pro Module Build 7

| Vendor | Release Name | Defect Owner | Index | Version | | |
|---|---|---|---|---|---|---|
| Sony ITC | Driver Settings Request Page | Smith 6 | 0503807.SNC | 050131 NB | | |

*13.6.10*   *RPT-10: Media Set Report*

| Type | Release Name | Index |
|---|---|---|
| MODULE | MOD-Click_To_DVD | (0518903.snd) |
| MODULE | MOD-DVGate_Plus | (0516403.snd) |
| MODULE | MOD-IceMaker | (0519313.snd) |
| MODULE | MOD-Image_Converter | (0517211.snd) |
| MODULE | MOD-Moodlogic | (0516810.snd) |
| MODULE | MOD-MS_Works_Bundle | (0506705.snd) |
| MODULE | MOD-NIS_2005_Trial | (0521324.snd) |
| MODULE | MOD-Office_2003_Small_Business_Trial | (0519613.snd) |
| MODULE | MOD-Office_2003_Student_Teacher_Trial | (0519616.snd) |
| MODULE | MOD-PhotoShop_Album_Starter_Edition | (0517909.snd) |
| MODULE | MOD-Photoshop_Elements | (0505510.snd) |
| MODULE | MOD-Premiere_Pro | (0503904.snd) |
| MODULE | MOD-Premiere_Standard | (0520304.snd) |

| Type | Release Name | Index |
|---|---|---|
| MODULE | MOD-Quicken New_User Edition | (0504901.snd) |
| MODULE | MOD-Roxio_DigitalMedia SE | (0518107.snd) |
| MODULE | MOD-S_S_M_S | (0518801.snd) |
| MODULE | MOD-Spy_Subtract | (0517402.snd) |
| MODULE | MOD-Toshiba_Bluetooth | (0518111.snd) |
| MODULE | MOD-VAIO_Media | (0519301.snd) |
| MODULE | MOD-VAIO_Survey_Standalone | (0518615.snd) |
| MODULE | MOD-WinDVD | (0518607.snd) |
| MODULE | MOD-Wireless_Help_Utility | (0504904.snd) |
| MODULE | MOD-Wireless_Switch_Setting_Utility | (0518108.snd) |
| MODULE | XMOD-AOL_Software | (0519417.snd) |
| MODULE | XMOD-SonicStage | (0517302.snd) |
| Recovery Image | P1 Recovery Image | (0520914.snd) |
| Data File | bitindex.ini | (0519625.snd) |
| Data File | LeonV-HE Data File | (0521334.snd) |
| Data File | module.ini | R (0520102.snd) |
| EPC | EPC_A-0198-LeonV_Latest_Information | (0521323.snd) |
| EPC | EPC_A-0199-Security_Updates_MS05-036_037 | (0521602.snd) |
| EPC | EPC_A-0202-Security_Updates_MS05-038_039 | (0523011.snd) |
| Foundation Image | FI-LeonV-HE | (0520208.snd) |
| PAC File | FI-LeonV-HE PAC File | (0520209.snd) |

13.6.11   RPT-11: Part Report

| Attribute Name | Description |
|---|---|
| Part Name | Adobe Premiere Pro |
| Parent Planning Part | Adobe Premiere Pro |
| Active | Yes |
| Major Version | 7 |
| Part Type | Installable Application |
| Part Sub Type | Application |
| Dependency Append | None |
| Dependency | Need: VAIO Edit Components 5.0 |
| Install Order | After: VAIO Edit Components 5.0 |
| Customer Label | Adobe Premiere Pro |
| Customer Desc | ENU-US: Adobe's semi professional video editing application. |
| BLID | N/A |
| isDefault | Yes |
| Champion | Smith 1 |
| Owner | Smith 1 |
| Localised By | VOA |

| Attribute Name | Description |
|---|---|
| Target Series | Hogwarts4-MC |
| | Horizon2-HE |
| | Horizon2-MC |
| | Horizon2-PR |
| | Horizon3_GD-HE |
| | Horizon3_GD-MC |
| | Horizon3_GD-PR |
| | LeonS2-HE |
| | LeonS2-PR |
| | LeonV-HE |
| | LeonV-PR |
| | Messenger-HE |
| | Messenger-PR |
| | Sherry_WWAN-PR |
| | Spirit2-HE |
| | Spirit2-PR |
| | Spirit3-HE |
| | Spirit3-PR |
| Series Dependency | N/A |
| Supported LangRegions | ENU-US |
| Change Log | |
| isTemporary | No |
| Default Installer Type (select from list) | EXE |
| Default Setup File | Premiere.EXE |
| Default Command Line Arguments | -s -n |
| Default OPK | No |
| Default Base Plus | No |
| Default Recoverable | yes |
| Default Interactive | No |
| Vendor | Adobe |

13.6.12 RPT-12: Part Release Report

| Attribute Name | Description |
|---|---|
| Release ID | 120123 |
| Detailed Version | 7.5.0.0 |
| Release Name | Adobe Premiere 7.0 |
| Target LangRegions | en_US |

| Attribute Name | Description |
|---|---|
| Release Notes | \*\*\*Install Instructions\*\*\*<br><br>[WeberN - 7/16/04 12:10:00 PM]<br>Run Setup.exe<br><br>\*\*\*Uninstall Instructions\*\*\*<br><br>[WeberN - 7/16/04 12:10:00 PM]<br>Uninstall via Add/Remove Programs<br><br>\*\*\*Release Notes\*\*\*<br><br>[WeberN - 7/16/04 12:10:00 PM]<br>Adobe Premiere Pro 7.5, OEM 282 |
| Status | GM |
| Submitted By | Smith 22 |
| Next Release | none |
| Virus Check | dropdown: statuses TBD |
| WHQL status | not applicable |
| PlmStatus | dropdown: statuses TBD |
| Is Default Release | yes |
| Is Latest Release | yes |
| Version Path | C:\PROGRAM FILES\ADOBE\PREMIERE PRO 7.5\ADOBE PREMIERE PRO.EXE |
| Version ID | 7.5.0.000.1010 |
| Version check before installation | Premiere.EXE  version 7.5 |
| Change Log | No record |
| Installed Folder Path | C:\PROGRAM FILES\ADOBE\PREMIERE PRO 7.5\ |
| Installer Place | TBD |
| Installer Type (select from list) | EXE |
| Setup File | Premiere.EXE |
| Command Line Arguments | -s -n |
| OPK | no |
| Base Plus | no |
| Recoverable | yes |
| Interactive | no |
| Repackaged | yes |
| Snapshot ID | n/a |

13.6.13  *RPT-13: Part Release Version Report*

13.6.14  *RPT-14: RTM Report*

1.  User picks one Series/LangRegion.

2.  User picks one or more OSs.
3.  User selects which sub-reports to include.
4.  System presents format that can be loaded into MS Word for further editing.

13.6.15　RPT-15: Test Status for Series

13.6.16　RPT-16: Test Status for All Active Series

13.6.17　RPT-17: Defect Report for Individual Defect

Figures 25, 26:
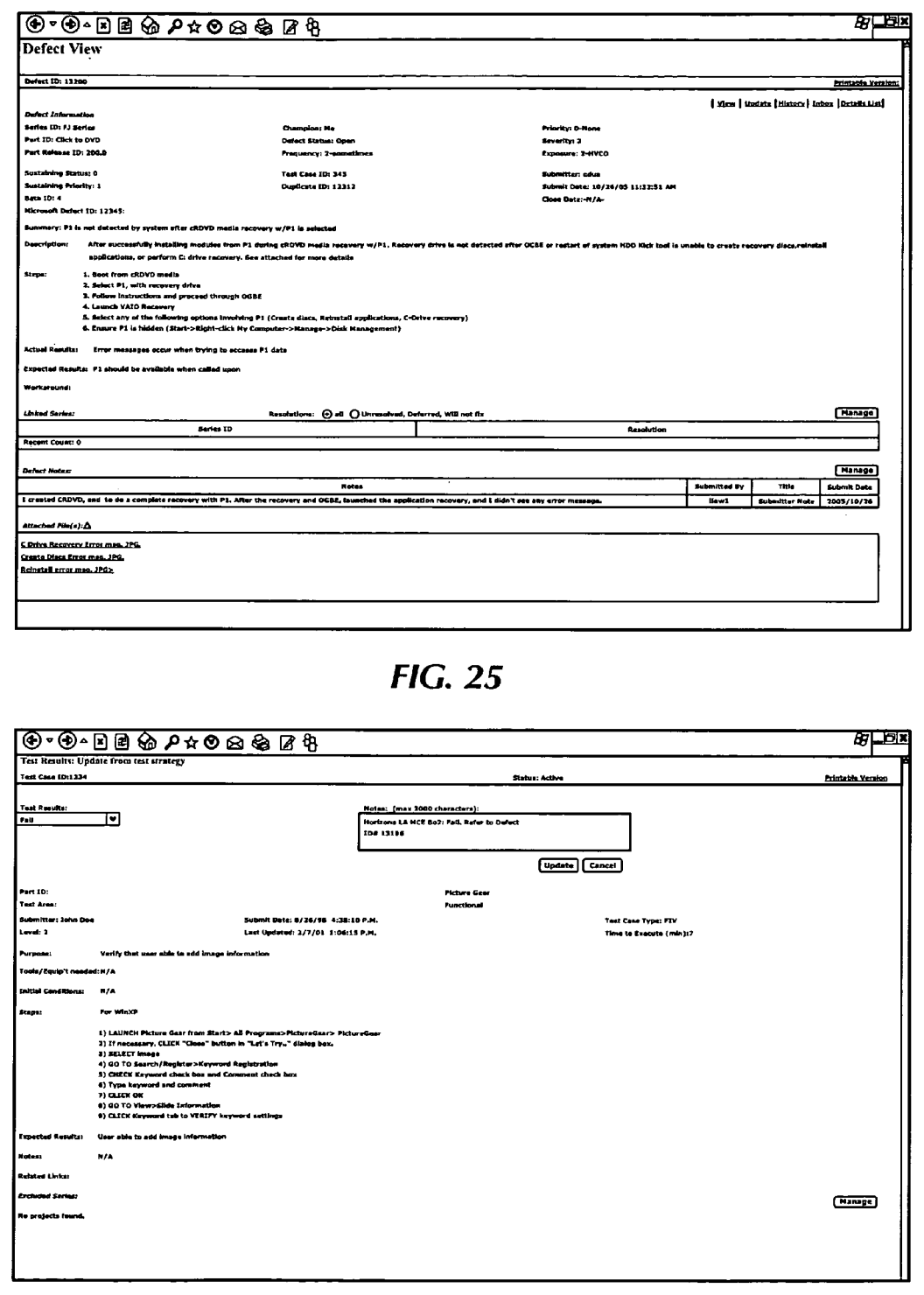

Now referencing Figure 25, the screen shot of a "Defect View" is shown, which includes the defect report.

13.6.18　RPT-18: Defects By User, Team, Series, Cycle, Etc.

13.6.19　RPT-19: Test Case Report

Now referencing Figure 26, the screen shot of "Test Results: Update from test strategy" is shown.

13.6.20　RPT-20: Test Strategy Report

With reference to Figure 27, the report currently being implemented is shown. This report must be adapted to the Epic Data Model.

13.6.21　RPT-20: Test Strategy Status Report

13.6.22　RPT-22: End-of-cycle Defect Report

1. User picks one or more Series/LangRegion combinations.
2. User picks one or more cycles or date ranges.
3. User selects which sub-reports to include.
4. System loads each report into separate worksheet (preferred) or separate excel document.

- Defect Priority

| | | Fall 05 | Sum 05 |
|---|---|---|---|
| | Priority 0 | 58 | 82 |
| | Priority 1 | 213 | 99 |
| | Priority 2 | 263 | 139 |
| | Priority 3 | 193 | 102 |
| | Priority 4 | 22 | 4 |
| | Priority N/A | 146 | 114 |
| Priority | Total | 895 | 540 |

- Defect Severity

|  |  | Fall 05 | Sum 05 |
|---|---|---|---|
|  | 0 | 20 | 22 |
|  | 1 | 192 | 120 |
|  | 2 | 357 | 176 |
|  | 3 | 203 | 127 |
|  | N/A | 123 | 95 |
| Severity |  | 895 | 540 |

- Defect Exposure

|  |  | Fall 05 | Sum 05 |
|---|---|---|---|
|  | LI | 25 | 17 |
|  | HVCG | 160 | 76 |
|  | LNFU | 348 | 194 |
|  | LIDB | 154 | 96 |
|  | VUS | 101 | 59 |
|  | Blank | 107 | 98 |
| Exposure |  | 895 | 540 |

- Defect Resolution by Application Champion

| Fall 05 | | | | |
|---|---|---|---|---|
| Champion | Fixed | Def/WNF | Other | Total |
| Smith 23 | 3 | 0 | 3 | 6 |
| Smith 24 | 12 | 1 | 5 | 18 |
| Smith 18 | 0 | 1 | 2 | 3 |
| Smith 25 | 1 | 1 | 2 | 4 |
| Smith 26 | 21 | 4 | 18 | 43 |
| Smith 27 | 24 | 12 | 6 | 42 |
| Smith 28 | 9 | 1 | 12 | 22 |
| Smith 29 | 1 | 4 | 12 | 17 |
| Smith 21 | 8 | 11 | 4 | 23 |
| Smith 30 | 11 | 7 | 7 | 25 |
| Smith 31 | 16 | 9 | 19 | 44 |
| Smith 32 | 3 | 2 | 19 | 24 |
| Smith 33 | 2 | 1 | 7 | 10 |
| Smith 5 | 19 | 2 | 13 | 34 |
| Smith 19 | 20 | 2 | 1 | 23 |
| Smith 20 | 3 | 2 | 3 | 8 |
| Smith 34 | 6 | 8 | 20 | 34 |
| Smith 35 | 5 | 0 | 3 | 8 |
| Smith 12 | 11 | 4 | 13 | 27 |
| Smith 14 | 4 | 18 | 14 | 36 |
| Smith 10 | 49 | 32 | 58 | 139 |
| Smith 36 | 2 | 1 | 2 | 5 |
| Smith 3 | 42 | 23 | 38 | 103 |
| Smith 37 | 27 | 11 | 17 | 53 |
| Smith 9 | 4 | 4 | 9 | 17 |

| Summer 05 | | | | |
|---|---|---|---|---|
| Champion | Fixed | Def/WNF | Other | Total |
| jones1 | 0 | 2 | 2 | 4 |
| jones2 | 1 | 0 | 0 | 1 |
| jones3 | 6 | 6 | 16 | 28 |
| jones4 | 15 | 3 | 8 | 26 |
| jones5 | 7 | 6 | 4 | 17 |
| jones | 14 | 3 | 11 | 28 |
| jones | 8 | 10 | 45 | 63 |
| Jone | 0 | 5 | 3 | 8 |
| jones | 13 | 1 | 3 | 17 |
| jonesa | 1 | 6 | 0 | 7 |
| jones | 1 | 5 | 5 | 11 |
| jones | 8 | 2 | 1 | 11 |
| Smith 19 | 1 | 0 | 1 | 2 |
| jones | 4 | 1 | 1 | 6 |
| jones | 13 | 3 | 17 | 33 |
| jones | 26 | 7 | 16 | 49 |
| jones | 9 | 2 | 2 | 13 |
| jones | 0 | 2 | 1 | 3 |
| jones | 71 | 10 | 25 | 106 |
| jones | 3 | 3 | 6 | 10 |
| Winter | 4 | 5 | 2 | 11 |
| jones | 1 | 40 | 22 | 63 |
| jones | 7 | 7 | 6 | 20 |

| Fall 05 | | | | |
|---|---|---|---|---|
| Champion | Fixed | Def/WNF | Other | Total |
| Smith 13 | 13 | 20 | 35 | 68 |
| Smith 15 | 9 | 35 | 4 | 48 |

| Summer 05 | | | | |
|---|---|---|---|---|
| Champion | Fixed | Def/WNF | Other | Total |

- Defect Resolution by Module (First level applications on FI BOM should be included)

| All resolutions - Fall 2005 - Top Ten | | | | | | | | | | | | |
|---|---|---|---|---|---|---|---|---|---|---|---|---|
| Application | Sev 0 | Sev 1 | Sev 2 | Sev 3 | N/A | Total | P=0 | P=1 | P=2 | P=3 | P=4 | P=N/A | Total |
| HDD Kick Tool | 0 | 29 | 34 | 12 | 14 | 89 | 0 | 34 | 21 | 18 | 2 | 14 | 89 |
| NB Hardware Other | 0 | 18 | 26 | 2 | 10 | 56 | 0 | 14 | 19 | 10 | 3 | 10 | 56 |
| VAIO Registration | 0 | 2 | 7 | 29 | 4 | 42 | 0 | 2 | 6 | 30 | 0 | 4 | 42 |
| VAIO Support Central | 8 | 0 | 11 | 18 | 2 | 39 | 12 | 0 | 6 | 18 | 0 | 3 | 39 |
| Desktop Hardware Other | 0 | 16 | 10 | 2 | 2 | 30 | 1 | 15 | 10 | 2 | 0 | 2 | 30 |
| Sony Changer S/W | 3 | 6 | 14 | 7 | 0 | 30 | 3 | 7 | 14 | 6 | 0 | 0 | 30 |
| Finger Print PS | 0 | 2 | 19 | 5 | 1 | 27 | 0 | 0 | 15 | 9 | 1 | 2 | 27 |
| IE Remote Control Extension | 0 | 11 | 8 | 6 | 0 | 25 | 0 | 11 | 12 | 2 | 0 | 0 | 25 |
| Kansas Emerald/Kansas | 0 | 5 | 10 | 10 | 0 | 25 | 25 | 0 | 0 | 0 | 0 | 0 | 25 |
| SmartWi Connection Utility | 1 | 2 | 6 | 7 | 8 | 24 | 1 | 2 | 9 | 4 | 0 | 8 | 24 |

| All resolutions - Summer 2005 - Top Ten | | | | | | | | | | | | |
|---|---|---|---|---|---|---|---|---|---|---|---|---|
| Application | Sev 0 | Sev 1 | Sev 2 | Sev 3 | N/A | Total | P=0 | P=1 | P=2 | P=3 | P=4 | P=N/A | Total |
| HDD Kick Tool | 0 | 46 | 45 | 14 | 6 | 111 | 23 | 32 | 39 | 9 | 0 | 8 | 111 |
| VAIO Control Central | 0 | 2 | 18 | 13 | 10 | 43 | 1 | 7 | 11 | 11 | 1 | 12 | 43 |
| VAIO Central Beta | 12 | 0 | 9 | 5 | 6 | 32 | 24 | 0 | 0 | 1 | 0 | 7 | 32 |
| Connection Manager | 1 | 0 | 2 | 21 | 4 | 28 | 0 | 0 | 12 | 9 | 1 | 6 | 28 |
| SmartWi Connection Utility | 0 | 0 | 1 | 16 | 9 | 26 | 0 | 1 | 3 | 12 | 0 | 10 | 26 |
| Emerald Beta | 1 | 7 | 5 | 3 | 3 | 19 | 14 | 0 | 0 | 2 | 0 | 3 | 19 |
| VAIO Registration | 0 | 0 | 5 | 5 | 4 | 14 | 0 | 1 | 1 | 8 | 0 | 4 | 14 |
| Intel Graphics | 0 | 2 | 3 | 3 | 5 | 13 | 0 | 2 | 4 | 2 | 0 | 5 | 13 |
| Windows Media Center | 0 | 2 | 4 | 2 | 3 | 11 | 0 | 2 | 2 | 4 | 0 | 3 | 11 |
| AOL | 0 | 5 | 1 | 1 | 2 | 9 | 0 | 3 | 2 | 2 | 0 | 2 | 9 |

- Top Ten Deferred/Will Not Fix Defects

| Top Ten Deferred/Will Not Fix Fall 2005 | | | | | | |
|---|---|---|---|---|---|---|
| Application | Sev 0 | Sev 1 | Sev 2 | Sev 3 | N/A | Total |
| VAIO Registration | 0 | 0 | 4 | 27 | 0 | 31 |
| HDD Kick Tool | 0 | 1 | 10 | 9 | 0 | 20 |
| VAIO Support Central | 0 | 0 | 5 | 13 | 0 | 18 |
| Windows MCE | 0 | 0 | 4 | 8 | 0 | 12 |
| Notebook Hardware Other | 0 | 1 | 8 | 2 | 0 | 11 |
| Sony Changer S/W | 0 | 1 | 4 | 4 | 0 | 9 |
| Fingerprint Protection Suite | 0 | 0 | 3 | 3 | 0 | 6 |
| Intel 915G Graphics | 0 | 0 | 4 | 2 | 0 | 6 |
| MOD-Wireless Connection Utility | 0 | 0 | 1 | 5 | 0 | 6 |
| Libertas 802.11bg Wireless | 0 | 1 | 0 | 4 | 0 | 5 |

| Top Ten Deferred/Will Not Fix Summer 2005 | | | | | | |
|---|---|---|---|---|---|---|
| Application | Sev 0 | Sev 1 | Sev 2 | Sev 3 | N/A | Total |
| Connection Manager | 0 | 0 | 2 | 18 | 0 | 20 |
| SmartWi Connection Utility | 0 | 0 | 0 | 15 | 0 | 15 |
| HDD Kick Tool | 0 | 3 | 6 | 1 | 0 | 10 |
| Emerald Beta | 1 | 0 | 1 | 2 | 2 | 6 |
| VAIO Registration | 0 | 0 | 2 | 4 | 0 | 6 |
| Intel Graphics | 0 | 0 | 2 | 3 | 0 | 5 |
| VAIO Control Center | 0 | 0 | 2 | 3 | 0 | 5 |
| Windows MCE | 0 | 0 | 3 | 2 | 0 | 5 |
| AOL | 0 | 2 | 1 | 1 | 0 | 4 |
| VAIO Central Beta | 1 | 0 | 2 | 0 | 0 | 3 |

13.6.23 RPT-23: Build Count

| Project | OS | FI Builds | Recovery Media Builds |
|---|---|---|---|
| Horizon2 | MCE | 4 | 1 |
| Horizon2 | HE | 2 | 2 |
| Mare4/Viento4 | HE | 4 | 4 |
| Spirit2 | HE | 3 | 3 |
| Spirit2 | PR | 3 | 3 |
| JediH2 | HE | 2 | 3 |
| LeonS2 | HE | 2 | 2 |
| LeonS2 | PR | 2 | 2 |
| Horizon2 | LA HE | 2 | 2 |
| Viento | LA HE | 2 | 2 |
| Horizon2 | PR | 2 | 2 |

| Project | OS | FI Builds | Recovery Media Builds |
|---|---|---|---|
| Spirit2 | LA HE | 4 | 2 |
| Spirit2 | LA PR | 4 | 2 |
| LeonS2 | LA HE | 2 | 2 |
| LeonS2 | LA PR | 2 | 3 |
| Spirit2 | FC HE | 2 | 2 |
| Aroma3 | HE | 4 | 5 |
| Aroma3 | PR | 3 | 5 |
| Aroma3 | LA PR | 2 | 2 |
| Hogwarts4 | MCE | 4 | 4 |
| Hogwarts4 | LA HE | 2 | 1 |

While the particular SYSTEM AND METHOD FOR SOFTWARE INTEGRATION AND FACTORY DEPLOYMENT is herein shown and described in detail, it is to be understood that the subject matter which is encompassed by the present invention is limited only by the claims.

What is claimed is:

1. A method for managing computer production in an enterprise, comprising:

receiving a block of software offerings, each block being associated with at least one product series, wherein a software offering includes at least one software class and at least one associated software specification, the software class being a specific type of software, software offerings being associated with respective product series to establish a configuration, specifications being individual software items that are associated with classes wherein a specification is an option that a customer may choose within a class, wherein a class may have more than one specification while a specification is assigned to only one class, software offerings being associated with respective individual product series to establish a configuration range, a configuration range for a stock keeping unit (SKU) representing a product when region, language, various operating system versions, and platforms are factored, a configuration range being a list of all the software offerings that are offered for a respective SKU;

receiving a product series component structure defining parts for a respective product series;

adding parts required for a product series to the block associated with the series, parts being assigned to each software class and related software specification pair in a block based on the part or parts required for the pair to thereby define a design structure;

storing the data structure on a tangible computer readable medium; and establishing a software bill of materials (BOM) on the computer readable medium based on the design structure using at least one of: a template and/or a snapshot; and accessing the computer readable medium to provide software on a computer.

2. The method of claim 1, comprising associating defects with related classes.

3. The method of claim 2, comprising associating corrective actions with respective defects.

4. The method of claim 3, comprising associating a respective installation file with each software offering, each installation file including a data file format version number, a version number of an installation data snapshot, an installation order for modules, data required for confirming successful installation, cyclic redundancy check (CRC) data for each binary file, path information for locating files in a file store, partition size information for recovery and customer partitions.

5. The method of claim 4, wherein installation and recovery tools use a list of software releases directly instead of microcode, which is used only for customer recovery, with microcode bit mappings being constrained to respective recovery media sets.

* * * * *